US011524797B2

(12) United States Patent
von Flotow et al.

(10) Patent No.: US 11,524,797 B2
(45) Date of Patent: Dec. 13, 2022

(54) AIRCRAFT-RETRIEVAL SYSTEM

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 50 days.

(21) Appl. No.: 17/238,689

(22) Filed: Apr. 23, 2021

(65) Prior Publication Data

US 2021/0237901 A1  Aug. 5, 2021

Related U.S. Application Data

(63) Continuation-in-part of application No. 15/966,356, filed on Apr. 30, 2018, now Pat. No. 10,988,257.

(60) Provisional application No. 62/504,848, filed on May 11, 2017.

(51) Int. Cl.
*B64F 1/02* (2006.01)
*B64C 39/02* (2006.01)

(52) U.S. Cl.
CPC .............. *B64F 1/02* (2013.01); *B64C 39/024* (2013.01); *B64C 2201/021* (2013.01); *B64C 2201/082* (2013.01); *B64C 2201/182* (2013.01); *B64C 2201/206* (2013.01)

(58) Field of Classification Search
CPC ... B64F 1/02; B64C 39/024; B64C 2201/021; B64C 2201/082; B64C 2201/182; B64C 2201/206
See application file for complete search history.

(56) References Cited

U.S. PATENT DOCUMENTS

| | | |
|---|---|---|
| 968,339 A | 8/1910 | Geraldson |
| 1,144,505 A | 6/1915 | Steffan |
| 1,306,860 A | 6/1919 | Smith |
| 1,383,595 A | 7/1921 | Black |
| 1,499,472 A | 7/1924 | Pratt |
| 1,582,188 A | 4/1926 | Mummert |
| 1,625,020 A | 4/1927 | Guillermo |
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |

(Continued)

FOREIGN PATENT DOCUMENTS

| | | |
|---|---|---|
| CA | 781808 A | 4/1968 |
| CA | 839101 A | 4/1970 |

(Continued)

OTHER PUBLICATIONS

"Bell QTR Quad Tiltrotor", AVIASTAR (3 pages), Jul. 27, 2015.

(Continued)

*Primary Examiner* — Justin M Benedik

(74) *Attorney, Agent, or Firm* — Neal, Gerber & Eisenberg LLP

(57) ABSTRACT

The present disclosure provides various embodiments of an aircraft retrieval system including winch-equipped retrieval assembly that is removably attachable to a rotorcraft to facilitate retrieval of a fixed-wing aircraft from wing-borne flight.

20 Claims, 57 Drawing Sheets

(56) References Cited

U.S. PATENT DOCUMENTS

| | | |
|---|---|---|
| 1,848,828 A | 3/1932 | Griffin |
| 1,912,723 A | 6/1933 | Perkins |
| 2,415,071 A | 2/1947 | Brie |
| 2,435,197 A | 2/1948 | Brodie |
| 2,440,574 A | 4/1948 | Cotton |
| 2,448,209 A | 8/1948 | Boyer et al. |
| 2,488,050 A | 11/1949 | Brodie |
| 2,488,051 A | 11/1949 | Brodie |
| 2,552,115 A | 5/1951 | Replogle |
| 2,807,429 A | 9/1957 | Hawkins et al. |
| 2,843,337 A | 7/1958 | Bennett |
| 2,944,815 A | 7/1960 | Moyer |
| 3,017,138 A | 1/1962 | Flint |
| 3,029,049 A | 4/1962 | Melville |
| 3,081,964 A | 3/1963 | Quenzler |
| 3,146,974 A | 9/1964 | Petoia |
| 3,351,325 A | 11/1967 | Cotton |
| 3,389,880 A | 6/1968 | Ferguson |
| 3,785,316 A | 1/1974 | Leming et al. |
| 3,980,259 A | 9/1976 | Greenhalgh et al. |
| 4,079,901 A | 3/1978 | Mayhew et al. |
| 4,116,408 A | 9/1978 | Soloy |
| 4,123,020 A | 10/1978 | Korsak |
| 4,147,317 A | 4/1979 | Mayhew et al. |
| 4,267,987 A | 5/1981 | Mcdonnell |
| 4,311,290 A | 1/1982 | Koper |
| 4,523,729 A | 6/1985 | Frick |
| 4,575,026 A | 3/1986 | Brittain et al. |
| 4,680,962 A | 7/1987 | Durbin |
| 4,753,400 A | 6/1988 | Reuter et al. |
| 4,757,959 A | 7/1988 | Schroeder et al. |
| 4,790,497 A | 12/1988 | Yoffe |
| 4,842,222 A | 6/1989 | Baird |
| 5,000,398 A | 3/1991 | Rashev |
| 5,039,034 A | 8/1991 | Burgess et al. |
| 5,042,750 A | 8/1991 | Winter |
| 5,054,717 A | 10/1991 | Taylor |
| 5,092,540 A | 3/1992 | Burgess et al. |
| 5,687,930 A | 11/1997 | Wagner et al. |
| 5,799,900 A | 9/1998 | Mcdonnell |
| 5,806,795 A | 9/1998 | Ortelli |
| 6,264,140 B1 | 7/2001 | Mcgeer et al. |
| 6,824,102 B2 | 11/2004 | Haggard |
| 6,874,729 B1 | 4/2005 | Mcdonnell |
| 6,961,018 B2 | 11/2005 | Heppe et al. |
| 7,000,883 B2 | 2/2006 | Mercadal et al. |
| 7,028,947 B2 | 4/2006 | Burns |
| 7,059,564 B2 | 6/2006 | Dennis |
| 7,066,430 B2 | 6/2006 | Dennis et al. |
| 7,090,166 B2 | 8/2006 | Dennis et al. |
| 7,097,137 B2 | 8/2006 | Mcdonnell |
| 7,104,495 B2 | 9/2006 | Mcgeer |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | Mcgeer et al. |
| 7,143,974 B2 | 12/2006 | Roeseler et al. |
| 7,143,976 B2 | 12/2006 | Snediker et al. |
| 7,152,827 B2 | 12/2006 | Mcgeer |
| 7,165,745 B2 | 1/2007 | Mcgeer et al. |
| 7,175,135 B2 | 2/2007 | Dennis et al. |
| 7,219,856 B2 | 5/2007 | Watts et al. |
| 7,264,204 B1 | 9/2007 | Portmann |
| 7,344,108 B2 | 3/2008 | Muylaert et al. |
| 7,360,741 B2 | 4/2008 | Mcgeer et al. |
| 7,410,125 B2 | 8/2008 | Steele |
| 7,464,650 B2 | 12/2008 | Steinkerchner et al. |
| 7,510,145 B2 | 3/2009 | Snediker |
| 7,530,527 B2 | 5/2009 | Kelleher |
| 7,543,780 B1 | 6/2009 | Marshall et al. |
| 7,562,843 B2 | 7/2009 | Lipponen |
| 7,578,467 B2 | 8/2009 | Goodrich |
| 7,581,702 B2 | 9/2009 | Olson et al. |
| 7,602,415 B2 | 10/2009 | Von et al. |
| 7,665,691 B2 | 2/2010 | Hanzlick et al. |
| 7,712,702 B2 | 5/2010 | Mcgeer et al. |
| 7,798,445 B2 | 9/2010 | Heppe et al. |
| 7,806,366 B2 | 10/2010 | Jackson |
| 7,876,359 B2 | 1/2011 | Von et al. |
| 7,883,059 B2 | 2/2011 | Kunz |
| 7,954,758 B2 | 6/2011 | Mcgeer et al. |
| 8,091,883 B2 | 1/2012 | Sakamoto |
| 8,140,200 B2 | 3/2012 | Heppe et al. |
| 8,162,256 B2 | 4/2012 | Goossen et al. |
| 8,172,177 B2 | 5/2012 | Lovell et al. |
| 8,226,039 B2 | 7/2012 | Von et al. |
| 8,231,083 B2 | 7/2012 | Kutzmann et al. |
| 8,245,968 B2 | 8/2012 | Mcgeer et al. |
| 8,276,844 B2 | 10/2012 | Kariv |
| 8,292,215 B2 | 10/2012 | Olm et al. |
| 8,313,057 B2 | 11/2012 | Rednikov |
| 8,348,193 B2 | 1/2013 | Mcgeer et al. |
| 8,405,723 B2 | 3/2013 | Von et al. |
| 8,453,966 B2 | 6/2013 | Mcgeer et al. |
| 8,464,981 B2 | 6/2013 | Goldie et al. |
| 8,573,536 B2 | 11/2013 | Mcgeer et al. |
| 8,596,576 B1 | 12/2013 | Mcgeer et al. |
| 8,672,264 B1 | 3/2014 | Mcgeer et al. |
| 8,708,277 B1 | 4/2014 | Mcgeer et al. |
| 8,708,278 B2 | 4/2014 | Mcgeer et al. |
| 8,714,482 B2 | 5/2014 | Mcgeer et al. |
| 8,740,134 B2 | 6/2014 | Suzuki |
| 8,740,142 B2 | 6/2014 | Mcgeer et al. |
| 8,857,754 B2 | 10/2014 | Ferrari et al. |
| 8,944,373 B2 | 2/2015 | Dickson et al. |
| 8,950,698 B1 | 2/2015 | Rossi |
| 8,955,800 B2 | 2/2015 | Mcgeer et al. |
| 8,955,801 B2 | 2/2015 | Mcgeer et al. |
| 9,004,402 B2 | 4/2015 | Mcgeer et al. |
| 9,010,683 B2 | 4/2015 | Gundlach et al. |
| 9,132,916 B2 | 9/2015 | Hanna et al. |
| 9,193,481 B2 | 11/2015 | Mcgeer et al. |
| 9,266,609 B1 | 2/2016 | Kunz |
| 9,290,269 B2 | 3/2016 | Walker et al. |
| 9,340,301 B2 | 5/2016 | Dickson et al. |
| 9,359,075 B1 | 6/2016 | Von Flotow et al. |
| 9,434,481 B2 | 9/2016 | Mcgeer |
| 9,456,185 B2 | 9/2016 | Oakley et al. |
| 9,475,575 B2 | 10/2016 | Rossi |
| 9,527,604 B2 | 12/2016 | Melish et al. |
| 9,637,245 B2 | 5/2017 | Yoffe |
| 9,656,765 B2 | 5/2017 | Von Flotow et al. |
| 9,685,091 B2 | 6/2017 | Hayes |
| 9,816,816 B2 | 11/2017 | Hayes |
| 9,856,036 B2 | 1/2018 | Dickson et al. |
| 9,896,222 B2 | 2/2018 | Kunz et al. |
| 10,518,902 B2 | 12/2019 | Briggs et al. |
| 11,008,101 B2 | 5/2021 | Miller et al. |
| 11,027,844 B2 * | 6/2021 | von Flotow .............. B64D 5/00 |
| 2002/0100838 A1 | 8/2002 | Mcgeer et al. |
| 2003/0222173 A1 | 12/2003 | Mcgeer et al. |
| 2004/0256519 A1 | 12/2004 | Ellis et al. |
| 2005/0017129 A1 * | 1/2005 | McDonnell .............. B64D 3/00 244/110 G |
| 2006/0191457 A1 * | 8/2006 | Murphy .................. B63B 21/04 114/253 |
| 2009/0224097 A1 | 9/2009 | Kariv |
| 2010/0025528 A1 | 2/2010 | Jackson |
| 2010/0295321 A1 | 11/2010 | Bevirt |
| 2012/0223182 A1 | 9/2012 | Gilchrist et al. |
| 2013/0136564 A1 * | 5/2013 | Teppig, Jr. .............. B63B 27/36 414/803 |
| 2014/0339355 A1 | 11/2014 | Olm et al. |
| 2015/0129716 A1 | 5/2015 | Yoffe |
| 2015/0314871 A1 | 11/2015 | Von Flotow |
| 2016/0023760 A1 | 1/2016 | Goodrich |
| 2016/0114906 A1 | 4/2016 | Mcgeer et al. |
| 2016/0221683 A1 | 8/2016 | Roberts et al. |
| 2016/0327945 A1 | 11/2016 | Davidson |
| 2017/0036762 A1 | 2/2017 | Gamble et al. |
| 2017/0072812 A1 | 3/2017 | Von Novak et al. |
| 2017/0225784 A1 | 8/2017 | Hayes et al. |
| 2017/0274997 A1 | 9/2017 | Von Flotow et al. |
| 2017/0297738 A1 | 10/2017 | Von Flotow et al. |

(56) References Cited

U.S. PATENT DOCUMENTS

| | | | |
|---|---|---|---|
| 2017/0369185 | A1 | 12/2017 | Grubb |
| 2018/0050823 | A1 | 2/2018 | Mcgeer |
| 2018/0327113 | A1 | 11/2018 | Von Flotow et al. |

FOREIGN PATENT DOCUMENTS

| | | |
|---|---|---|
| CN | 204822072 U | 12/2015 |
| EP | 0472613 A1 | 3/1992 |
| EP | 2186728 A1 | 5/2010 |
| GB | 2071031 A | 9/1981 |
| WO | 0107318 A1 | 2/2001 |
| WO | 2008015663 A1 | 2/2008 |
| WO | 2013171735 A1 | 11/2013 |
| WO | 2014204550 A2 | 12/2014 |
| WO | 2016167849 A1 | 10/2016 |

OTHER PUBLICATIONS

"Flexrotor Long-Endurance Vtol Aircraft Transitions To Wing-Borne Flight", Aerovel, http://www.aerovelco.com/papers/FlexrotorTransitionsAnnouncement.pdf (2 pages), Aug. 4, 2011.

"Rotary Action", Pigasus Press, Description of Scene of License to Kill, http://www.rotaryaction.com/pages/licetkil.html, 2014 (2 pages).

"Skyhook (Harrier Handling System)", www.harpoondatabases.com/encyclopedia/Entry2979.aspx (3 pages), Jun. 21, 2013.

"The Beartrap—A Canadian Invention", Originally published in Crowsnest Magazine—vol. 17, Nos. 3 and 4 (Mar.-Apr. 1965); retrieved at http://www.readyayeready.com/timeline/1960s/beartrap/index.htm>, retrieved on Sep. 14, 2007 (4 pages).

"Trapeze", Wikipedia, available at http://en.wikipedia.org/w/index.php?title=Trapeze&oldid=67584367 as of Aug. 4, 2006 (2 pages).

Dickard, H. E., "Mini-RPV Recovery System Conceptual Study", Teledyne Ryan Aeronautical, Prepared for Eustis Directorate, U.S. Army Air Mobility Research and Development Laboratory, Aug. 1977 (322 pages).

Durbin, Enoch, et al., "An Airspeed Vector Sensor for V/STOL Aircraft", Journal of Aircraft, vol. 19, No. 6, Jun. 1982 (7 pages), 449-455.

Hendrickson, Stephen P., et al., "A Miniature Powerplant for Very Small, Very Long Range Autonomous Aircraft", Final Report to the United States Department of Energy under contract No. DE-FG03-96ER82187 (Phase II SBIR) (23 pages), Sep. 29, 1999.

Holland, Greg J., et al., "Autonomous Aerosondes for Economical Atmospheric Soundings Anywhere on the Globe", Bulletin of the American Meteorological Society, vol. 73, No. 12, Dec. 1992 (12 pages).

McGeer, Tad, "Aerosonde Hazard Estimation", The Insitu Group, 1994 (7 pages).

McGeer, Tad, "Aerosonde Pacific Reconnaissance: Ready When You Are!", The Insitu Group, Pacific Northwest Weather Workshop, Mar. 2005 (15 pages).

McGeer, Tad, "Laima: The First Atlantic Crossing By Unmanned Aircraft", The Insitu Group (25 pages).

McGeer, Tad, et al., "Quantitative Risk Management as a Regulatory Approach To Civil UAVS", International Workshop on UAV Certification, Jun. 1999 (11 pages).

McGeer, Tad, "Regulatory Issues Involving Long-Range Weather Observation By Aerosonde Autonomous Aircraft", The Insitu Group (8 pages).

McGeer, Tad, "Safety, Economy, Reliability, and Regulatory Policy for Unmanned Aircraft", www.aerovelco.com, Mar. 2007 (9 pages).

McGeer, Tad, et al., "Wide-Scale Use of Long-Range Miniature Aerosondes Over the World's Oceans", available at www.aerovelco.com/papers/McGeerVagners99.mht, 1999 (25 pages).

Mullens, Katherine, et al. , "Automated Launch, Recovery, and Refueling for Small Unmanned Aerial Vehicles", 2004 (11 pages).

\* cited by examiner

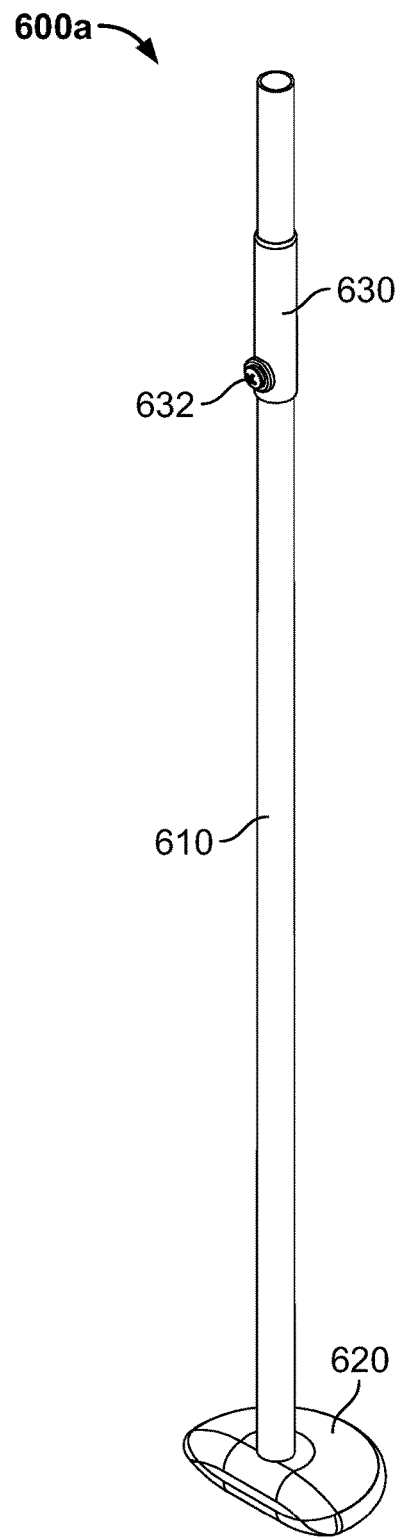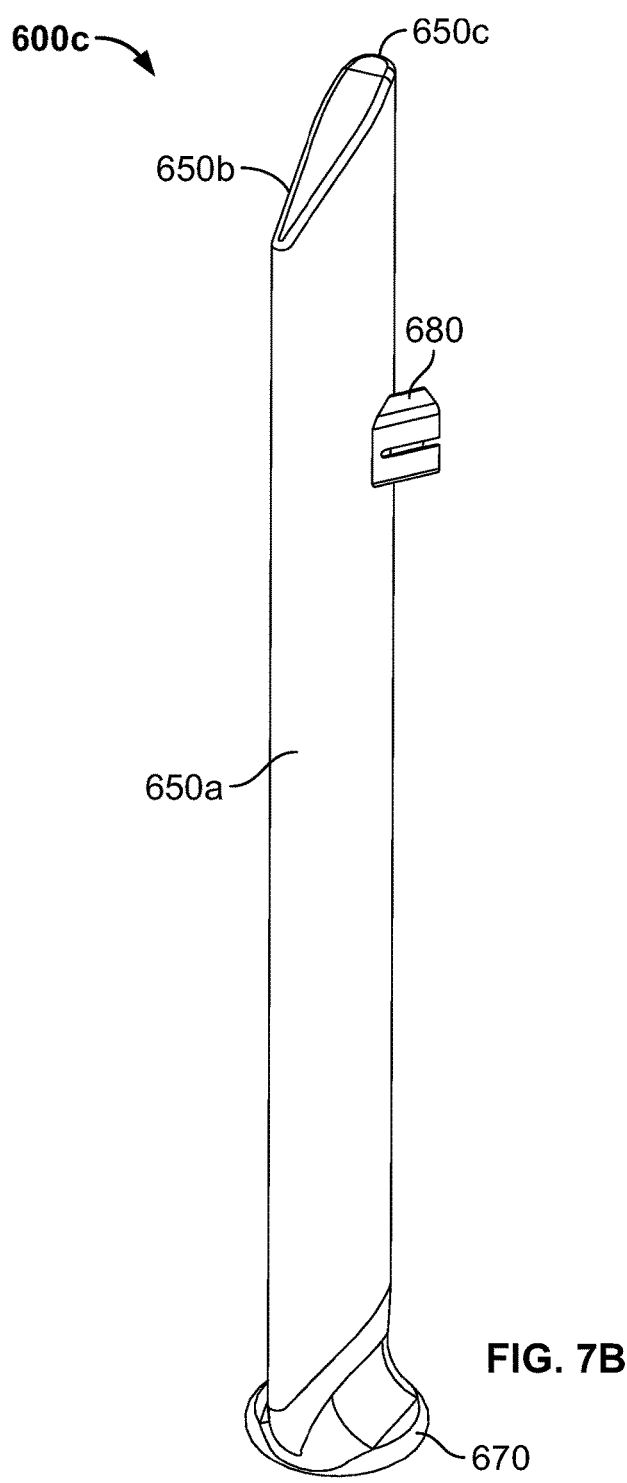
FIG. 7A
FIG. 7B

AIRCRAFT-RETRIEVAL SYSTEM

PRIORITY

This patent application is a continuation-in-part of, claims priority to, and the benefit of U.S. patent application Ser. No. 15/966,356, filed Apr. 30, 2018, which claims priority to and the benefit of U.S. Provisional Patent Application No. 62/504,848, which was filed on May 11, 2017, the entire contents of which are incorporated herein by reference.

FIELD

The present disclosure relates to an aircraft-retrieval system for retrieving an aircraft from free flight. More particularly, the present disclosure relates to an aircraft-retrieval system for retrieving a fixed-wing aircraft from free flight using a winch-equipped retrieval assembly.

BACKGROUND

An aircraft capable of hover and/or of slow flight is typically not well-suited to long-distance, efficient cruising flight. Certain fixed-wing aircraft are capable of long-distance, efficient cruising flight, but typically require long runways for takeoff landing. When there isn't sufficient space for a runway, these fixed-wing aircraft may not be used, or must be alternatively launched. There is a need for aircraft-launch and/or retrieval systems and methods that eliminate the need for a runway to launch and/or retrieve a fixed-wing aircraft.

SUMMARY

The present disclosure provides various embodiments of an aircraft retrieval system including winch-equipped retrieval assembly that is removably attachable to a rotorcraft (such as but not limited to a multi-copter or a helicopter) to facilitate retrieval of a fixed-wing aircraft from wing-borne flight.

In one embodiment, the fixed-wing retrieval system includes a retrieval assembly, a flexible capture member, and a tensioning object. The retrieval assembly includes a base configured to be removably attached to a rotorcraft, a drum attached to and rotatable relative to the base, a motor operatively connected to the drum to rotate the drum, and multiple landing gear attached to the base. One end of the flexible capture member is attached to the drum and the flexible capture member is wound around the drum. The free end of the flexible capture member terminates in an attachment device. The tensioning object is attached to the attachment device.

In operation, an operator attaches the rotorcraft to the base of the retrieval assembly and remotely controls the rotorcraft to fly to a retrieval location. The operator remotely controls the motor to wind a first portion of the flexible capture member off of the drum. The operator remotely controls the rotorcraft to fly into the wind. The fixed-wing aircraft is controlled to contact and capture part of the first portion of the flexible capture member. Afterwards, the operator remotely controls the motor to rotate the drum to wind at least part of the first portion of the flexible capture member back onto the drum to draw the fixed-wing aircraft toward the rotorcraft in preparation for landing.

Additional features and advantages of the present disclosure are described in, and will be apparent from, the following Detailed Description and the Figures.

BRIEF DESCRIPTION OF THE FIGURES

FIG. 7A is a top perspective view of one of the front landing gear modules of the multi-copter of FIG. 1A.

FIG. 7B is a top perspective view of one of the rear landing gear modules of the multi-copter of FIG. 1A.

DETAILED DESCRIPTION

Figure 1A:
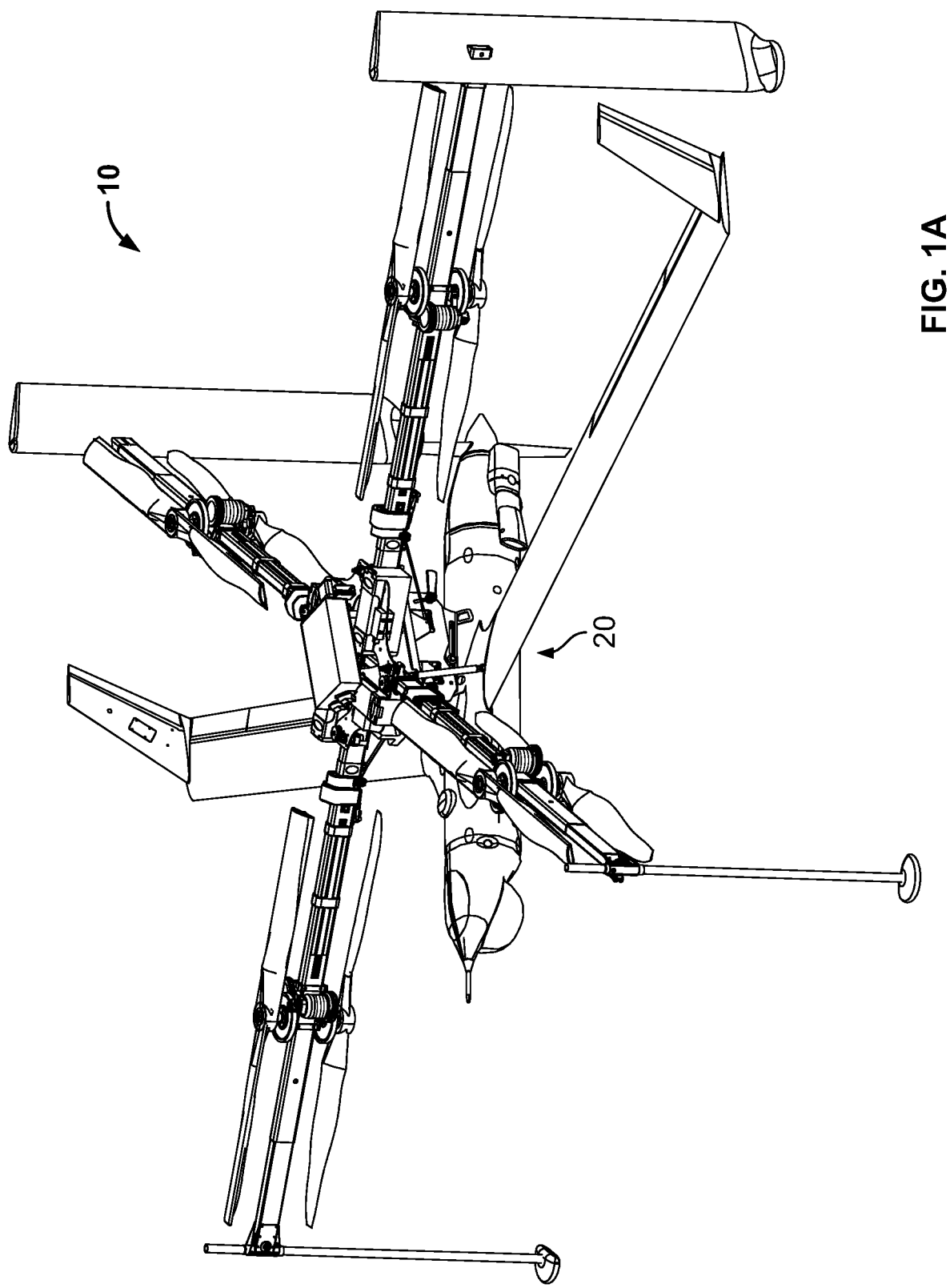
FIG. 1A is a top perspective view of one example embodiment of a rotorcraft of the present disclosure, and particularly in the form of a multi-copter attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The rotorcraft-assisted launch and retrieval system of various embodiments of the present disclosure generally includes an example roto-craft in the form of an example eight-rotor modular multi-copter attachable to (and detachable from) an example fixed-wing aircraft to facilitate launch of the fixed-wing aircraft into wing-borne flight and attachable to (and detachable from) a retrieval assembly to facilitate retrieval of the fixed-wing aircraft from wing-borne flight. In other embodiments, the rotorcraft may include any suitable quantity of rotors (such as but not limited to being in the form of a helicopter or a quadcopter).

Generally, to launch the fixed-wing aircraft 20 into wing-borne flight, an operator (or operators): (1) attaches the fixed-wing aircraft to a rotorcraft such as a multi-copter; (2) remotely controls the rotorcraft to lift the fixed-wing aircraft to a desired pre-launch altitude and to accelerate the fixed-wing aircraft to a desired pre-launch speed; (3) remotely causes the fixed-wing aircraft to detach from the rotorcraft, thereby releasing the fixed-wing aircraft into wing-borne flight; and (4) lands on a landing surface.

Generally, to retrieve the fixed-wing aircraft from wing-borne flight, the operator (or operators): (1) attaches the retrieval assembly to the rotorcraft; (2) attaches a tensioning object to the free end of a flexible capture member wound around a drum of the retrieval assembly; (3) remotely controls the rotorcraft to fly to a pre-capture altitude; (4) remotely controls a motor to rotate the drum to wind out a first portion of the flexible capture member from the drum;

(5) remotely controls the rotorcraft to fly until the fixed-wing aircraft contacts and captures the flexible capture member; (6) remotely controls the motor to rotate the drum to wind in the flexible capture member until the fixed-wing aircraft reaches the drum; and (7) remotely controls the rotorcraft to land.

Example Multi-Copter Components

FIGS. 1A, 1B, 1C, 1D, 1E, 1F, and 1G show an example rotorcraft in the form of an example multi-copter 10 of the present disclosure. The multi-copter 10 is modular in that it is assembled from (and can be disassembled into) a plurality of different modules or subassemblies. The multi-copter is removably attachable to: (1) the fixed-wing aircraft 20 to facilitate launch of the fixed-wing aircraft 20 into wing-borne flight, and (2) the flexible capture member 5000 to facilitate retrieval of the fixed-wing aircraft 20 from wing-borne flight.

Figure 1B:
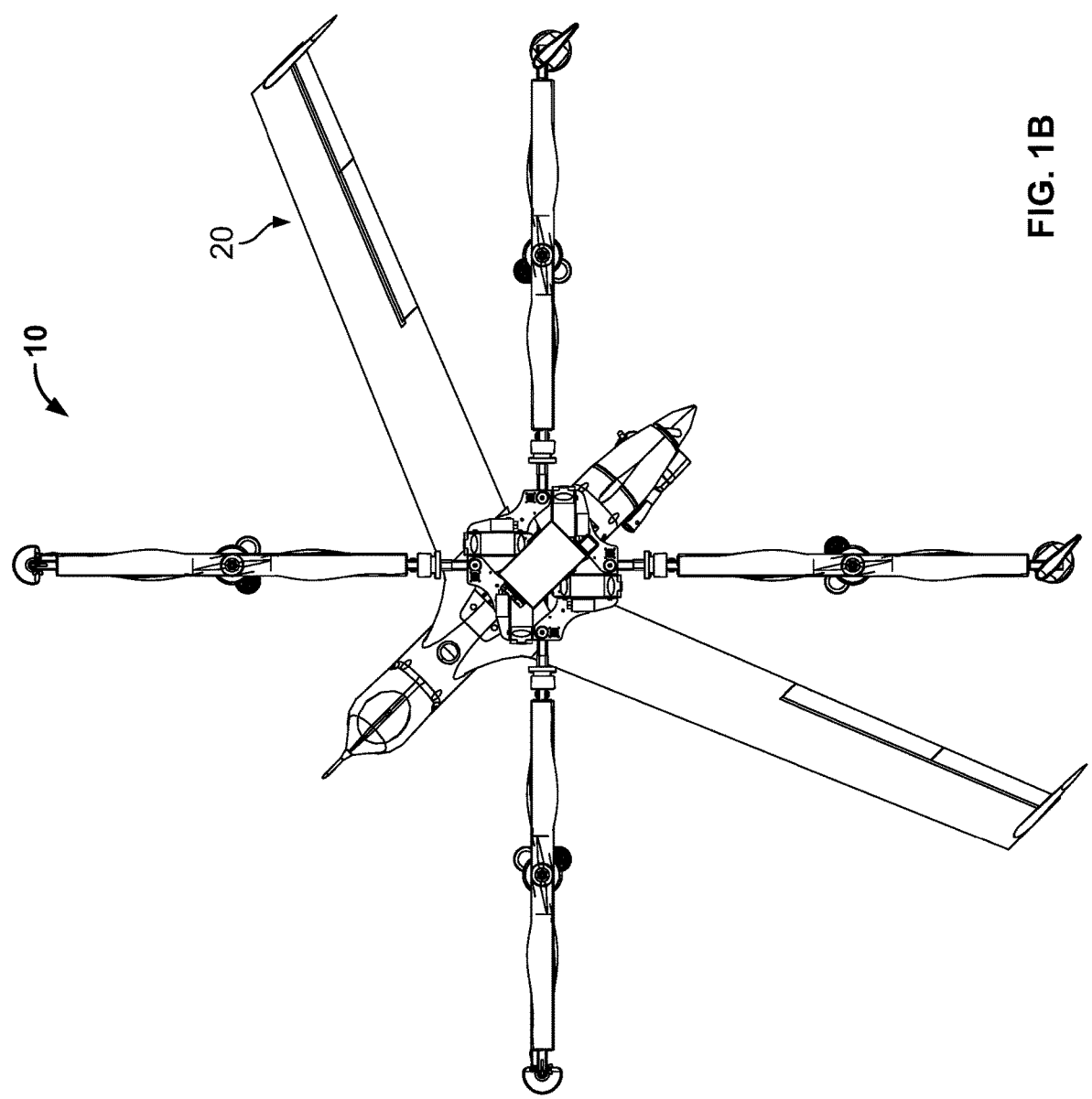
FIG. 1B is a top plan view of the multi-copter and fixed-wing aircraft of FIG. 1A.
Figure 1C:
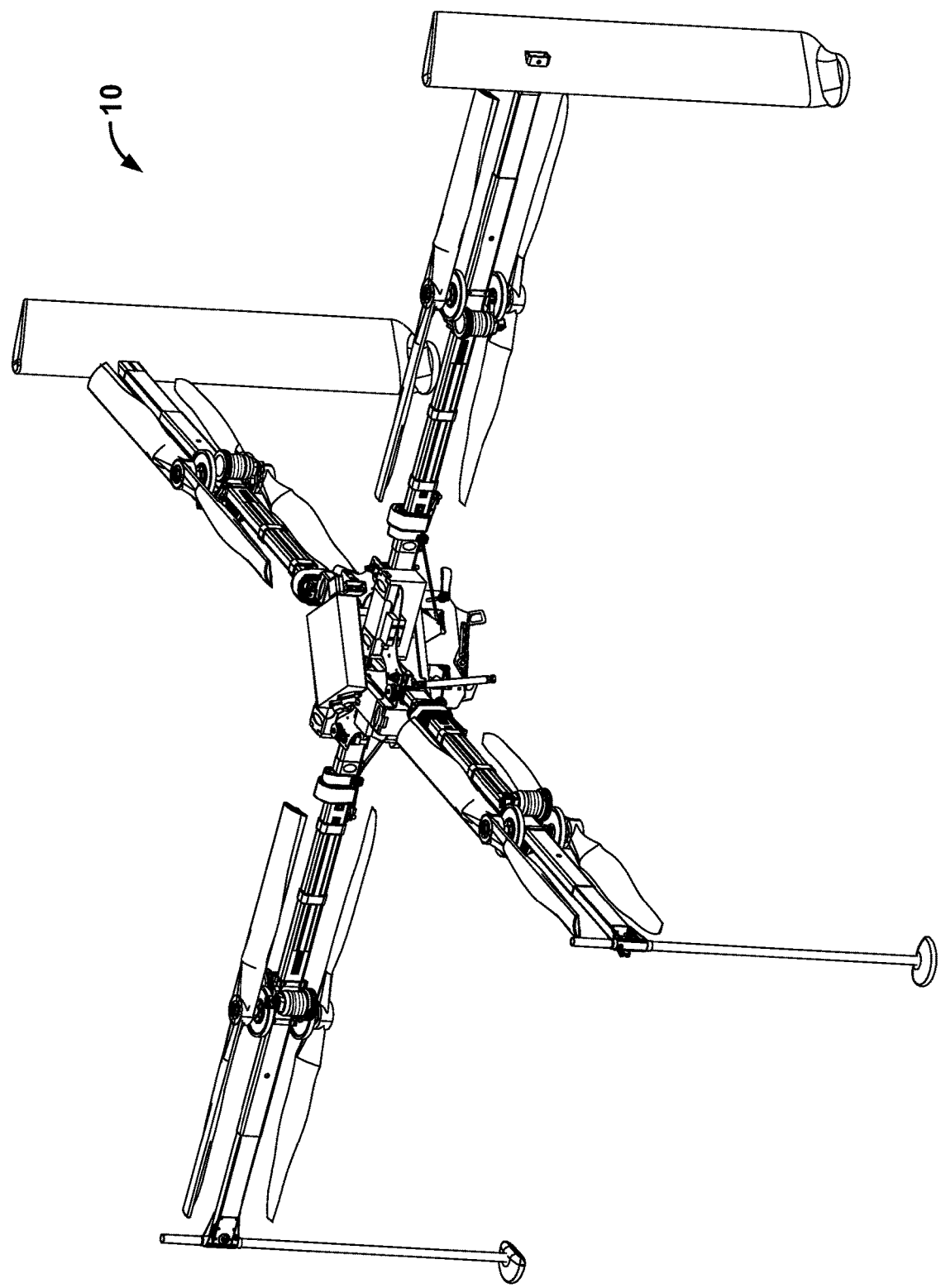
FIG. 1C is a top perspective view of the multi-copter of FIG. 1A.
Figure 1D:
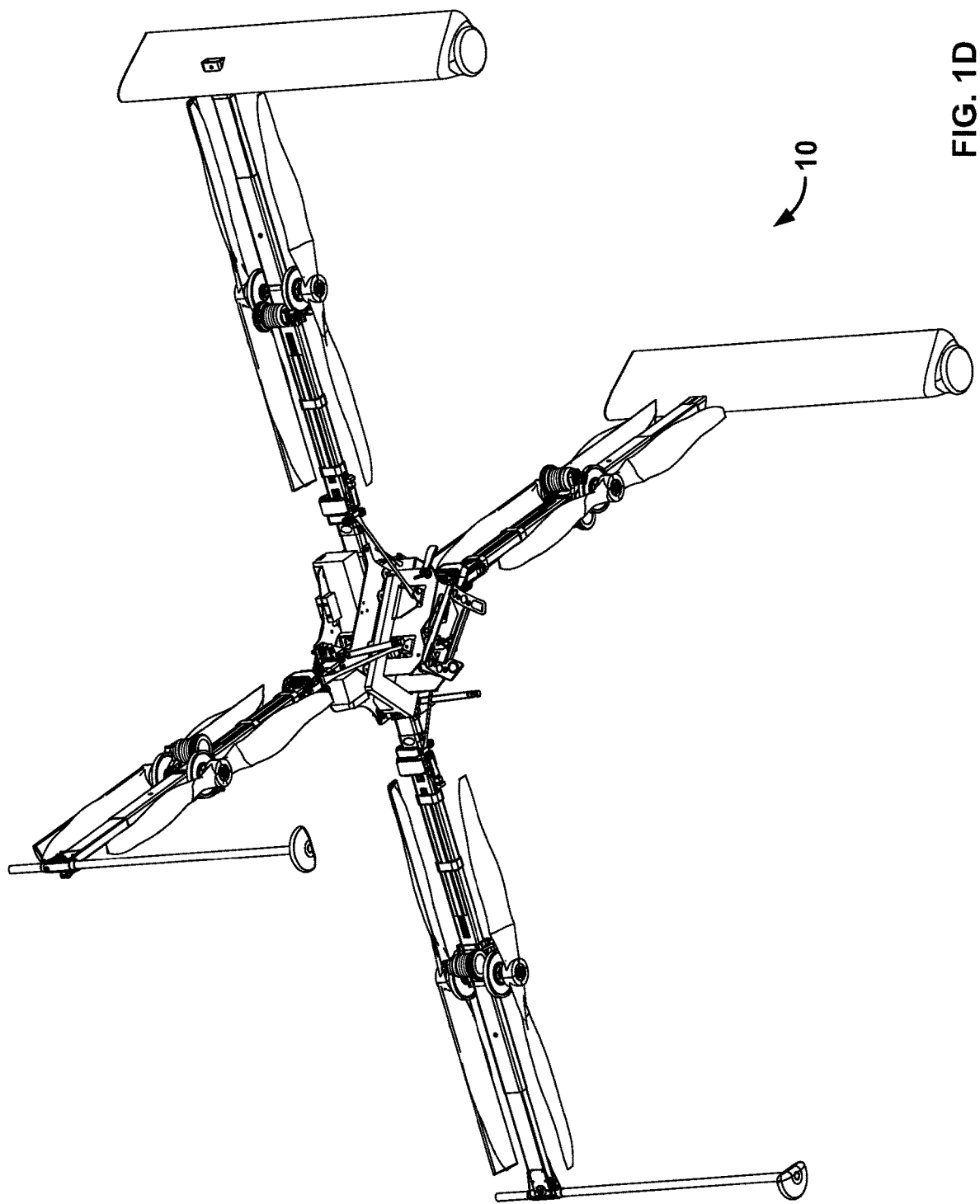
FIG. 1D is a bottom perspective view of the multi-copter of FIG. 1A.
Figure 1E:
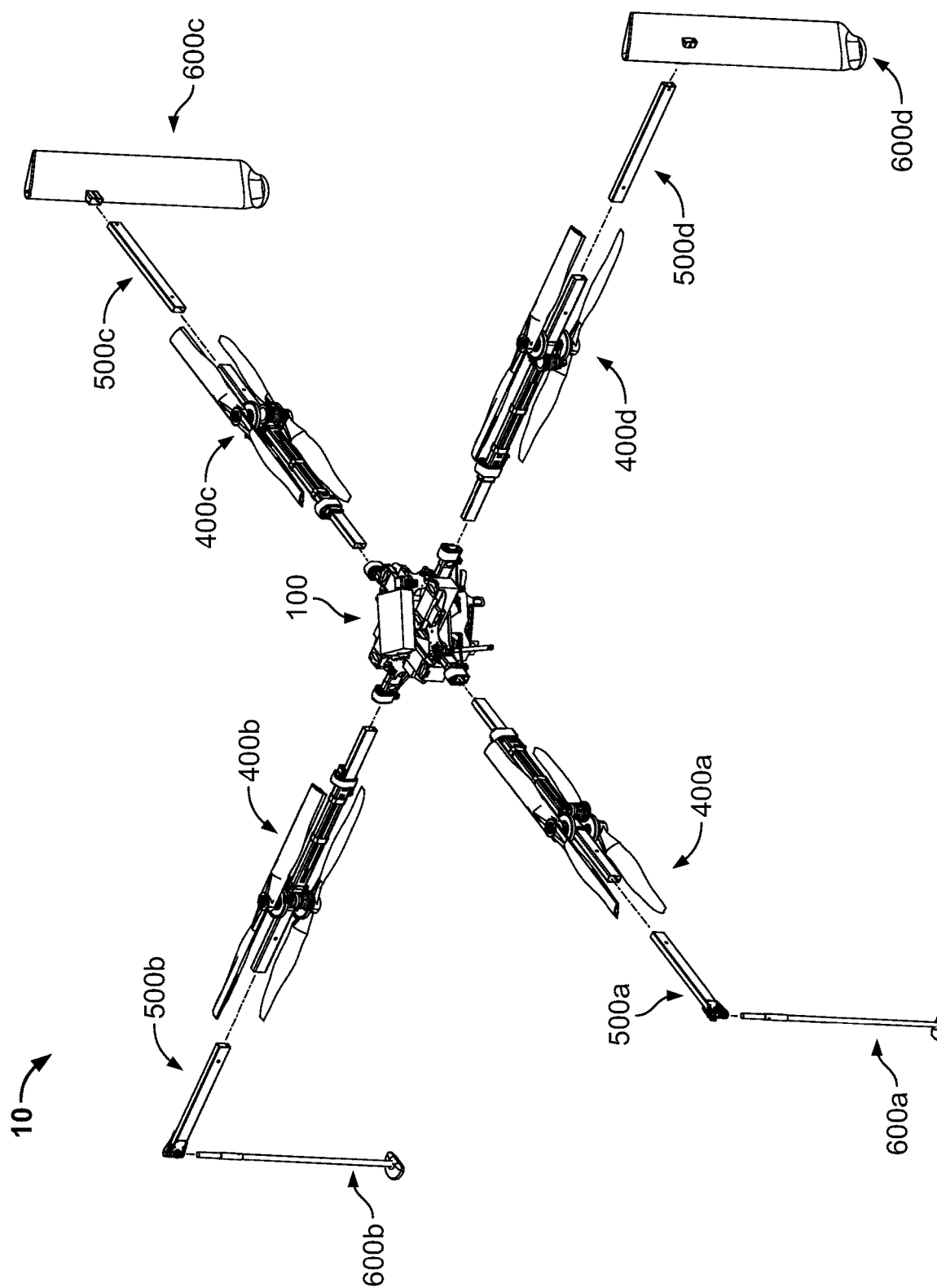
FIG. 1E is a partially exploded top perspective view of the multi-copter of FIG. 1A.
Figure 1F:
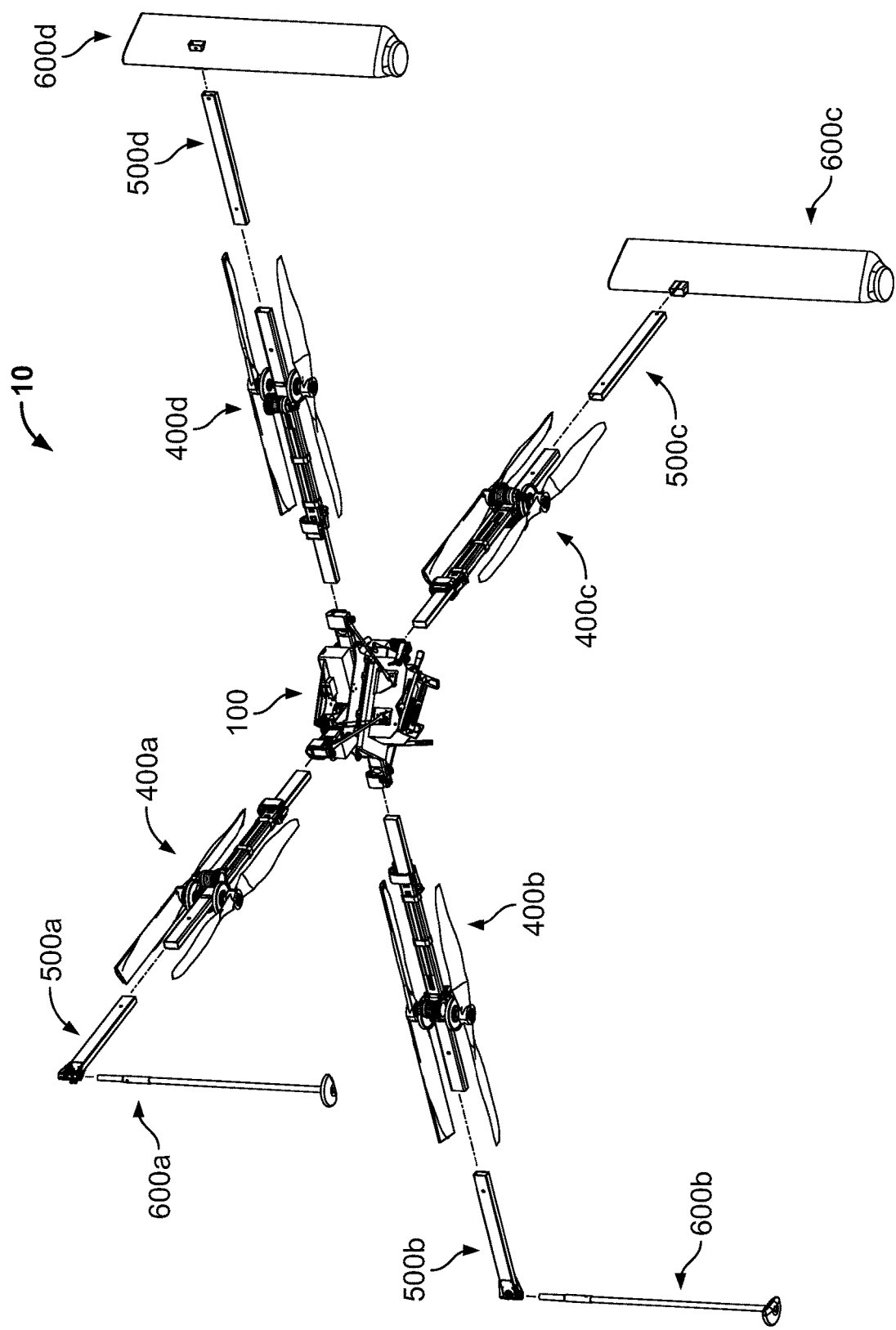
FIG. 1F is a partially exploded bottom perspective view of the multi-copter of FIG. 1A.

As best shown in FIGS. 1E and 1F, the multi-copter 10 includes the following 13 modules or subassemblies: a hub module 100; first, second, third, and fourth rotor arm modules 400a, 400b, 400c, and 400d; first and second front landing gear extension modules 500a and 500b; first and second rear landing gear extension modules 500c and 500d; first and second front landing gear modules 600a and 600b; and first and second rear landing gear modules 600c and 600d.

As described in detail below, to assemble the multi-copter 10 from these 13 modules or subassemblies, after removing the 13 modules from the container of the storage and launch system 2000, an operator: (1) attaches the first, second, third, and fourth rotor arm modules 400a, 400b, 400c, and 400d to the hub module 100; (2) attaches the first and second front landing gear extension modules 500a and 500b to the first and second rotor arm modules 400a and 400b, respectively; (3) attaches the first and second rear landing gear extension modules 500c and 500d to the third and fourth rotor arm modules 400c and 400d, respectively; (4) attaches the first and second front landing gear module 600a and 600b to the first and second front landing gear extension modules 500a and 500b, respectively; and (5) attaches the first and second rear landing gear module 600c and 600d to the first and second rear landing gear extension modules 500c and 500d, respectively.

The modularity of this multi-copter is beneficial compared to non-modular or unitary multi-copter construction. First, the modularity of this multi-copter enables an operator to quickly and easily disassemble this relatively large multi-copter into 13 smaller modules or subassemblies. The operator can compactly store these modules or subassemblies in a single container, which makes the disassembled multi-copter easy to store and transport compared to the assembled multi-copter. Second, if a part of this multi-copter breaks, its modularity enables the operator to quickly and easily replace the module(s) or subassembly(ies) including the broken part with a properly-functioning replacement module(s) or sub-assembly(ies) rather than waste time repairing the broken component(s).

Figure 1G:
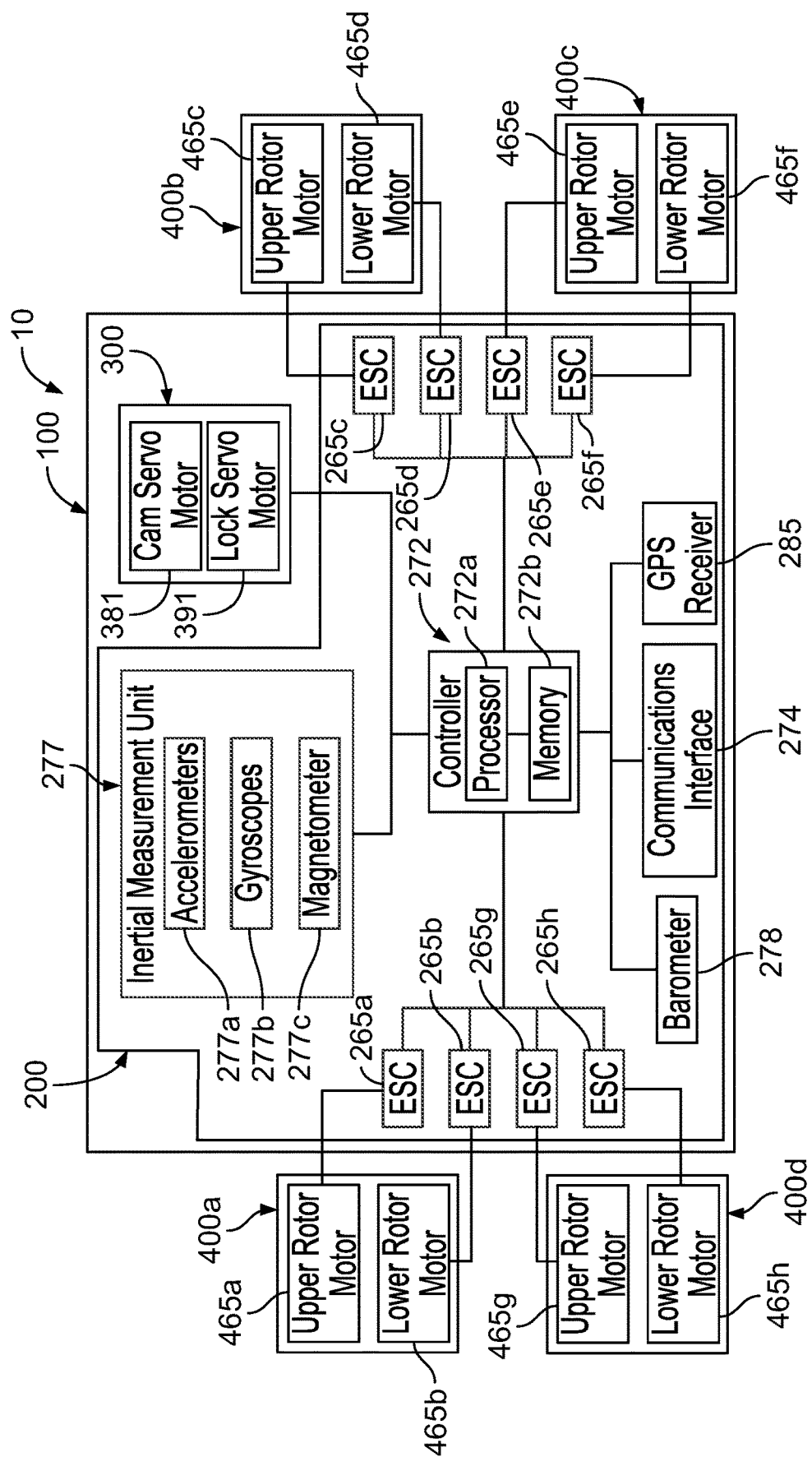
FIG. 1G is a block diagram showing certain electrically controlled components of the multi-copter of FIG. 1A.

FIG. 1G is a block diagram of certain electrically-controlled components of the multi-copter 10. In this embodiment, although not shown in FIG. 1G, four (or any suitable quantity of) lithium-ion batteries (or any other suitable power source(s)) power these components (as described below). Specifically, for a given component, the power source may be directly electrically connected to that component to power that component or indirectly electrically connected to that component (e.g., via another component) to power that component.

The hub module 100 includes a hub base 200 and a saddle 300. The hub base 200 includes: (1) a controller 272; (2) a communications interface 274; (3) an inertial measurement unit (IMU) 277; (4) a barometer 278 (or other suitable pressure sensor); (5) a GPS receiver 285; and (6) eight electronic speed controllers (ESCs) 265a, 265b, 265c, 265d, 265e, 265f, 265g, and 265h. The saddle 300 includes: (1) a cam servo motor 381; and (2) a lock servo motor 391. This is merely one example configuration, and these components may be located on any suitable part of the multi-copter in other embodiments. The first rotor arm module 400a includes an upper rotor motor 465a and a lower rotor motor 465b. The second rotor arm module 400b includes an upper rotor motor 465c and a lower rotor motor 465d. The third rotor arm module 400c includes an upper rotor motor 465e and a lower rotor motor 465f. The fourth rotor arm module 400d includes an upper rotor motor 465g and a lower rotor motor 465h.

The controller 272 is electrically and communicatively connected to the telemetry link 274, the R/C receiver 276, the IMU 277, the barometer 278, the GPS receiver 285, the ESCs 265a to 265h, the cam servo motor 381, and the lock servo motor 391.

The controller 272 includes a processor 272a and a memory 272b. The processor 272a is configured to execute program code or instructions stored in the memory 272b to control operation of the multi-copter 10, as described herein. The processor 272a may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory 272b is configured to store, maintain, and provide data as needed to support the functionality of the multi-copter 10. For instance, in various embodiments, the memory 272b stores program code or instructions executable by the processor 272a to control the multi-copter 10. The memory 272b may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown) that the operator of the multi-copter 10 controls. In operation, once the communications interface 274 establishes communication with the computing device, the controller 272 can send data (via the communications interface 274) associated with the operation of the multi-copter 10 (such as the operational status of the multi-copter 10, GPS coordinates of the multi-copter 10, rotor motor status, IMU or other sensor measurements, altitude, GPS reception health, magnetometer health, aircraft attitude, and the like) to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller.

In certain embodiments, the communications interface 274 includes separate components for communicating with the computing device (such as a telemetry link) and the R/C controller (such as an R/C receiver).

The IMU 277 includes: (1) multiple accelerometers 277a configured to sense the linear acceleration of the multi-copter 10 with respect to three orthogonal reference axes (e.g., standard orthogonal x-, y-, and z-axes); (2) multiple gyroscopes 277b configured to sense the angular rotation of the multi-copter 10 with respect to the pitch, yaw, and roll axes of the multi-copter 10, as is known in the art; and (3) a magnetometer 277c configured to enable the controller 272 to determine the heading of the multi-copter 10 (i.e., the direction in which the multi-copter 10 is pointed relative to Earth), as is known in the art. More specifically, the magnetometer 277c is configured to sense the Earth's magnetic field and transmit a signal representing the direction of the Earth's magnetic North to the controller 272. The controller 272 is configured to use the GPS coordinates of the multi-copter 10 and a global map of declination angle (the angle between the Earth's true North and the Earth's magnetic North) to determine a required correction angle. The controller 272 is configured to apply the required correction angle to the direction of the Earth's magnetic North to obtain the direction of the Earth's true North. The controller 272 then uses this information to determine the heading of the multi-copter 10. In other embodiments, a pair of GPS receivers are used instead of the magnetometer to maintain more accurate heading. This practice is especially useful when the multi-copter is operating in close proximity to large iron objects—such as ship hulls—or when the difference between the Earth's magnetic North and true North is large, such as near the Earth's poles.

The accelerometers 277a, the gyroscopes 277b, and the magnetometer 277c continuously or periodically obtain these sensor readings and continuously or periodically transmit corresponding signals to the controller 272, which uses these sensor readings in a variety of different ways described herein. This is merely one example IMU, and the IMU may include any suitable sensors.

The barometer 278 is configured to sense the atmospheric pressure and to transmit a signal representing the sensed atmospheric pressure to the controller 272. The controller 272 is configured to use the sensed atmospheric pressure to determine: (1) the height of the multi-copter 10 above sea level, as is known in the art; and (2) the height of the multi-copter 10 above the ground or any other suitable reference location, as is known in the art. For instance, to determine the height of the multi-copter 10 above the ground, the controller 272 uses a reference atmospheric pressure sensed by the barometer 278 while the multi-copter 10 is on the ground just before takeoff to determine the height of the ground above sea level. Once the multi-copter 10 is airborne, at any given point in time the controller 272 is configured to determine the height of the multi-copter 10 above the ground by: (1) using the atmospheric pressure sensed by the barometer 278 to determine the height of the multi-copter 10 above sea level; and (2) determining the difference between the height of the multi-copter 10 above sea level and the height of the ground above sea level. This is merely one example way of determining the height of the multi-copter above a reference point. Any other suitable method may be employed.

The GPS receiver 285 is communicatively connectable with (such as via a suitable wireless protocol) GPS satellites (not shown), as is known in the art. The GPS receiver 285 is configured to receive signals from one or more of the GPS satellites, to determine the multi-copter's location using those signals, and to transmit signals representing the multi-copter's location to the controller 272.

The ESC 265a is electrically connected to and, along with the controller 272, controls the operation of the upper rotor motor 465a of the first rotor arm module 400a. The ESC 265b is electrically connected to and, along with the controller 272, controls the operation of the lower rotor motor 465b of the first rotor arm module 400a. The ESC 265c is electrically connected to and, along with the controller 272, controls the operation of the upper rotor motor 465c of the second rotor arm module 400b. The ESC 265d is electrically connected to and, along with the controller 272, controls the operation of the lower rotor motor 465d of the second rotor arm module 400b. The ESC 265e is electrically connected to and, along with the controller 272, controls the operation of the upper rotor motor 465e of the third rotor arm module 400c. The ESC 265f is electrically connected to and, along with the controller 272, controls the operation of the lower rotor motor 465f of the third rotor arm module 400c. The ESC 265g is electrically connected to and, along with the controller 272, controls the operation of the upper rotor motor 465g of the fourth rotor arm module 400d. The ESC 265h is electrically connected to and, along with the controller 272, controls the operation of the lower rotor motor 465h of the fourth rotor arm module 400d.

The controller 272 is configured to send rotor motor control signals to the ESCs 265a to 265h to control operation of the rotor motors 465a to 465h in accordance with received control signals and/or control signals the controller 272 generates via any of the software subroutines disclosed herein.

Each module or subassembly of the multi-copter 10 is described in further detail below.

Hub Module

Figure 2A:
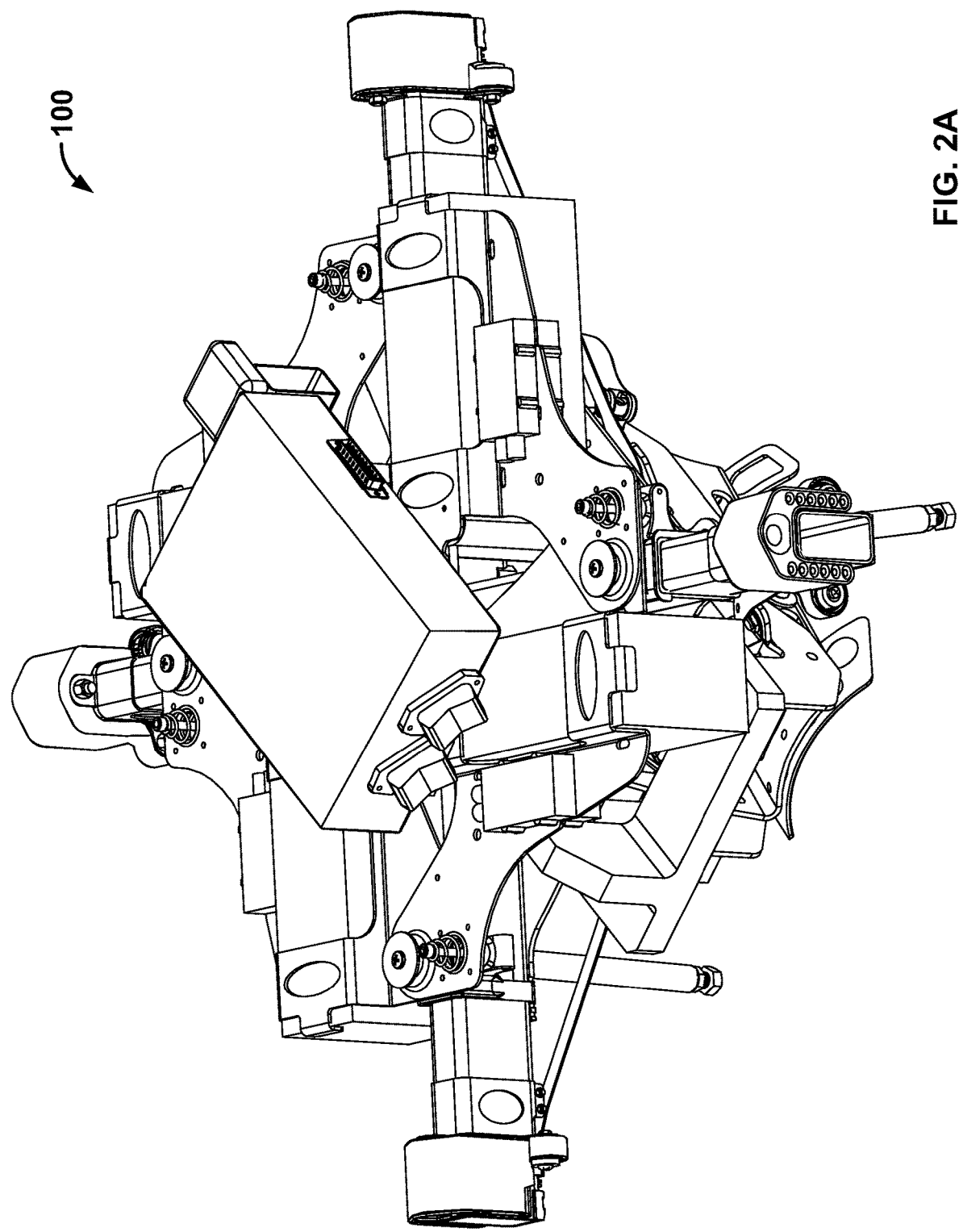
FIG. 2A is a top perspective view of the hub module of the multi-copter of FIG. 1A.
Figure 2B:
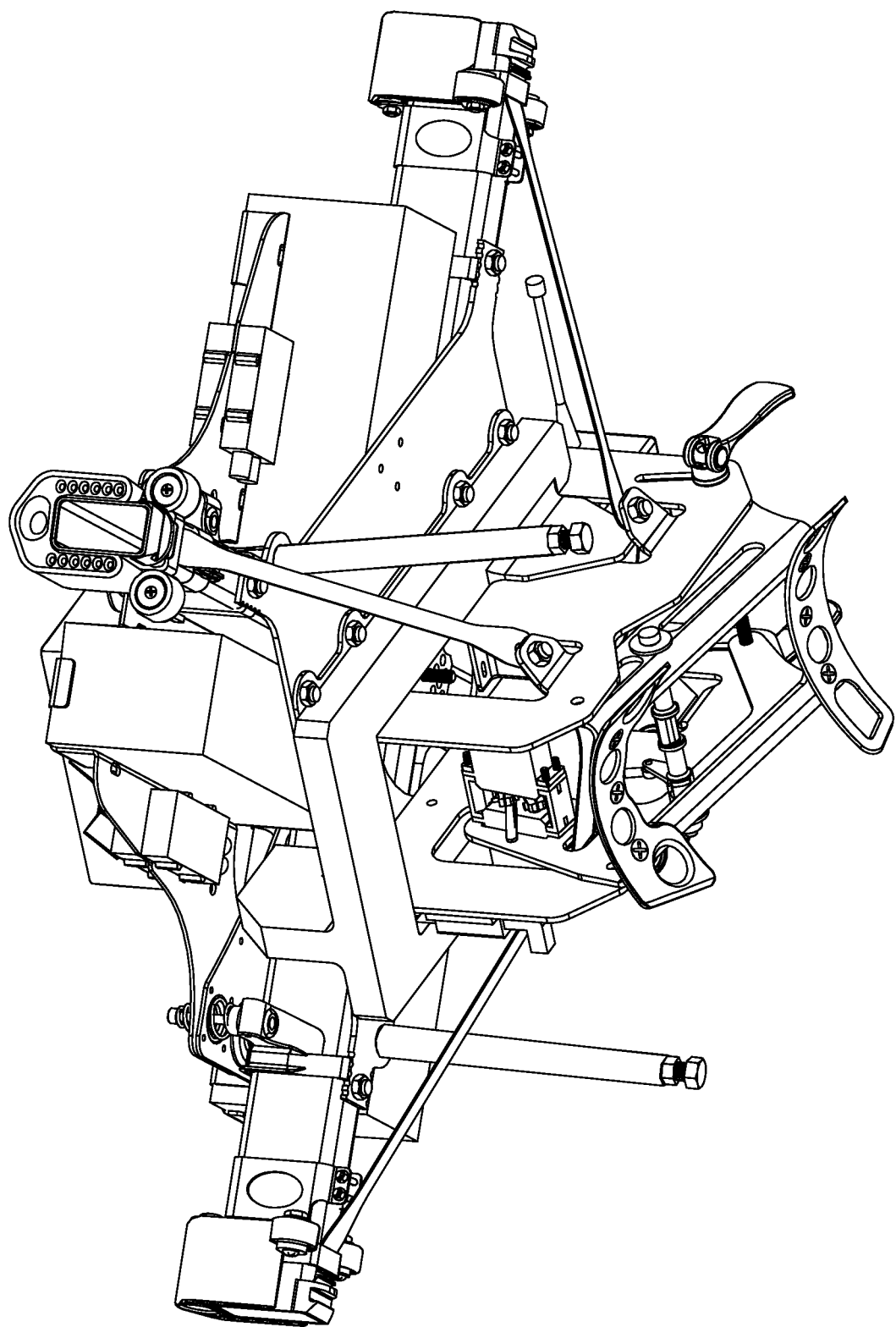
FIG. 2B is a bottom perspective view of the hub module of FIG. 2A.
Figure 2C:
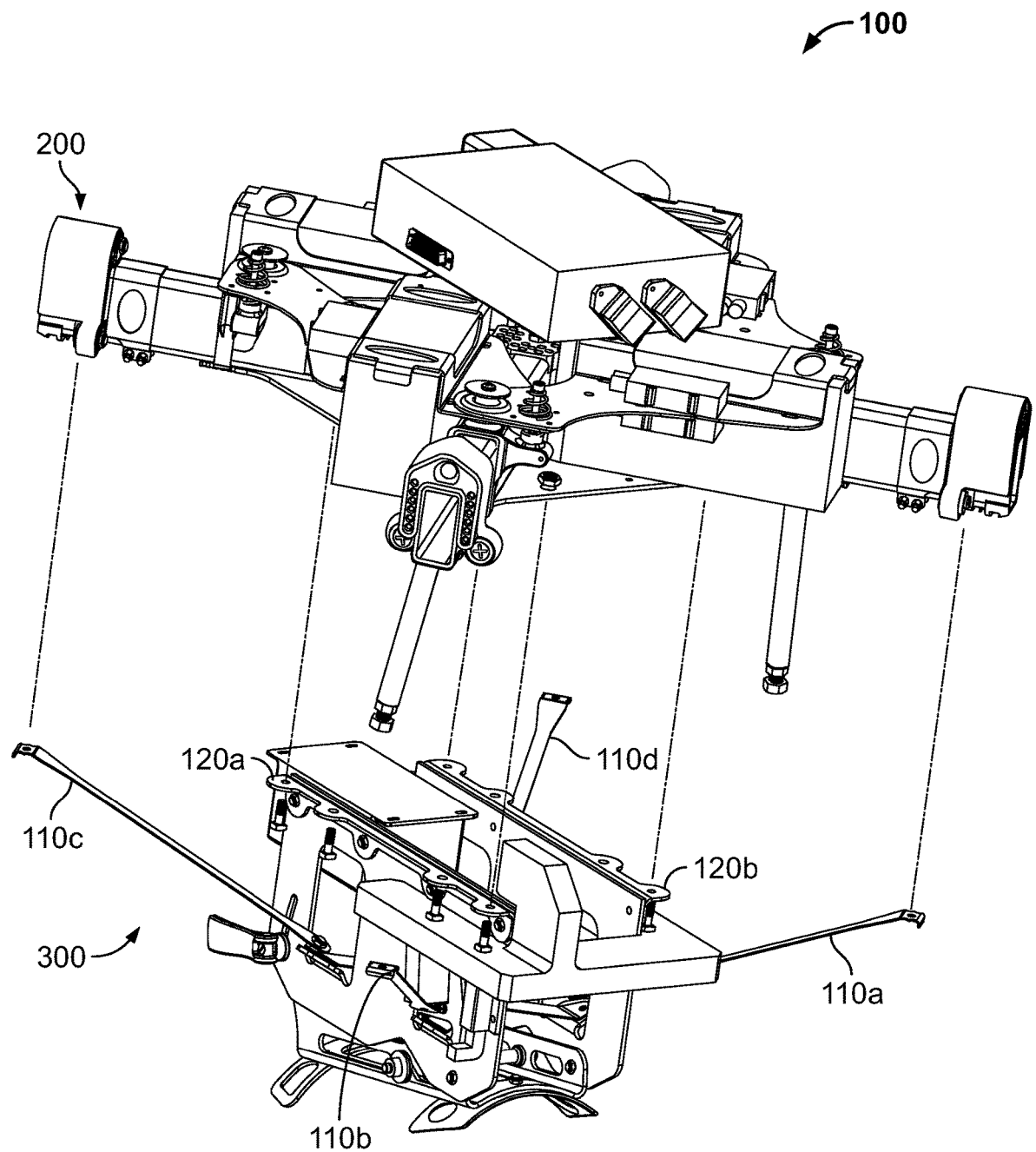
FIG. 2C is a partially exploded top perspective view of the hub module of FIG. 2A showing the hub base separated from the saddle.

FIGS. 2A, 2B, and 2C show the hub module 100. The hub module 100: (1) serves as the attachment point for the rotor arm modules 400a to 400d; (2) is the portion of the multi-copter 10 to which the fixed-wing aircraft 20 is attached for launch; (3) is the portion of the multi-copter 10 to which the flexible capture member 5000 is attached for retrieval of the fixed-wing aircraft 20; (4) includes the power source for the multi-copter 10; and (5) includes certain components used to control operation of the multi-copter 10.

As best shown in FIG. 2C, the hub module 100 includes a hub base 200 and a saddle 300. The saddle 300 is attached to the underside of the hub base 200 via two brackets 120a and 120b and four struts 110a, 110b, 110c, and 110d. Each strut 110 is attached at one end to the hub base 200 and at the other end to the saddle 300. This is merely one example of how the saddle can be attached to the hub base, and in other embodiments the saddle may be attached to the hub base in any suitable manner. For instance, in another embodiment, rather than being attached to the hub base, each strut is attached to a different rotor arm module, such as to one of the rotor motor assemblies of the rotor arm modules.

Hub Base

FIGS. 3A, 3B, 3C, 3D, 3E, 3F, 3G, and 3H show the hub base 200 or components thereof. The hub base 200 is the portion of the hub module 100 that: (1) serves as the attachment point for the rotor arm modules 400a to 400d; (2) includes the power source for the multi-copter 10; and (3) includes certain components used to control operation of the multi-copter 10.

Figure 3A:
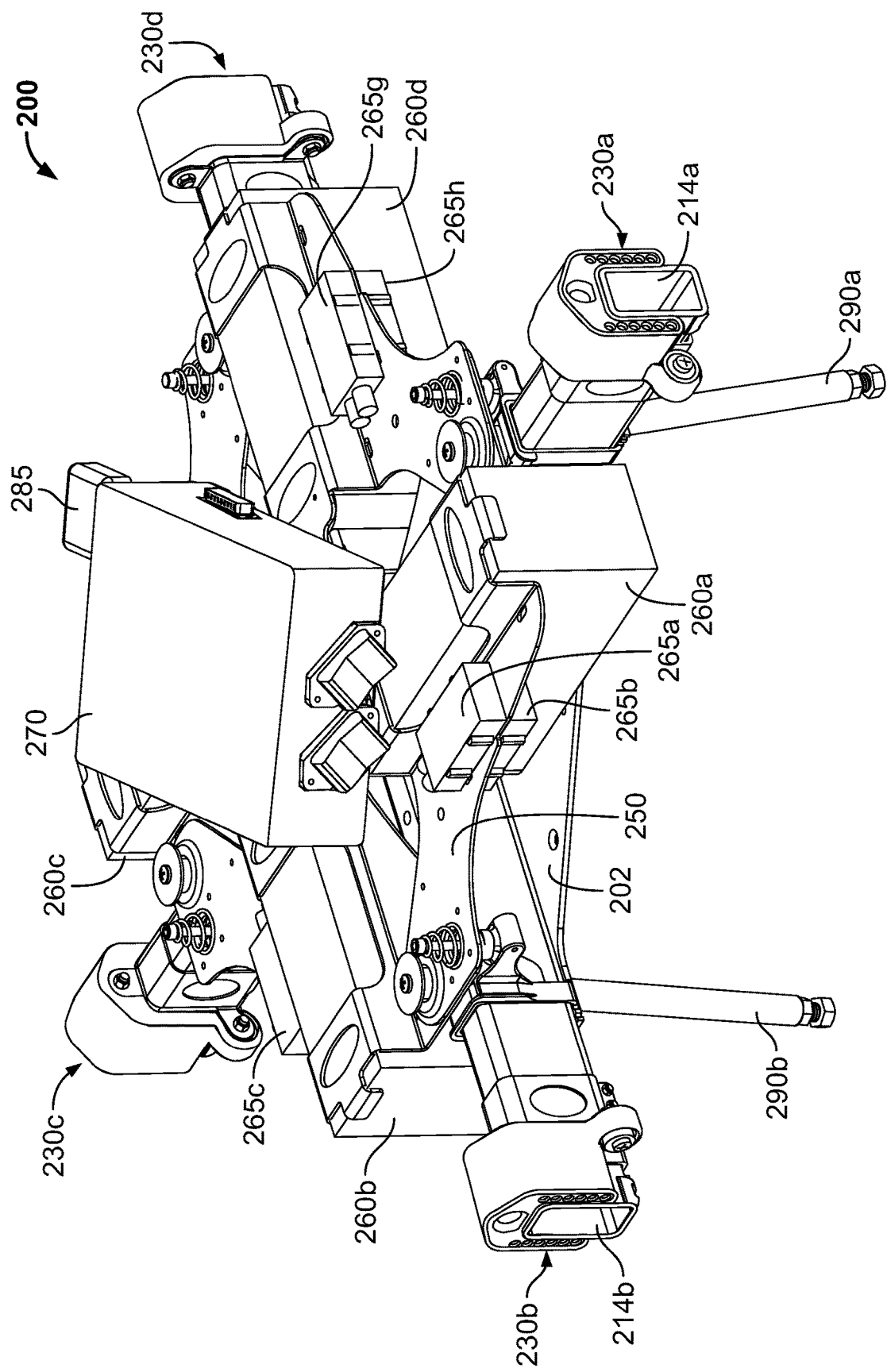
FIG. 3A is a top perspective view of the hub base of the hub module of FIG. 2A.
Figure 3B:
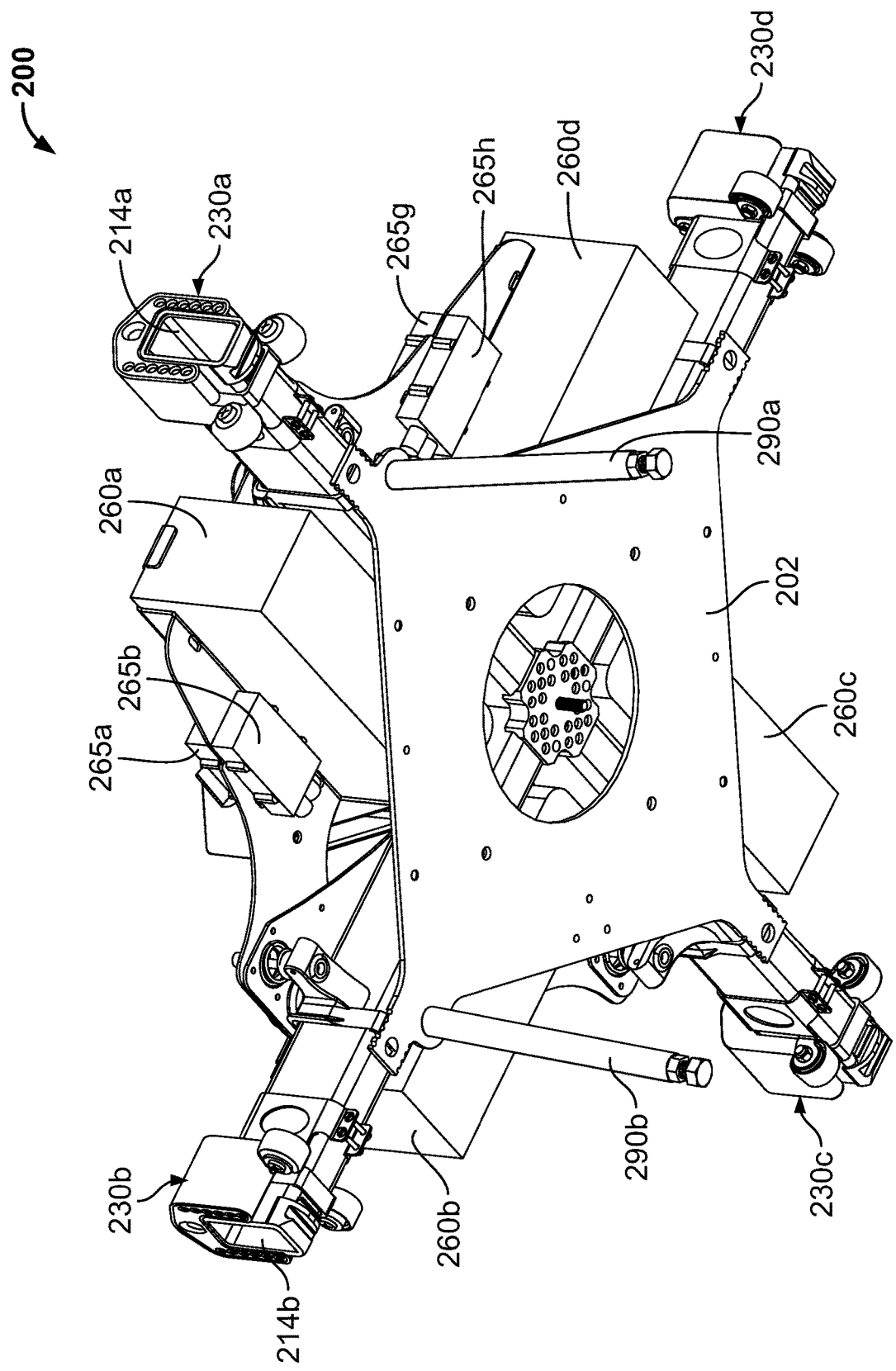
FIG. 3B is a bottom perspective view of the hub base of FIG. 3A.
Figure 3C:
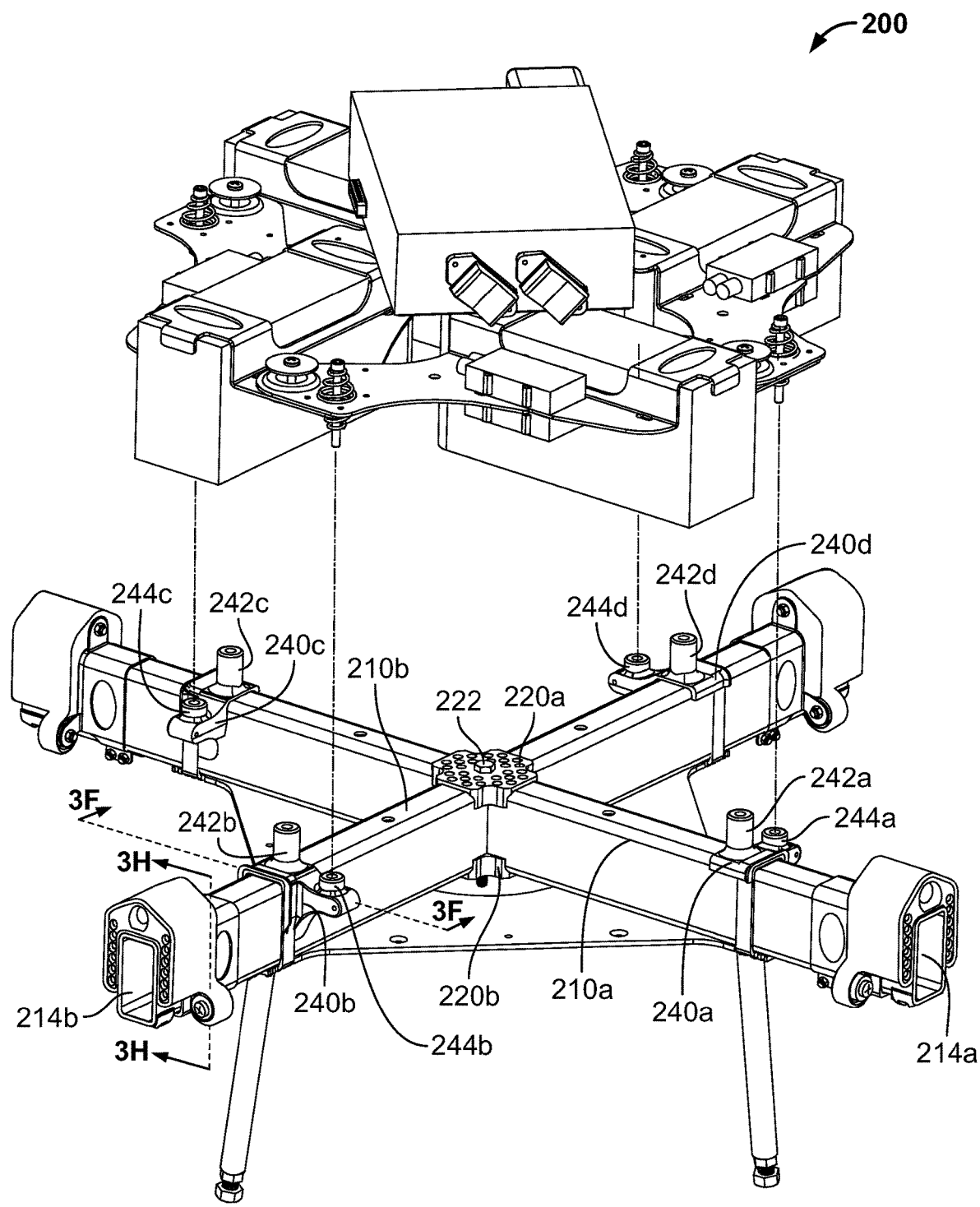
FIG. 3C is a partially exploded top perspective view of the hub base of FIG. 3A.
Figure 3D:
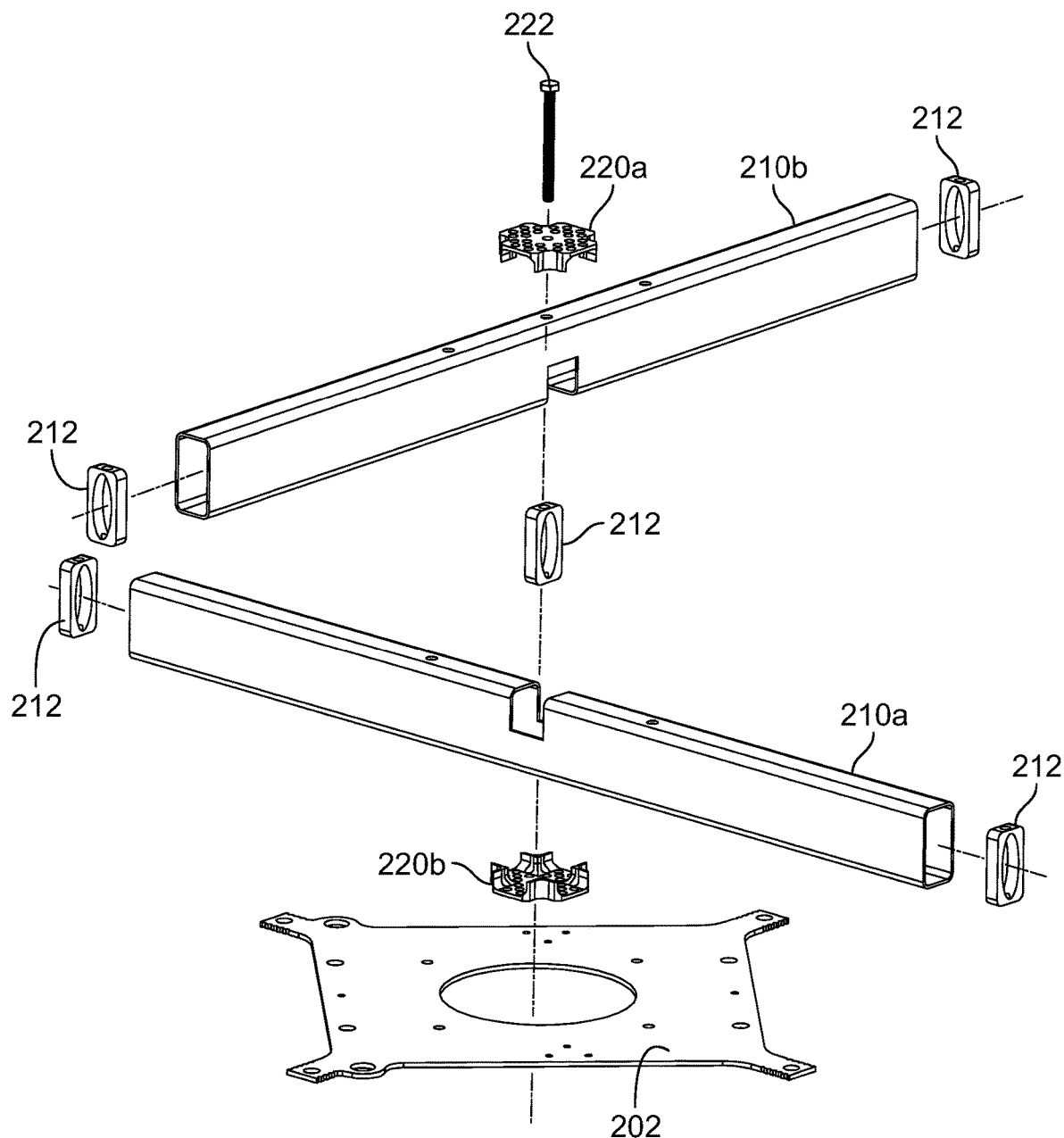
FIG. 3D is an exploded top perspective view of the supports and associated mounting hardware of the hub base of FIG. 3A.

As best shown in FIGS. 3C and 3D, the hub base 200 includes two hollow elongated rectangular supports 210a and 210b. The hollow supports 210a and 210b interlock with one another near their centers such that the hollow supports 210a and 210b are oriented transversely (such as generally perpendicularly) to one another and generally form a cross shape when viewed from above or below. Reinforcing plugs 212 are disposed within the hollow supports 210a and 210b such that fastener receiving openings (not labeled) of the reinforcing plugs 212 vertically align with fastener receiving openings (not labeled) of the hollow supports 210a and 210b. Upper and lower braces 220a and 220b sandwich the hollow supports 210a and 210b. A fastener 222 threaded through the upper brace 220a, the hollow support 210a, the reinforcing plug 212, the hollow support 210b, and the lower brace 220b holds the upper and lower braces 220a and 220b and the hollow supports 210a and 210b together. This ensures the hollow supports 210a and 210b remain interlocked and ensures their orientation with respect to one another does not substantially change.

The hollow supports 210a and 210b are attached to a hub base plate 202 via suitable fasteners (not labeled) threaded through the hollow supports 210a and 210b and the reinforcing plugs 212 disposed within the hollow supports 210a and 210b. As best shown in FIG. 2B, two stabilizers 290a and 290b are attached to and extend downward from either hollow support 210a and 210b. The free ends of the stabilizers 290a and 290b terminate in feet configured to contact the fixed-wing aircraft 20 to help prevent the fixed-wing aircraft 20 from rotating about its roll axis relative to the multi-copter 10. The feet are adjustable in length (e.g., are threaded such that they can be shortened by threading further into the stabilizers or lengthened by unthreading further out of the stabilizers).

As best shown in FIG. 3C, first and third isolator plate mounts 240a and 240c are attached (such as via lashing) to the hollow support 210a and second and fourth isolator plate mounts 240b and 240d are attached (such as via lashing) to the hollow support 210b radially-inward of the ends of the hollow supports 210a and 210b. Each isolator plate mount 240 includes a first isolator plate mounting post 242 defining a threaded fastener receiving opening at least partially therethrough and a second isolator plate mounting post 244 defining a threaded fastener receiving opening at least partially therethrough.

Figure 3E:
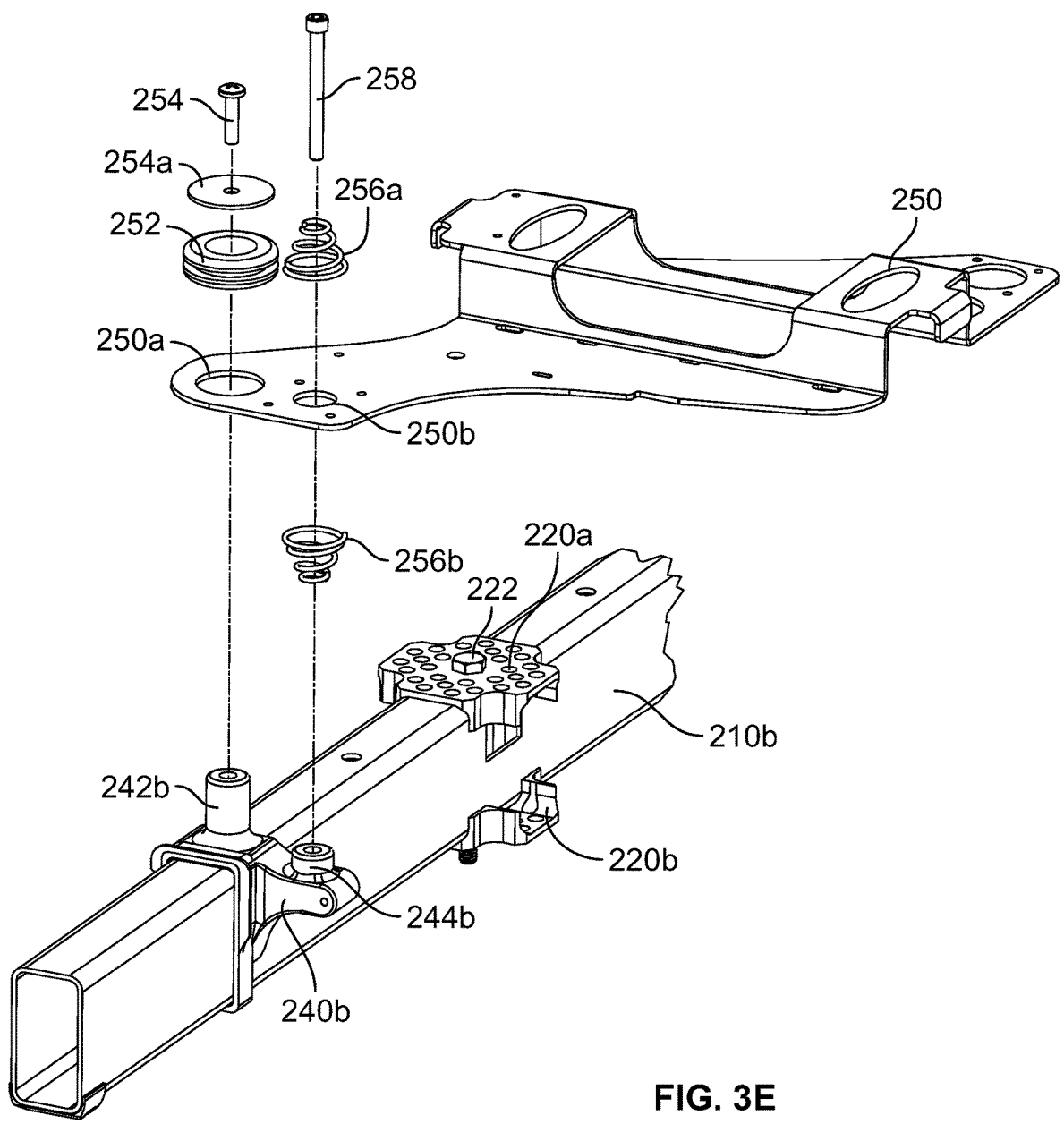
FIG. 3E is an exploded top perspective view of the isolator plate and associated mounting hardware of the hub base of FIG. 3A.
Figure 3F:
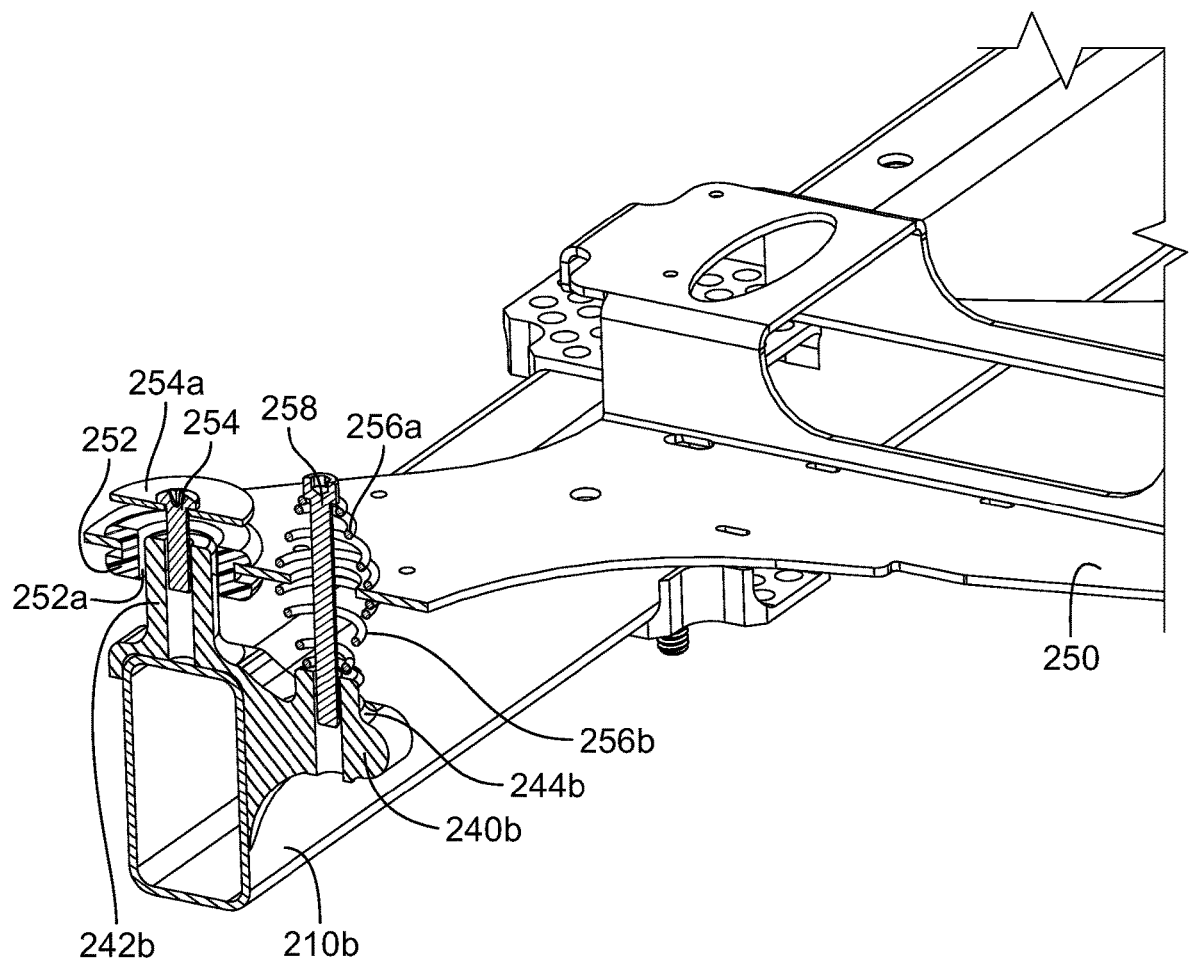
FIG. 3F is a partial cross-sectional view of one of the isolator plate mounts of the hub base of FIG. 3A taken substantially along line 3F-3F of FIG. 3C.

An isolator plate 250 is slidably mounted to the isolator plate mounts 240a, 240b, 240c, and 240d. FIGS. 3E and 3F show how the isolator plate 250 is mounted to the isolator plate mount 240b. For simplicity and brevity, illustrations of how the isolator plate 250 is mounted to the remaining three isolator plate mounts 240a, 240c, and 240d in a similar manner are not provided.

The isolator plate 250 defines first and second mounting openings 250a and 250b therethrough. An elastomeric grommet 252 is installed in the first mounting opening 250a of the isolator plate 250. The grommet 252 defines a first isolator plate mounting post receiving channel 252a therethrough, and the first isolator plate mounting post 242b is slidably received in the first isolator plate mounting post receiving channel 252a. A fastener 254 having a stop washer 254a beneath its head is partially threaded into the fastener receiving opening of the first isolator plate mounting post 242b. Upper and lower conical springs 256a and 256b—held in place by a fastener 258 partially threaded into the fastener receiving opening of the second isolator plate mounting post 244b—sandwich the isolator plate 250.

The hollow support 210b and the stop washer 254a constrain the vertical movement of the isolator plate 250. In other words, the isolator plate 250 can move vertically between a lower position in which the grommet 252 contacts the hollow support 210b and an upper position in which the grommet 252 contacts the stop washer 254a. The conical springs 256a and 256b act as a suspension that absorbs (or partially absorbs) vibrations of the hollow support 210b that would otherwise be directly transferred to the isolator plate 250, which could affect operation of certain components of the multi-copter 10 (such as the controller 272).

The relatively high mass of the batteries 260a to 260d and the fact that they are mounted to the isolator plate 250 and close-coupled to the controller 272 and the IMU 277 to help prevent undesired vibration of the isolator plate 250 and therefore the controller 272 and the IMU 277. In certain embodiments, for the controller 272 to perform well, the IMU 277 must resolve accelerations on the order of 0.1 gee and rotations of 0.1 radians/second. In various embodiments, the controller 272 cannot do this reliably when (~10-gee) vibration, caused by rotor unbalance, for example, is transmitted from the airframe of the multi-copter 10 to the IMU 277. When the mass of the batteries 260a to 260d is used to ballast the IMU 277 on the isolator plate 250, and the isolator plate 250 is anchored to the airframe structure through the suspension, the IMU 277 enjoys the vibration-free mounting location. By mounting the isolator plate 250 well-outboard at its corners, the IMU 277 remains sufficiently well-coupled to the airframe that pitch and roll movements are transmitted to the IMU 277, which is able to effectively resolve these motions.

As best shown in FIGS. 3A and 3B, The following components are mounted to the isolation plate 250: (1) the batteries 260a, 260b, 260c, and 260d (which are received in respective battery receivers (not labeled) configured to retain the batteries and to electrically connect the batteries (such as via suitable wiring electrically connectable to the batteries) to components of the multi-copter to power those components); (2) the ESCs 265a to 265h; (3) an avionics enclosure 270 that houses a variety of components including the controller 272, the telemetry link 274, and the R/C receiver 276; (4) a GPS receiver mounting bracket 280 on which the GPS receiver 285 is mounted; (5) navigation lights (not shown); and (6) a Mode C transponder (not shown).

The four open ends of the hollow supports 210a and 210b form rotor arm module receiving sockets that can receive one of the rotor arm modules 400a to 400d. Specifically, the hollow support 210a forms a first rotor arm module receiving socket 214a and a third rotor arm module receiving socket (not shown) and the hollow support 210b forms a second rotor arm module receiving socket 214b and a fourth rotor arm module receiving socket (not shown).

As best shown in FIG. 3A, female blind mate assemblies 230 are attached to the ends of the hollow supports 210a and 210b. Specifically, a first female blind mate assembly 230a is attached to one end of the hollow support 210a near the first rotor arm module receiving socket 214a, a second female blind mate assembly 230b is attached to one end of the hollow support 210b near the second rotor arm module receiving socket 214b, a third female blind mate assembly 230c is attached to the other end of the hollow support 210a near the third rotor arm module receiving socket 214c, and a fourth female blind mate assembly 230d is attached to the other end of the hollow support 210b near the fourth rotor arm module receiving socket 214d.

The female blind mate assemblies 230 (along with the corresponding male blind mate connectors described below with respect to the rotor arm modules) facilitate: (1) mechanical attachment of the rotor arm modules 400a, 400b, 400c, and 400d to the hub module 100; (2) power flow from the battery(ies) 260a, 260b, 260c, and/or 260d to the rotor motors 465a to 465h of the rotor arm modules 400a, 400b, 400c, and 400d; and (3) communication between the ESCs 265a to 265h and the rotor motors 465a to 465h.

Figure 3G:
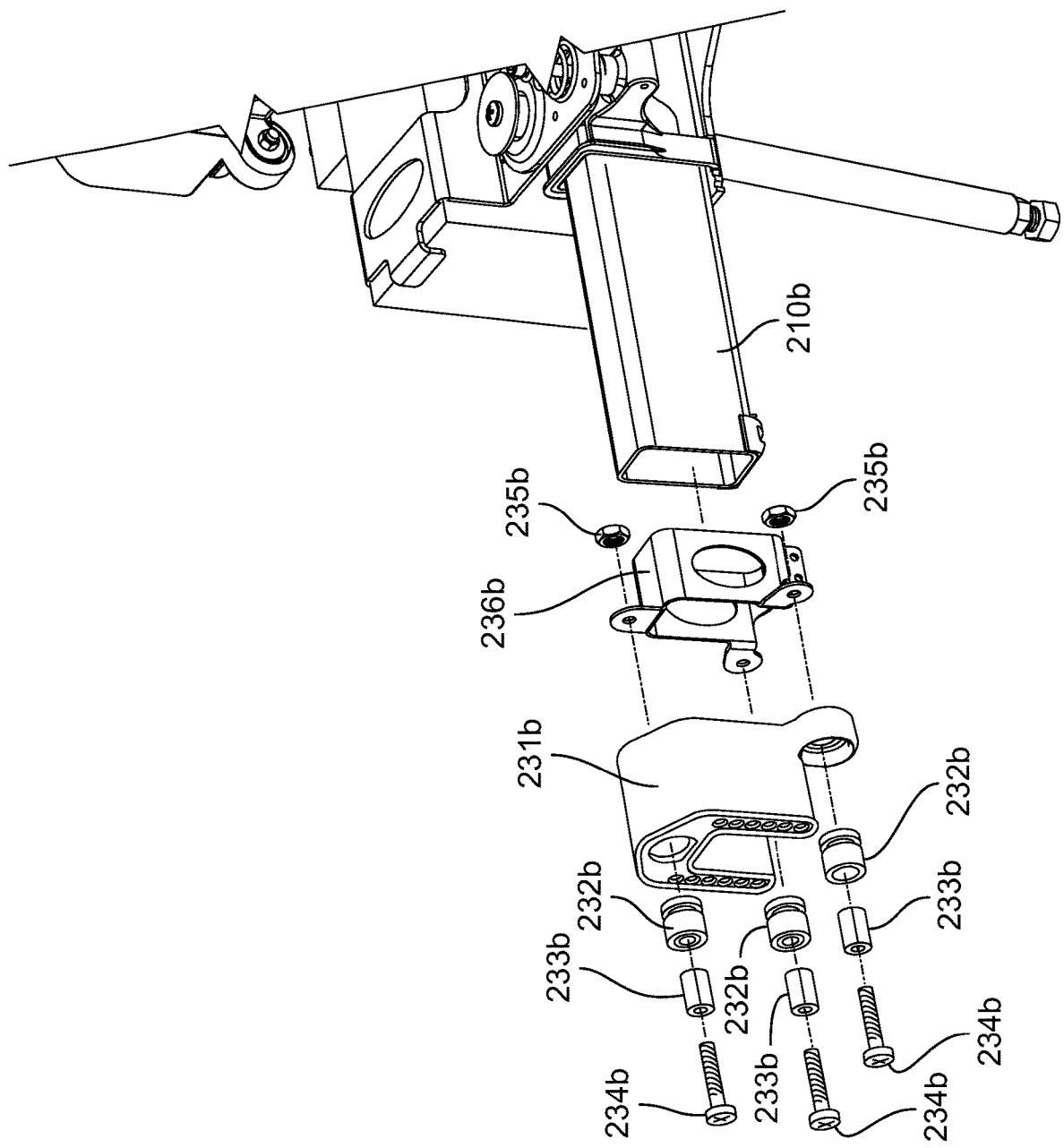
FIG. 3G is a partially exploded top perspective view of one of the female blind mate assemblies of the hub base of FIG. 3A.
Figure 3H:
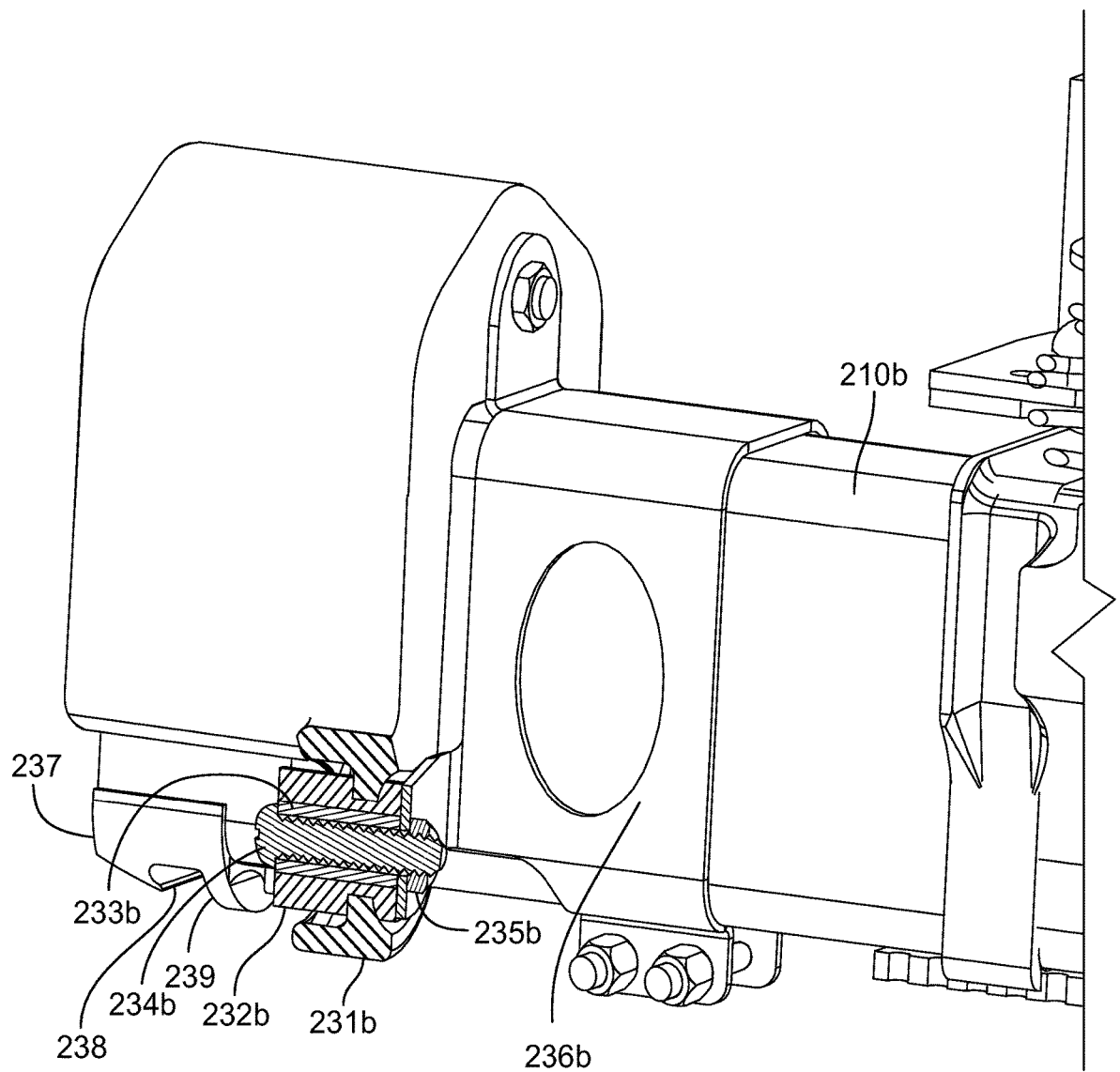
FIG. 3H is a partial cross-sectional view of one of the flexural mounts of the female blind mate assembly of FIG. 3G taken substantially along line 3H-3H of FIG. 3C.

FIGS. 3G and 3H show the second female blind mate assembly 230b. The female blind mate assemblies 230a, 230c, and 230d are similar to the second female blind mate assembly 230b and are not separately shown or described for brevity.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

Although not shown for clarity, the female blind mate connector 231b and, particularly, the pin receptacles, are electrically connected to the corresponding ESCs 265c and 265d via wiring. In this example embodiment, the female blind mate connector 231b includes 12 pin receptacles, six of which are connected to the ESC 265c via wiring and the other six of which are connected to the ESC 265d via wiring.

The mounting bracket 236b is positioned at a desired location along the hollow support 210b, and the mounting bracket fasteners are tightened to clamp the mounting bracket 236b in place relative to the hollow support 210b.

The female blind mate connector 231b is flexurally mounted to the mounting bracket 236b via the elastomeric grommets 232b, the spacers 233b, the fasteners 234b, and the nuts 235b. Specifically, the elastomeric grommets 232b are fitted into corresponding cavities in the female blind mate connector 231b. As best shown in FIG. 3H, each cavity includes an inwardly-projecting annular rib that fits into a corresponding annular cutout of the corresponding elastomeric grommet 232b. The spacers 233b are disposed within longitudinal bores defined through the elastomeric grommets 232b. The fasteners 234b extend through the hollow spacers 233b and through corresponding fastener receiving openings defined through the mounting bracket 236b into their corresponding nuts 235b. This secures the female blind mate connector 231b to the mounting bracket 236b.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached rotor arm module during flight. Because the female blind mate connector is not rigidly attached to the corresponding mounting bracket, it is less likely that the pins of the male blind mate connector (described below) received by the pin receptacles of the female blind mate connector will lose electrical contact—causing the multi-copter 10 to lose control of at least one of its rotor motors—when loads are applied to the female blind mate connector.

As best shown in FIG. 3H, a latch plate 237 is attached to the underside of each hollow support 210a and 210b below each female blind mate connector 231 attached thereto. The latch plate 237 includes a claw engager 238 and a backstop 239. The latch plate 237 is described below with respect to the locking assemblies 420 of the rotor arm modules 400a to 400d.

In some embodiments, the hub module (either the hub base, the saddle, or both) or other elements of the multi-copter include ballast to obtain a desired weight distribution and/or provide stability during flight.

Saddle

FIGS. 4A, 4B, 4C, 4D, 4E, 4F, 4G, 4H, 4I, and 4J show the saddle 300 or components thereof. The saddle 300 is the portion of the hub module 100: (1) to which the fixed-wing aircraft 20 is attached for launch; (2) from which the fixed-wing aircraft 20 is detached for launch; and (3) to which the flexible capture member 5000 is attached for retrieval of the fixed-wing aircraft 20. The saddle 300 also enables the operator to vary the pitch angle of the fixed-wing aircraft 20 relative to the multi-copter 10.

Figure 4A:
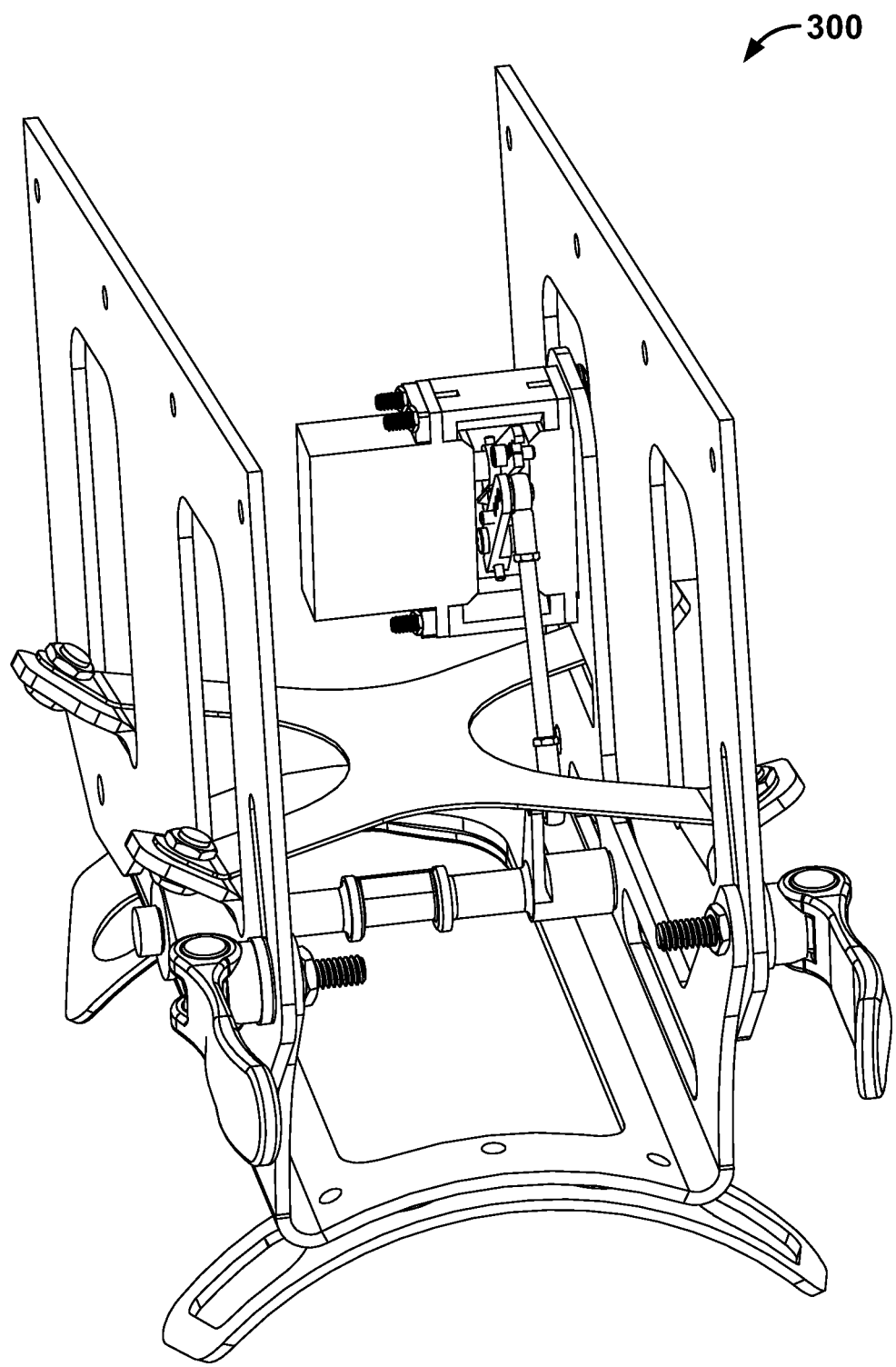
FIG. 4A is a top perspective view of the saddle of the hub module of FIG. 2A.
Figure 4B:
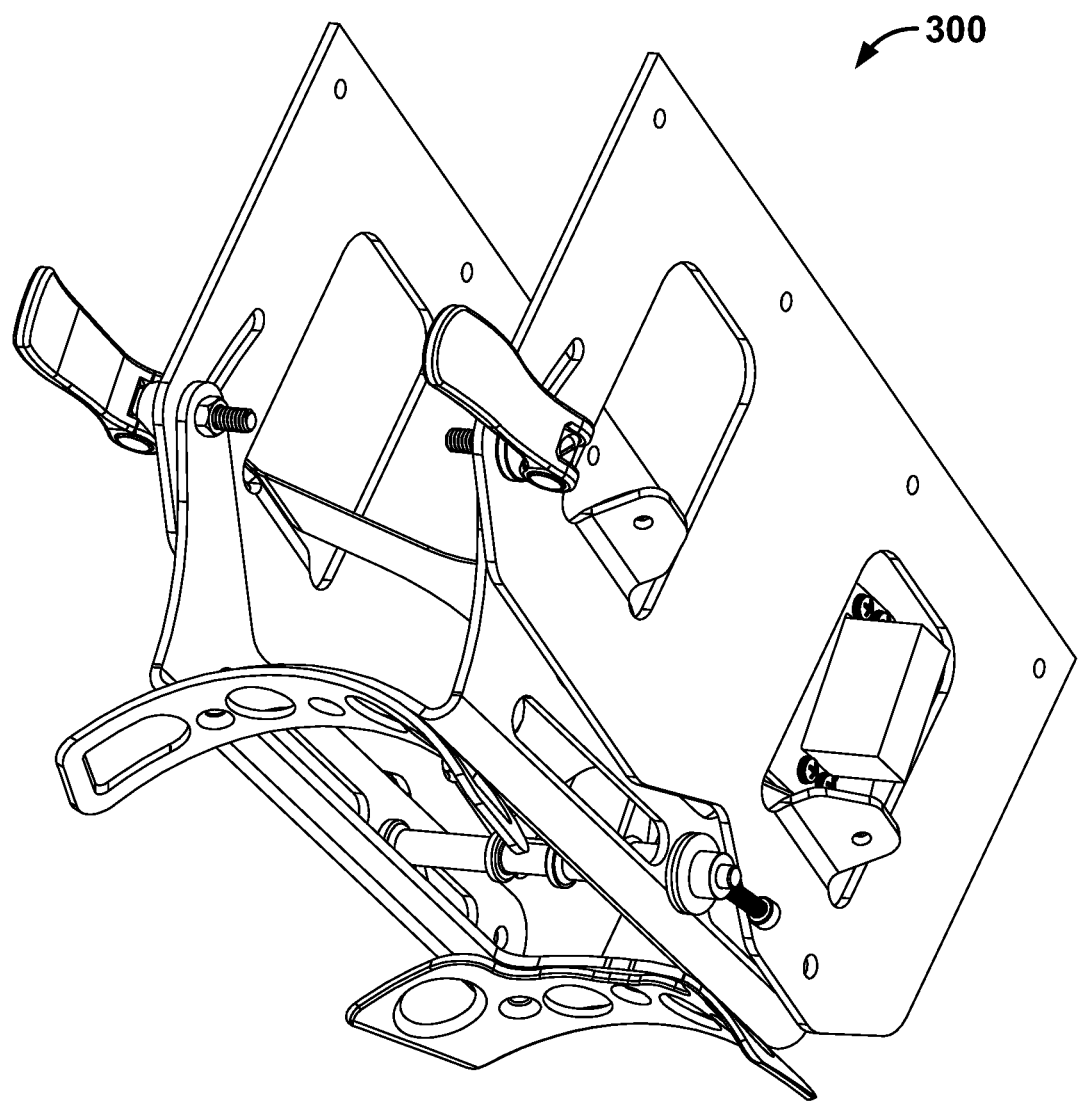
FIG. 4B is a bottom perspective view of the saddle of FIG. 4A.
Figure 4C:
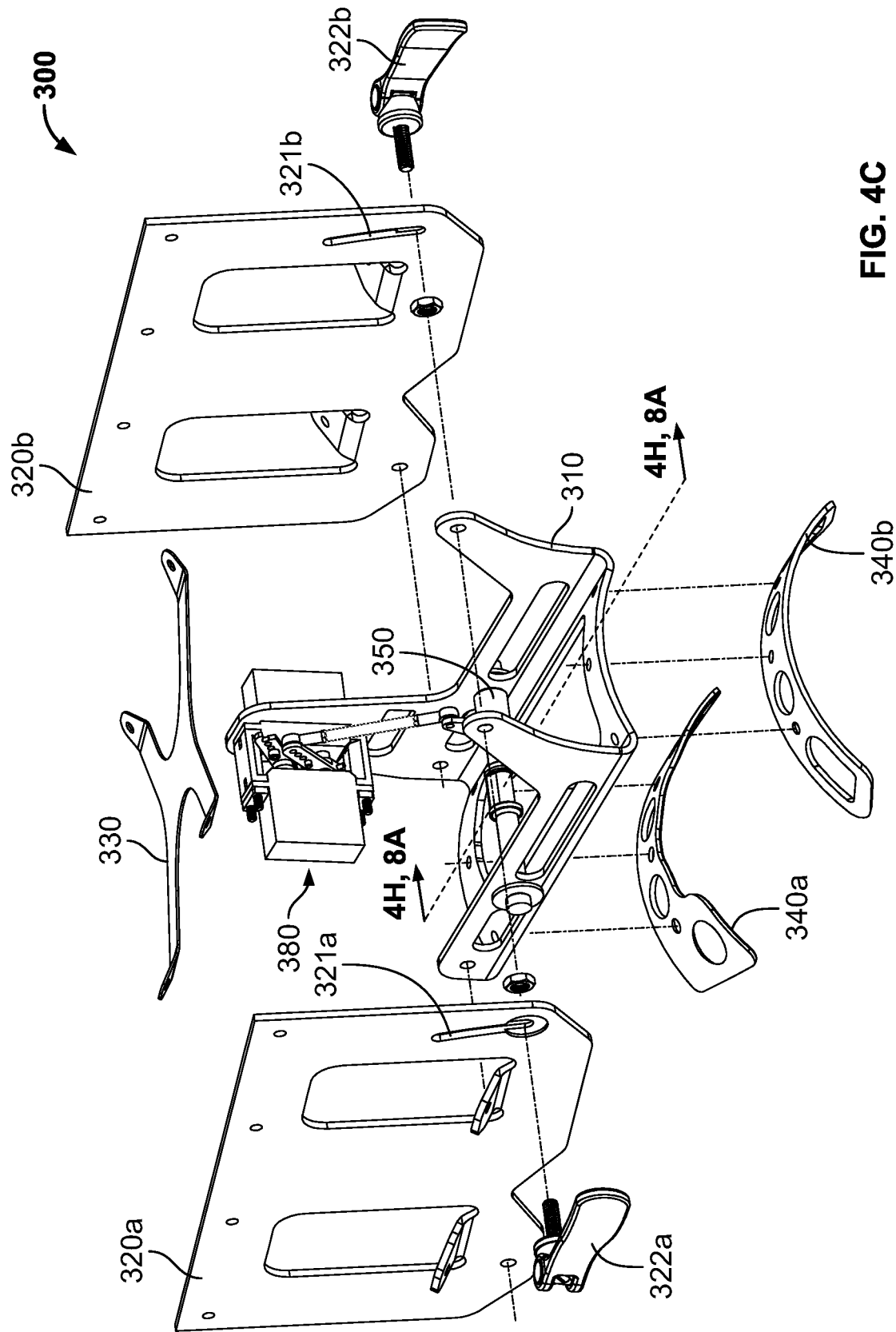
FIG. 4C is a partially exploded top perspective view of the saddle of FIG. 4A.

As best shown in FIG. 4C, the saddle 300 includes a saddle base bracket 310 and first and second saddle side plates 320a and 320b. The first and second saddle side plates 320a and 320b are pivotably connected to opposite sides of the saddle base bracket 310 near the front end of the saddle base bracket 310. The first and second saddle side plates 320a and 320b are also attached to opposite sides of the saddle base bracket 310 near the rear end of the saddle base bracket 310 via locking devices 322a and 322b (which are cam lever locks in this example embodiment but can be any suitable locking devices). The locking devices 322a and 322b extend through respective slots 321a and 322b defined through the respective first and second side plates 320a and 320b.

Figure 4D:
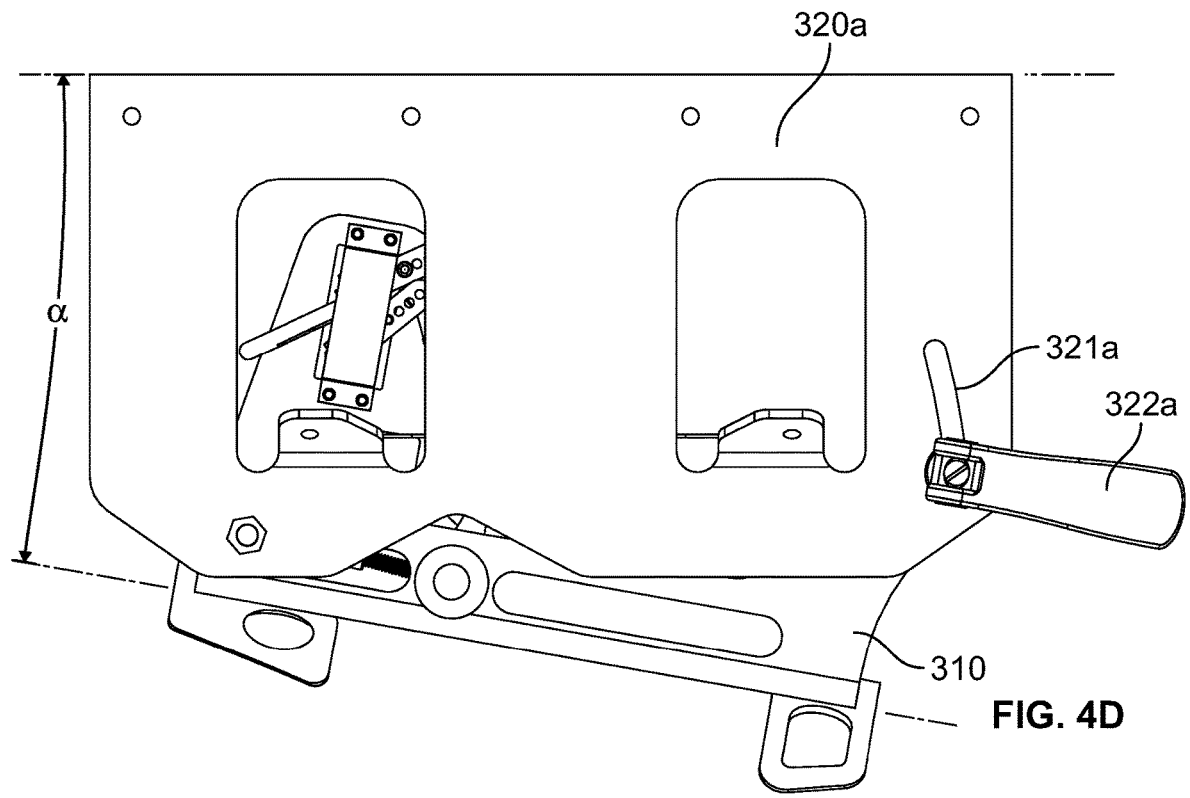
FIGS. 4D and 4E are side elevational views of the saddle of FIG. 4A showing different positions of the saddle.
Figure 4E:
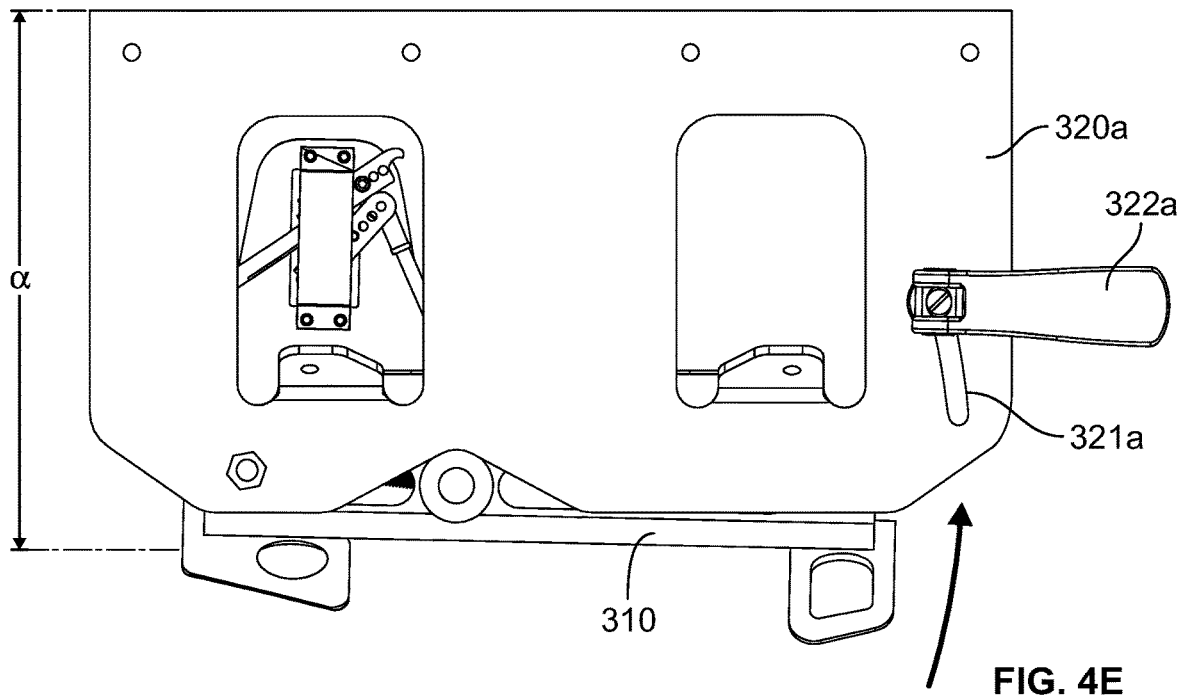

As shown in FIGS. 4D and 4E, the orientation of the slots 321a and 321b enables an operator to vary the angle α formed between a plane including the tops of the first and second saddle side plates 320a and 320b—to which the hub base 200 is attached—and a plane including the generally horizontally extending bottom portion of the saddle base plate 310. Plane as used herein can mean either a physical plane or a virtual reference plane. The angle α generally corresponds to the angle formed between the hub base plate 202 of the hub base 200 and the fuselage of the fixed-wing aircraft 20 when the fixed-wing aircraft 20 is attached to the saddle 300. To change the angle α, the operator unlocks the locking devices 322a and 322b, rotates the first and second side plates 320a and 320b relative to the saddle base bracket 310 around their pivotable attachments to the saddle base bracket 310 to the desired rotational position (or vice-versa), and re-locks the locking devices 322a and 322b. In this example embodiment, the angle α is variable from about 0 degrees to about 10 degrees, though in other embodiments the angle α is variable between any suitable angles.

In certain embodiments, an operator can cause the first and second side plates to rotate relative to the saddle while the multi-copter 10 is flying. For instance, the operator may desire to release the fixed-wing aircraft nose-down from a hover. Conversely, the operator may desire to release the fixed-wing aircraft nose-up (such as nose-up about 10 degrees) to facilitate launch while the multi-copter is dashing forward (this nose-up pitch reduces wind drag and better-aligns the thrust vector of the fixed-wing aircraft with the desired direction of travel). The multi-copter may include any suitable combination of elements to facilitate this remote pivoting, such as various motors, actuators, and the like.

As best shown in FIGS. 4A, 4B, and 4C, a stabilizing bracket 330 is attached to the first and second saddle side plates 320a and 320b and extends across the space between the first and second saddle side plates 320a and 320b. A downwardly-curved front aircraft engaging bracket 340a is attached to the underside of the saddle base bracket 310 near the front of the saddle base bracket 310. A downwardly-curved rear aircraft engaging bracket 340b is attached to the underside of the saddle base bracket 310 near the rear of the saddle base bracket 310.

Figure 4F:
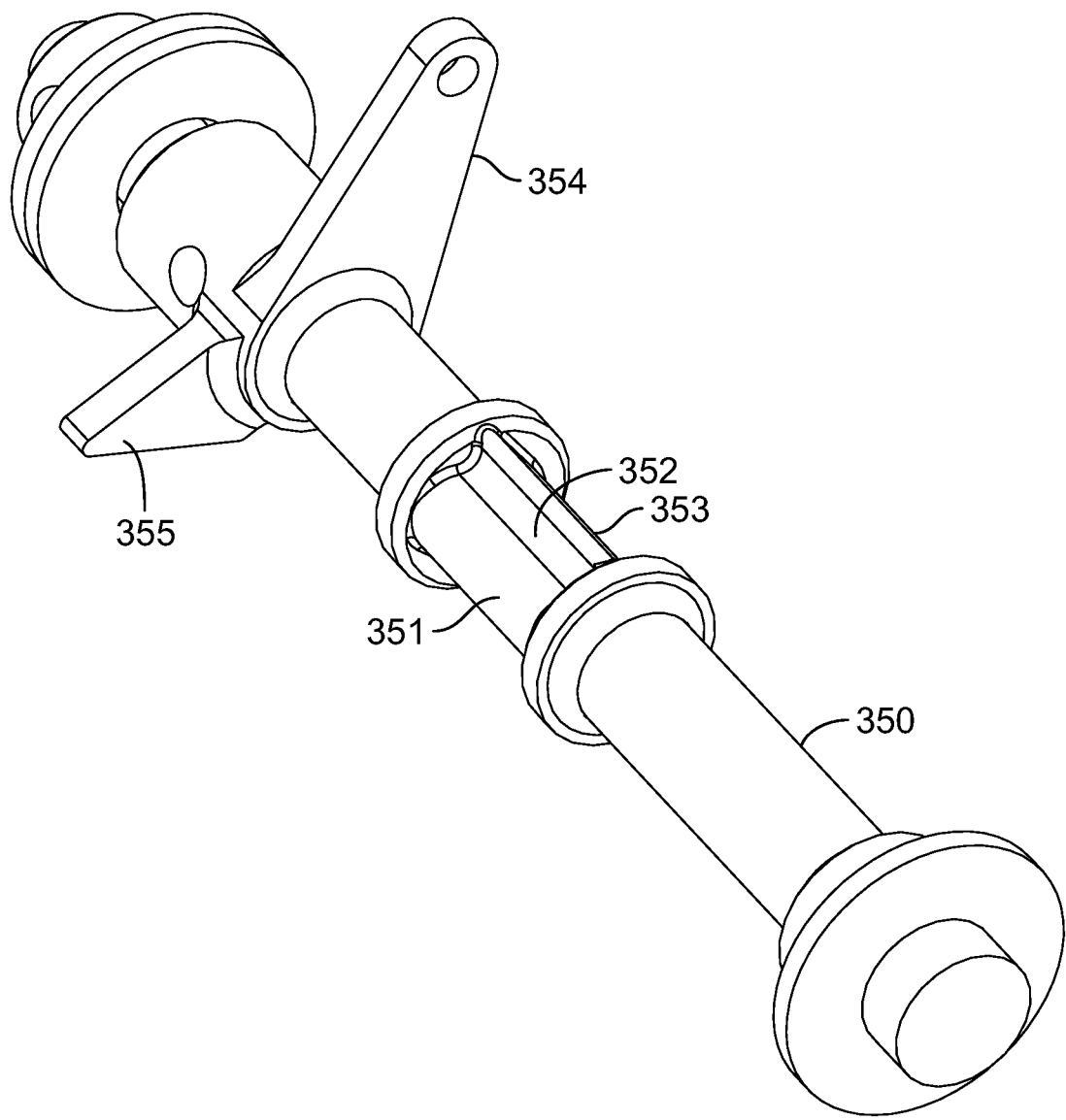
FIG. 4F is a top perspective view of the cam of the saddle of FIG. 4A.
Figure 4G:
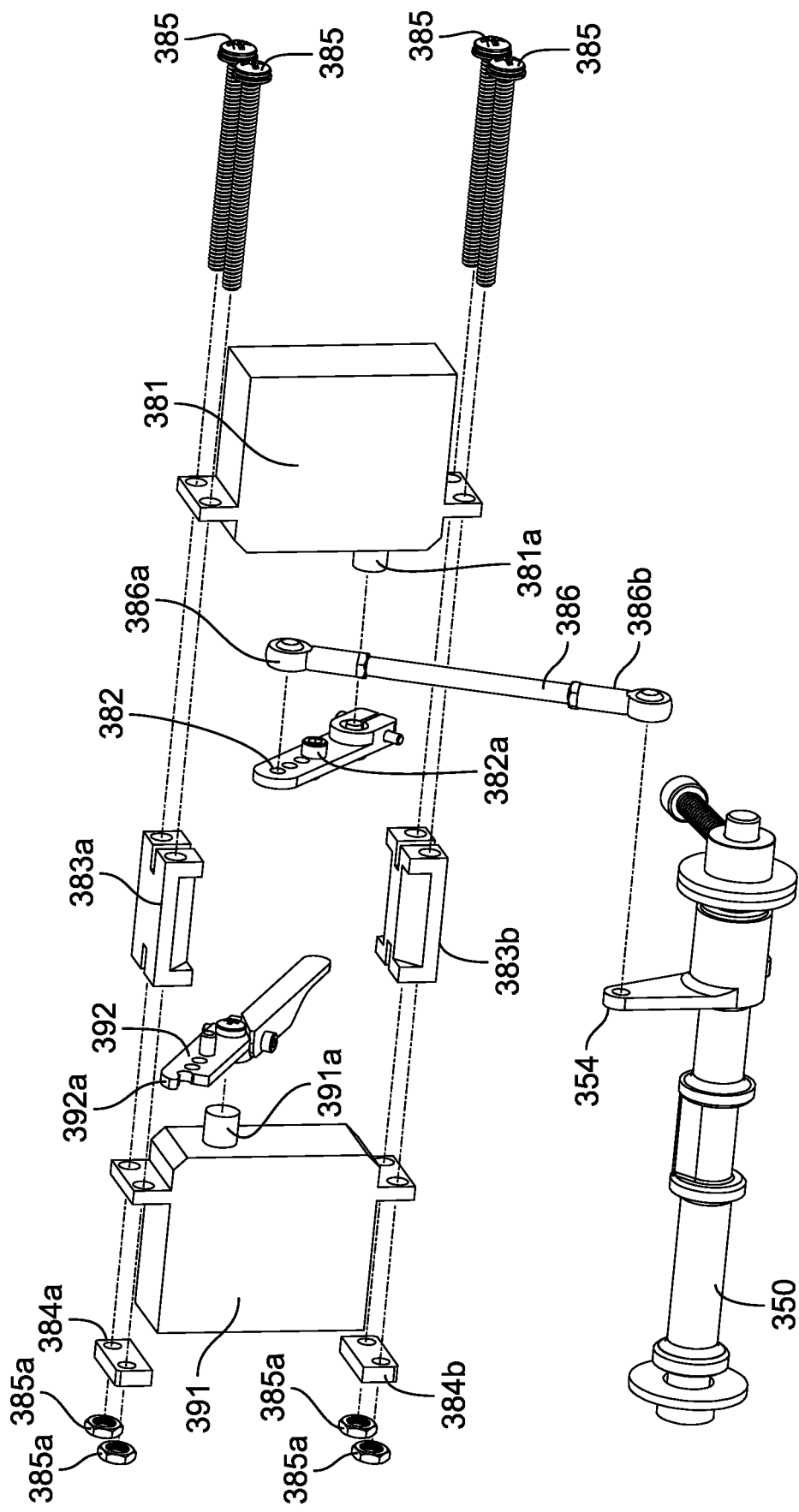
FIG. 4G is an exploded top perspective view of the aircraft attaching/detaching assembly and the cam of the saddle of FIG. 4A.
Figure 4H:
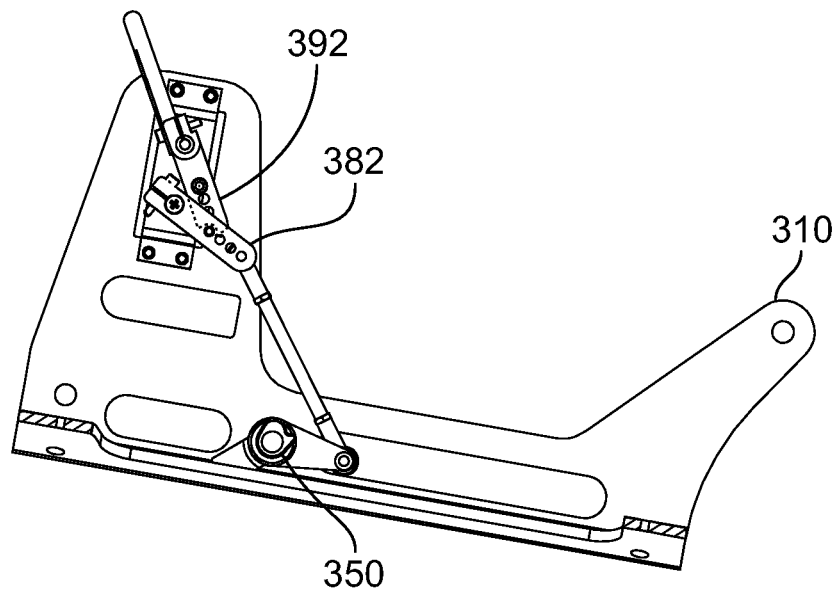
FIG. 4H is a partial cross-sectional view of the saddle of FIG. 4A taken substantially along line 4H-4H of FIG. 4C.
Figure 4I:
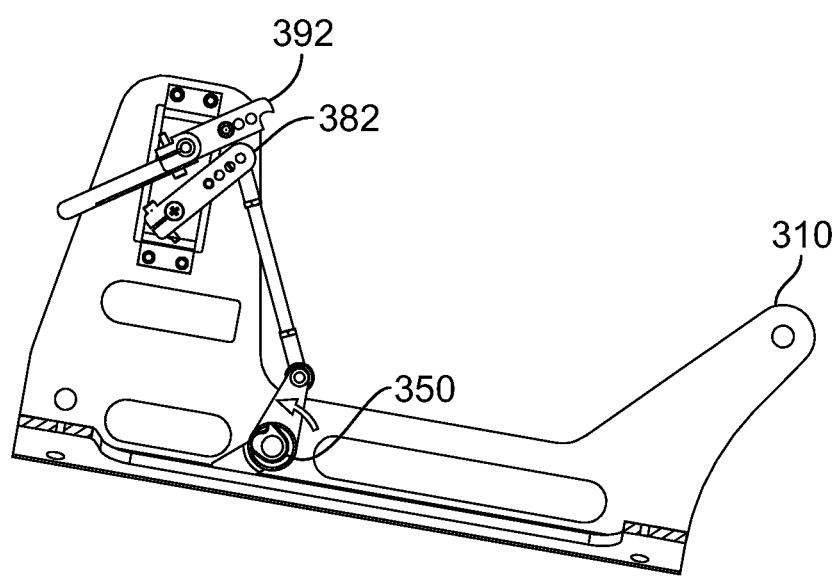
FIG. 4I is a partial cross-sectional view of the saddle of FIG. 4A showing the cam in a detached rotational position taken substantially along line 4H-4H of FIG. 4C.

As best shown in FIG. 4C, a cam 350 is rotatably attached to and extends across the width of the saddle base bracket 310 such that the cam 350 is transverse (such as generally perpendicular) to the first and second saddle side plates 320a and 320b. As best shown in FIGS. 4F, 4H, and 4I, the portion of the cam 350 near its longitudinal center has an irregularly-shaped profile including a first relatively wide ridge 351, a second relatively narrow ridge 353, and a valley 352 between the first and second ridges 351 and 353. This irregularly-shaped profile facilitates attaching the fixed-wing aircraft 20 to the cam 350 (and therefore to the multi-copter 10) and detaching the fixed-wing aircraft 20 from the cam 350 (and therefore from the multi-copter 10), as described below with respect to FIGS. 8A, 8B, and 8C. The cam 350 also includes a cam control arm 354 and a foot 355 extending transversely (such as generally perpendicularly) from the longitudinal axis of the cam 350.

An aircraft attaching/detaching assembly 380 attached to the saddle base bracket 310 controls rotation of the cam 350 relative to the saddle base bracket 310. As best shown in FIG. 4G, the aircraft attaching/detaching assembly 380 includes: (1) a cam servo motor 381 having a cam servo motor shaft 381a; (2) a cam servo motor arm 382; (3) a cam servo motor arm lock device 382a; (4) upper and lower servo spacers 383a and 383b; (5) upper and lower nut plates 384a and 384b; (6) fasteners 385; (7) a cam rotation control link 386 having connectors 386a and 386b at either end; (8) a lock servo motor 391 having a lock servo motor shaft 391a; and (9) a lock servo motor arm 392 terminating at one end in a lock servo motor locking extension 392a.

The cam servo motor 381 and the lock servo motor 391 are attached to one another and to the saddle base bracket 310 via the fasteners 385, the upper and lower servo spacers 383a and 383b, and the upper and lower nut plates 384a and 384b. The cam servo motor arm 382 is attached near one end to the cam servo motor shaft 381a and near the other end to the connector 386a. The connector 386b is attached to the cam control arm 354 of the cam 350, which links the cam servo motor shaft 381a to the cam 350. The cam servo motor arm lock device 382a is attached to the cam servo motor arm 382 between the connector 386a and the cam servo motor shaft 381a. The lock servo motor arm 392 is attached to the lock servo motor shaft 391a. The rearwardly-extending portion of the lock servo motor arm 392 terminates in the lock servo motor locking extension 392a, which is engageable to the cam servo motor arm lock device 382a in certain instances.

The cam servo motor 381 controls rotation of the cam 350 relative to the saddle base bracket 310. To rotate the cam 350, the cam servo motor 381 rotates the cam servo motor shaft 381a, which rotates the attached cam servo arm 382, which in turn rotates the cam 350 via the cam rotation control link 386. The cam servo motor 381 can rotate the cam 350 from an attached rotational position—shown in FIG. 4H—to a detached rotational position—shown in FIG. 4I (and vice-versa).

The lock servo motor 391 controls rotation of the lock servo motor arm 392 between a cam rotation-preventing rotational position—shown in FIG. 4H—and a cam rotation-enabling rotational position—shown in FIG. 4I (and vice-versa). When the cam 350 is in the attached rotational position and the lock servo motor arm 392 is in the cam rotation-preventing rotational position, the lock servo motor locking extension 392a engages the cam servo motor arm lock device 382a of the cam servo motor arm 382. This prevents the cam servo motor 381 from rotating the cam 350 from the attached rotational position to the detached rotational position.

FIGS. 4H and 4I show how the cam servo motor 381 and the lock servo motor 391 operate to rotate the cam 350 from the attached rotational position to the detached rotational position. Initially, the cam servo motor 381 is in the attached rotational position and the lock servo motor 391 is in the cam rotation-preventing rotational position. Here, the lock servo motor locking extension 392a on the end of the lock servo motor arm 392 engages the cam servo motor arm lock device 382a of the cam servo motor arm 382.

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint).

Rotating the cam 350 from the attached rotational position to the detached rotational position is a two-step process. The operator first operates the lock servo motor 391 to rotate the lock servo motor arm 392 into the cam rotation-enabling rotational position (counter-clockwise from this viewpoint). Second, the operator operates the cam servo motor 381 to rotate the cam 350 from the attached rotational position to the detached rotational position (counter-clockwise from this viewpoint).

Figure 8A:
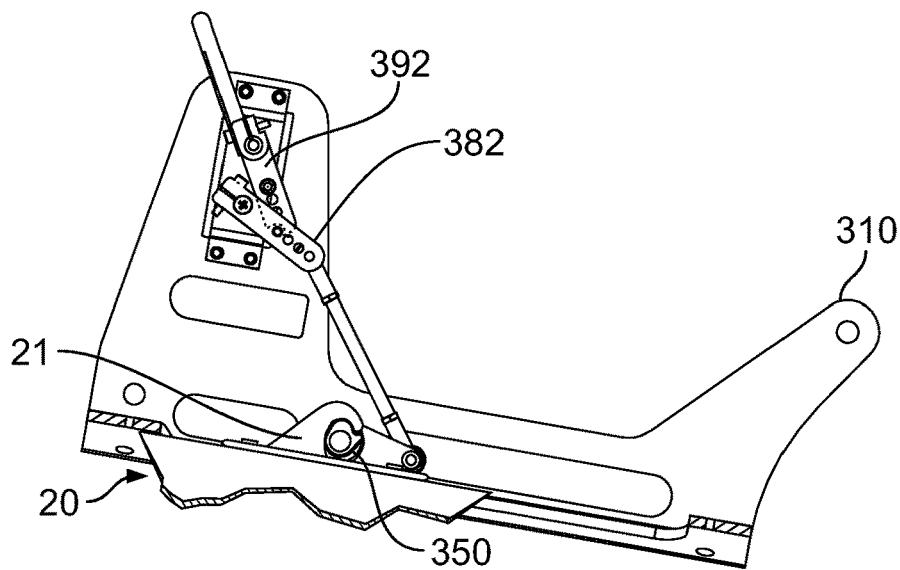
FIG. 8A is a partial cross-sectional view of the saddle of FIG. 4A showing the cam in an attached rotational position and a hook of the fixed-wing aircraft attached taken substantially along line 8A-8A of FIG. 4C.
Figure 8B:
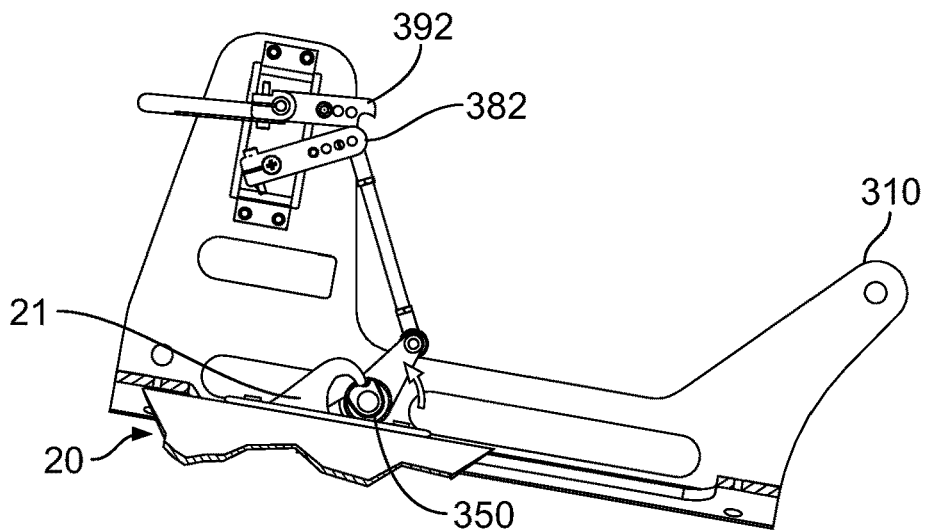
FIG. 8B is a partial cross-sectional view of the saddle of FIG. 4A showing the cam halfway between the attached rotational position and the detached rotational position and the hook of the fixed-wing aircraft being pushed off of the cam taken substantially along line 8A-8A of FIG. 4C.
Figure 8C:
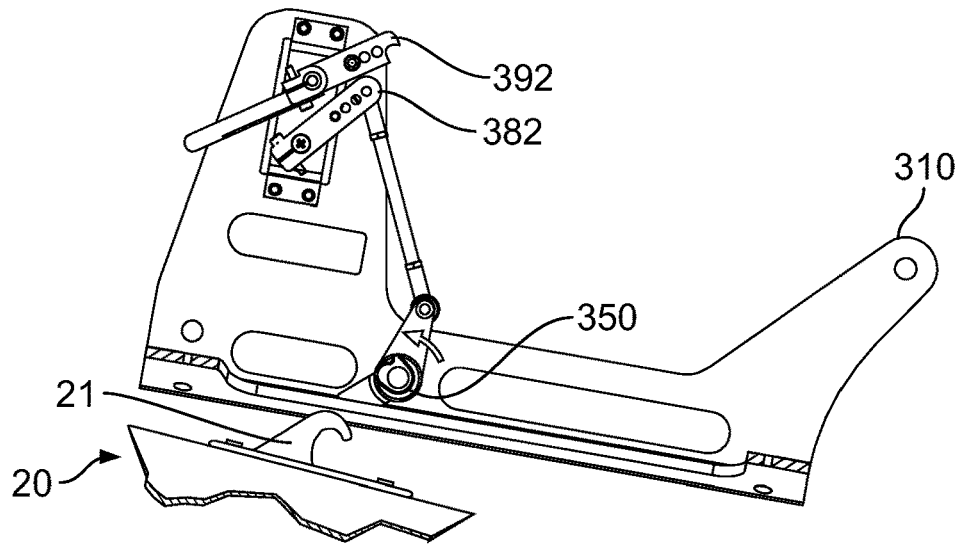
FIG. 8C is a partial cross-sectional view of the saddle of FIG. 4A showing the cam in the detached rotational position and the hook of the fixed-wing aircraft detached from the cam taken substantially along line 8A-8A of FIG. 4C.

FIGS. 8A to 8C, described below, show how rotation of the cam from the attached rotational position to the detached rotational position causes the fixed-wing aircraft to detach from the cam.

The foot 355 controls the extent to which the cam 350 can rotate. The foot 355 is oriented such that when the cam 350 rotates a certain amount in a first direction relative to the saddle base bracket 310, the foot 355 contacts the saddle base bracket 310 and prevents the cam 350 from rotating any further in that first direction. Similarly, when the cam 350 rotates a particular amount in a second opposite direction relative to the saddle base bracket 310, the foot 355 contacts the saddle base bracket 310 and prevents the cam 350 from rotating any further in that second direction. The foot 355 is angled to stop the cam 350 from rotating before it exerts an undue force on the cam rotation control link 386, and by extension the cam motor arm 382 and the cam motor shaft 381a.

Rotor Arm Modules

The rotor arm modules 400a to 400d are mechanically attachable to and mechanically lockable to the hub module 200 and include: (1) the eight rotors of the multi-copter 10; (2) the eight rotor motors that drive these rotors; (3) gear reduction trains that couple the rotor motors to their corresponding rotors; and (4) locking assemblies that lock the rotor arm modules 400a to 400d to the hub module 100.

FIGS. 5A, 5B, 5C, 5D, 5E, 5F, 5G, 5H, 5I, and 5J show the first rotor arm module 400a or components thereof. The other rotor arm modules 400b, 400c, and 400d are similar to the first rotor arm module 400a and are not separately shown or described for brevity.

As best shown in FIGS. 5A, 5B, 5H, and 5J, the first rotor arm module 400a includes: (1) a generally rectangular hollow elongated rotor arm 410a; (2) a generally rectangular hollow rotor arm extension 410b; (3) a locking assembly 420; (4) a male blind mate connector 431; (5) upper and lower rotor motor assemblies 460a and 460b; and (6) a rotor assembly 470.

The rotor arm extension 410b is attached to the rotor arm 410a such that part of the rotor arm extension 410b is disposed within the rotor arm 410a and the remainder of the rotor arm extension 410b extends from the rotor arm 410a. The locking assembly 420 is attached to the underside of the rotor arm 410a near the end of the rotor arm 410a from which the rotor arm extension 410b extends. The male blind mate connector 431 is attached to the end of the rotor arm 410a from which the rotor arm extension 410b extends. The upper and lower rotor motor assemblies 460a and 460b and the rotor assembly 470 are attached to the rotor arm 410a in a manner described in detail below.

Although not shown, the open end of the rotor arm 410a opposite the end from which the rotor arm extension 410b extends forms a first front landing gear extension module receiving socket that can receive the first front landing gear extension module 500a, as described below.

As best shown in FIGS. 5A, 5B, 5C, 5D, 5E, and 5F, the male blind mate connector 431—along with its counterpart female blind mate connector 231a of the hub module 100—facilitate: (1) mechanical attachment of the first rotor arm module 400a to the hub module 100; (2) electrical power flow from the battery(ies) 260a, 260b, 260c, and/or 260d to the upper and lower rotor motors 465a and 465b of the first rotor arm module 400a; and (3) communication between the ESCs 265a and 265b their corresponding upper and lower rotor motors 465a and 465b.

The male blind mate connector 431 includes a plurality of pins 431a configured to mate with the pin receptacles of the female blind mate connector 231a. Although not shown for clarity, the male blind mate connector 431 and, particularly, the pins 431a, are electrically connected to the corresponding upper and lower rotor motors 465a and 465b via wiring. In this example embodiment, the male blind mate connector 431 includes 12 pins 431a, six of which are electrically connected to the upper rotor motor 465a via wiring and the other six of which are electrically connected to the lower rotor motor 465b via wiring. In this example embodiment, each motor only requires three motor leads to properly function, but the multi-copter 10 includes two motor leads for each motor pole. By using two motor leads per motor pole, the multi-copter 10 eliminates single-point failures (i.e., both leads would have to fail rather than just a single lead for the motor to fail).

To attach the rotor arm module 400a to the hub module 100, an operator inserts the rotor arm extension 410b into the first rotor arm module receiving socket 214 of the hub module 100 and slides the rotor arm module 400a toward the hub module 100 with enough force to mate the pins of the male blind mate connector 431 with the pin receptacles of the female blind mate connector 231a of the hub module 100.

In an alternative embodiment, rather than the hub module slidably receiving a portion of the rotor arm module to attach the rotor arm module to the hub module, the rotor arm module slidably receives a component (such as an arm) of the hub module to attach the rotor arm module to the hub module.

As best shown in FIGS. 5C, 5D, 5E, and 5F, the locking assembly 420 includes a drawcatch 420a and a drawcatch lock 420b that: (1) facilitate attaching the first rotor arm module 400a to the hub module 100; (2) lock the first rotor arm module 400a to the hub module 100; and (3) facilitate detachment of the first rotor arm module 400a from the hub module 100.

Figure 5A:
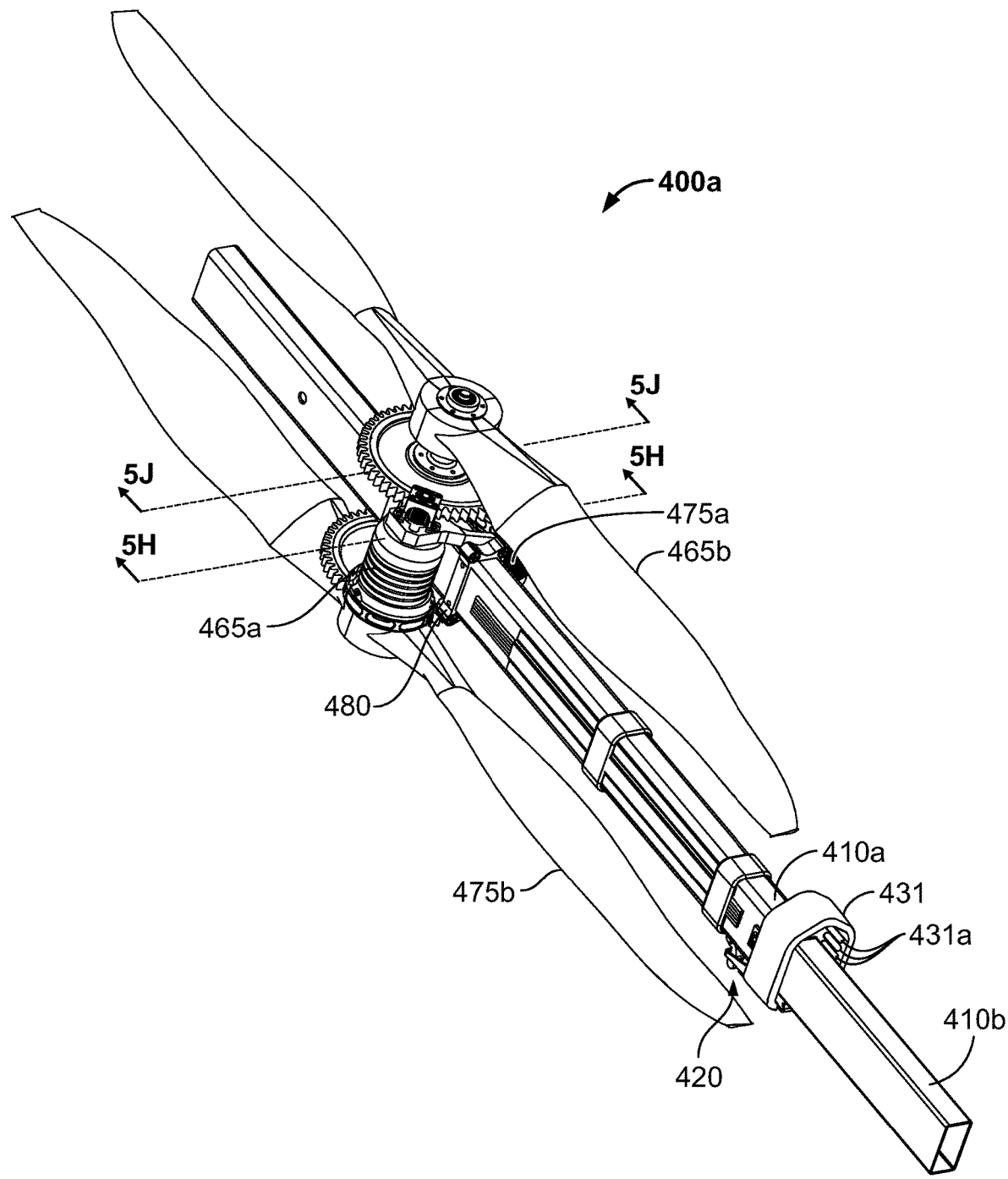
FIG. 5A is a top perspective view of one of the rotor arm modules of the multi-copter of FIG. 1A.
Figure 5B:
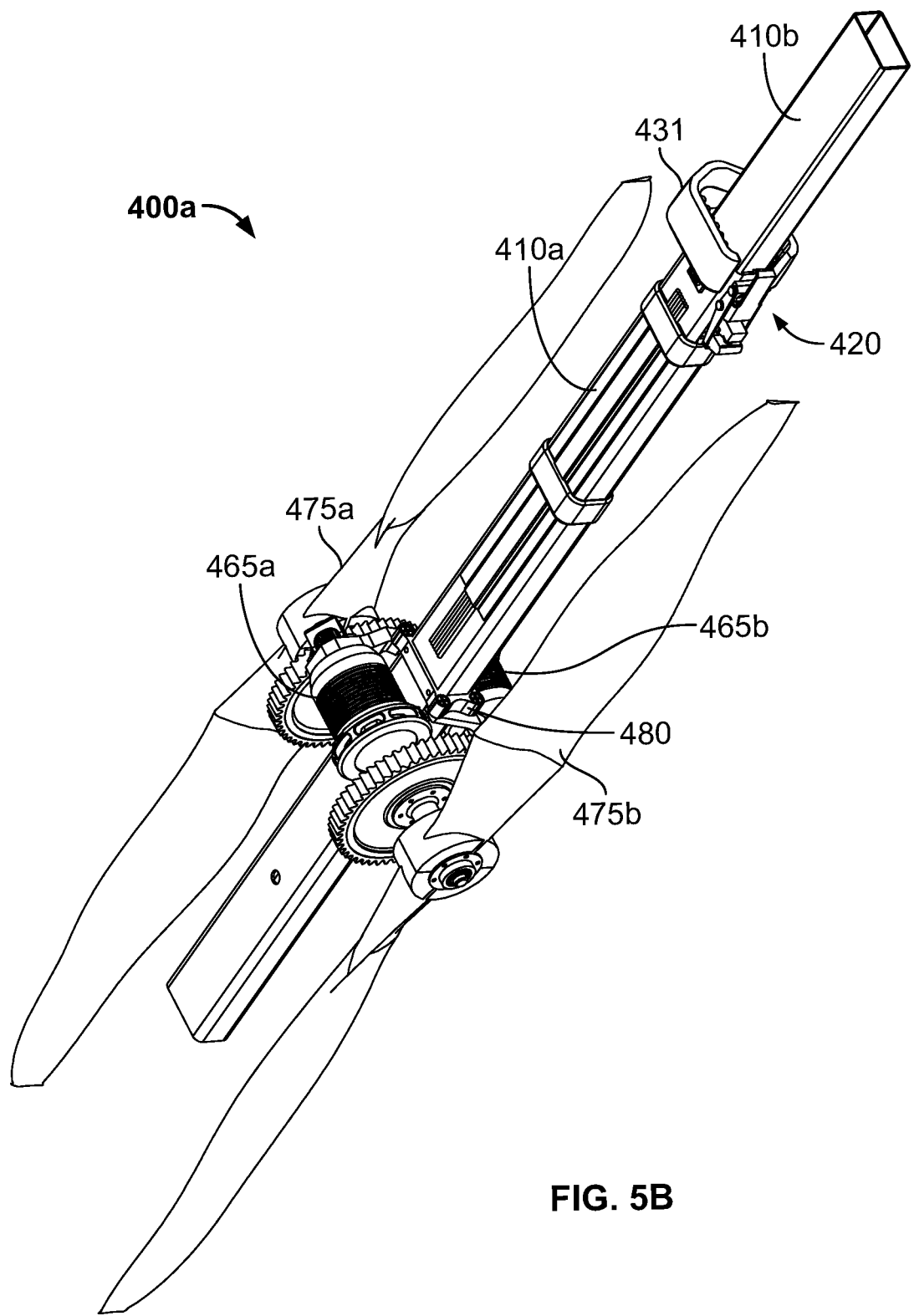
FIG. 5B is a bottom perspective view of the rotor arm module of FIG. 5A.
Figure 5C:
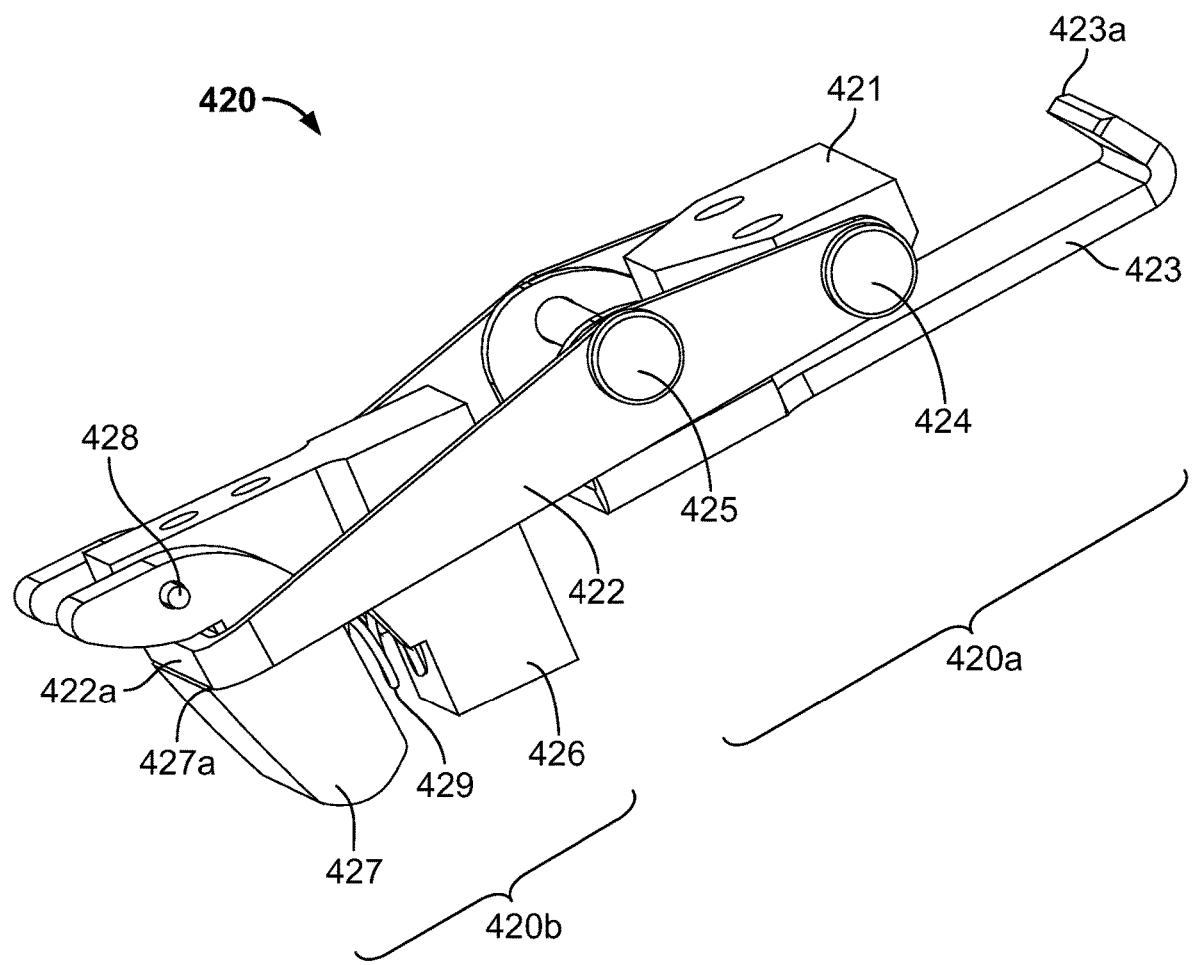
FIG. 5C is a top perspective view of the locking assembly of the rotor arm module of FIG. 5A.

As best shown in FIG. 5C, the drawcatch 420a includes: (1) a base 421; (2) a lever 422; (3) a claw 423; (4) a first fastener 424 (such as a clevis pin or other suitable fastener); and (5) a second fastener 425 (such as a clevis pin or other suitable fastener).

The drawcatch lock 420b includes: (1) a base 426; (2) a lock/release device 427 having a locking shelf 427a; (3) a pin 428 (or other suitable connector); and (4) a compression spring 429 (or other suitable biasing element).

The base 421 is attached to the underside of the rotor arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the rotor arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first rotor arm module 400a and the hub module 100 are locked together.

In addition to using the locking assembly 420 to lock the first rotor arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first rotor arm module 400a and the hub module 100 toward one another and cause the male blind mate connector 431 to mate with the female blind mate connector 231a.

Figure 5D:
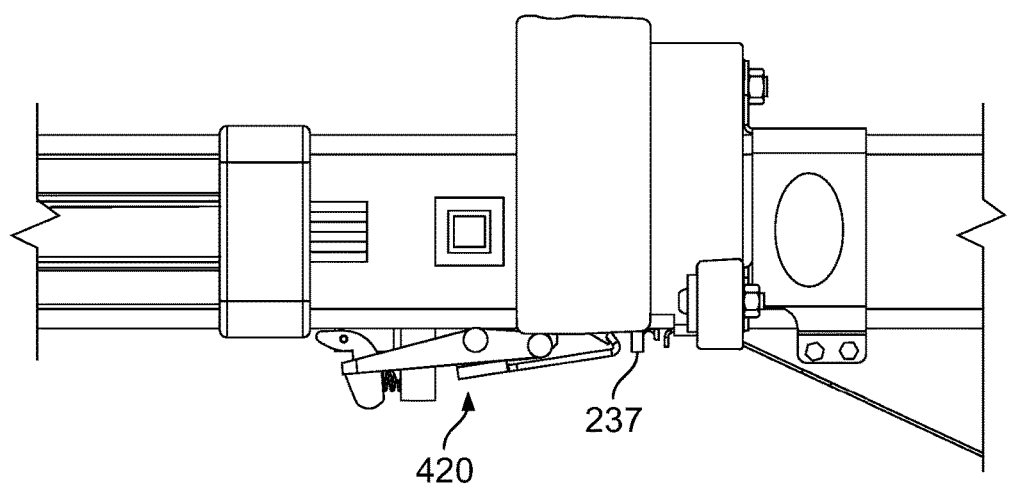
FIGS. 5D, 5E, and 5F are side elevational views of the rotor arm module of FIG. 5A detaching from the hub module of FIG. 2A via the locking assembly of FIG. 5C.
Figure 5E:
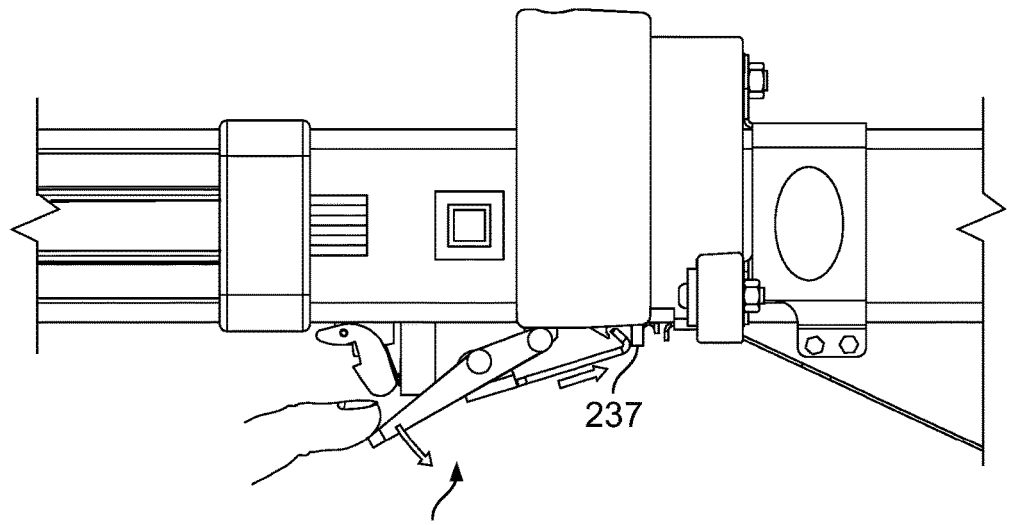
Figure 5F:
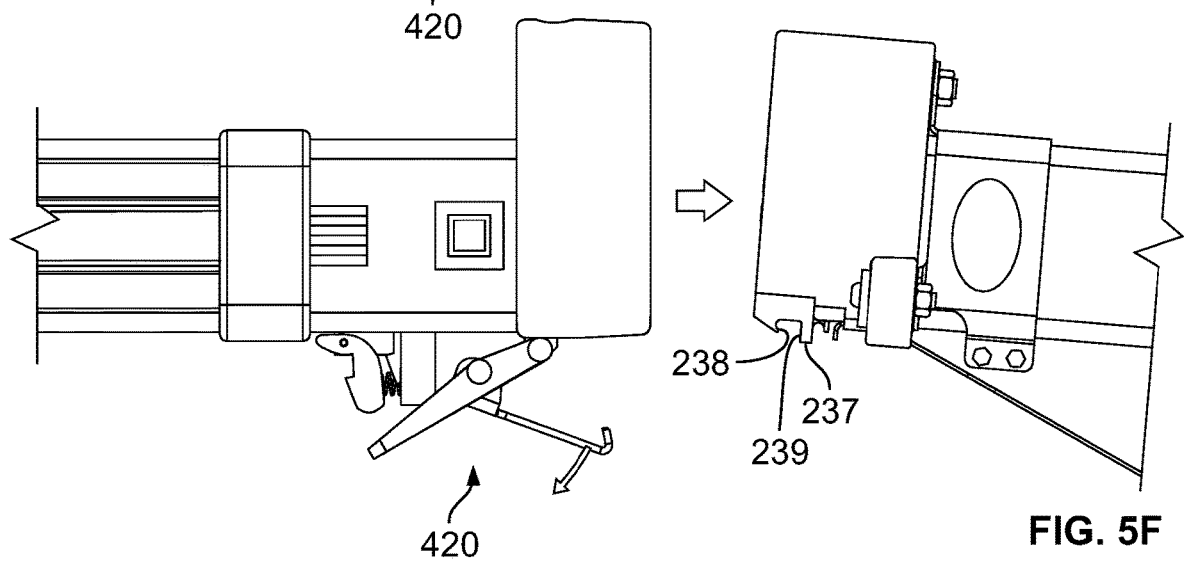

As shown in FIGS. 5D to 5F, the operator reverses this process to unlock the first rotor arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first rotor arm module 400a and the hub module 100 apart to separate the male and female blind mate connectors 431 and 231a or use the locking assembly 420 to aid in detachment. When using the locking assembly 420 to aid in detachment, as shown in FIG. 5E, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first rotor arm module 400a and the hub module 100 apart, as shown in FIG. 5F.

Turning to the upper and lower rotor motor assemblies 460a and 460b and the rotor assembly 470a, the upper and lower rotor motors 465a and 465b of the upper and lower motor assemblies independently drive respective upper and lower rotors 475a and 475b via separate gear reduction trains.

Figure 5G:
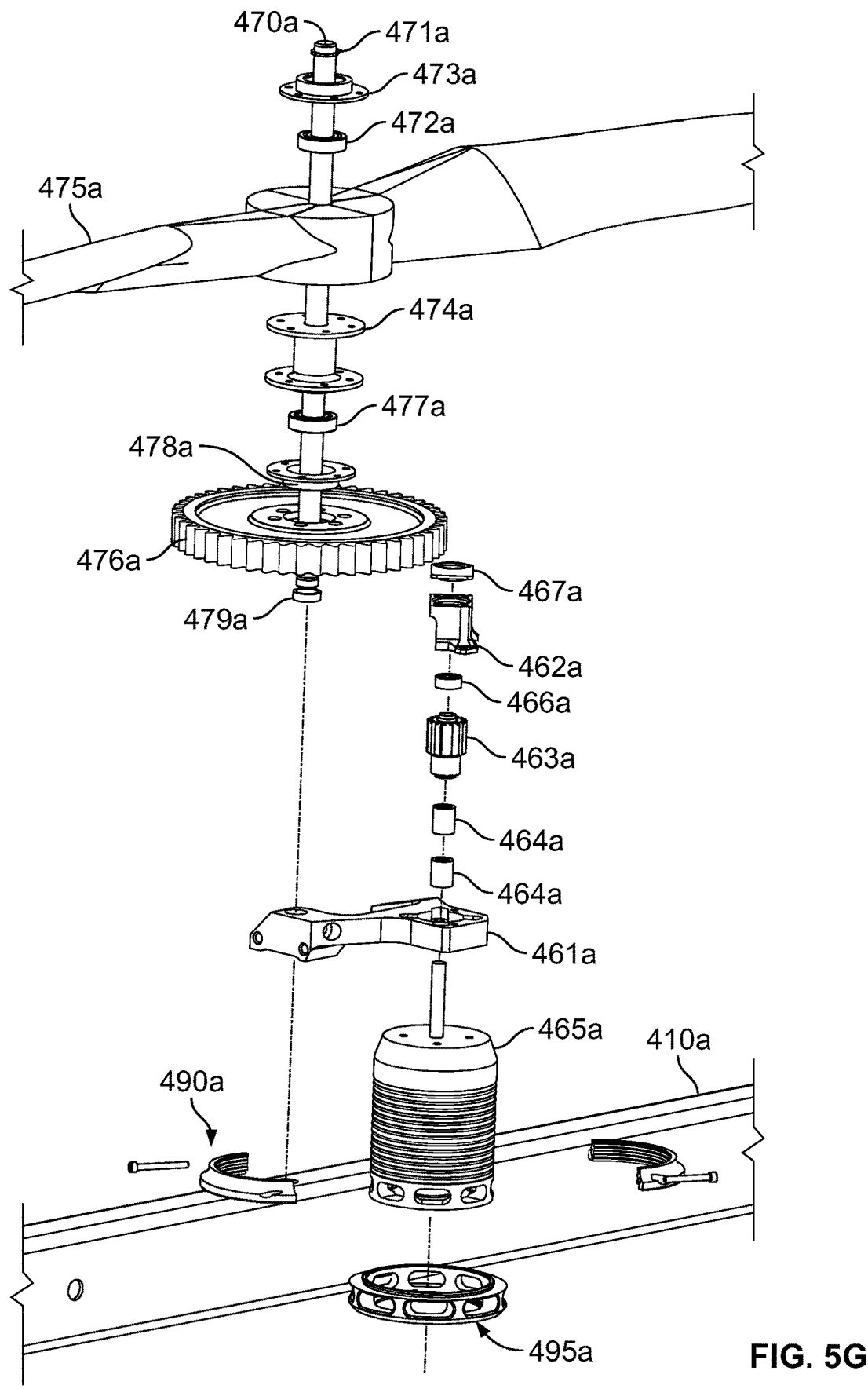
FIG. 5G is an exploded top perspective view of one of the rotor arm assemblies and part of the rotor assembly of the rotor arm module of FIG. 5A.
Figure 5H:
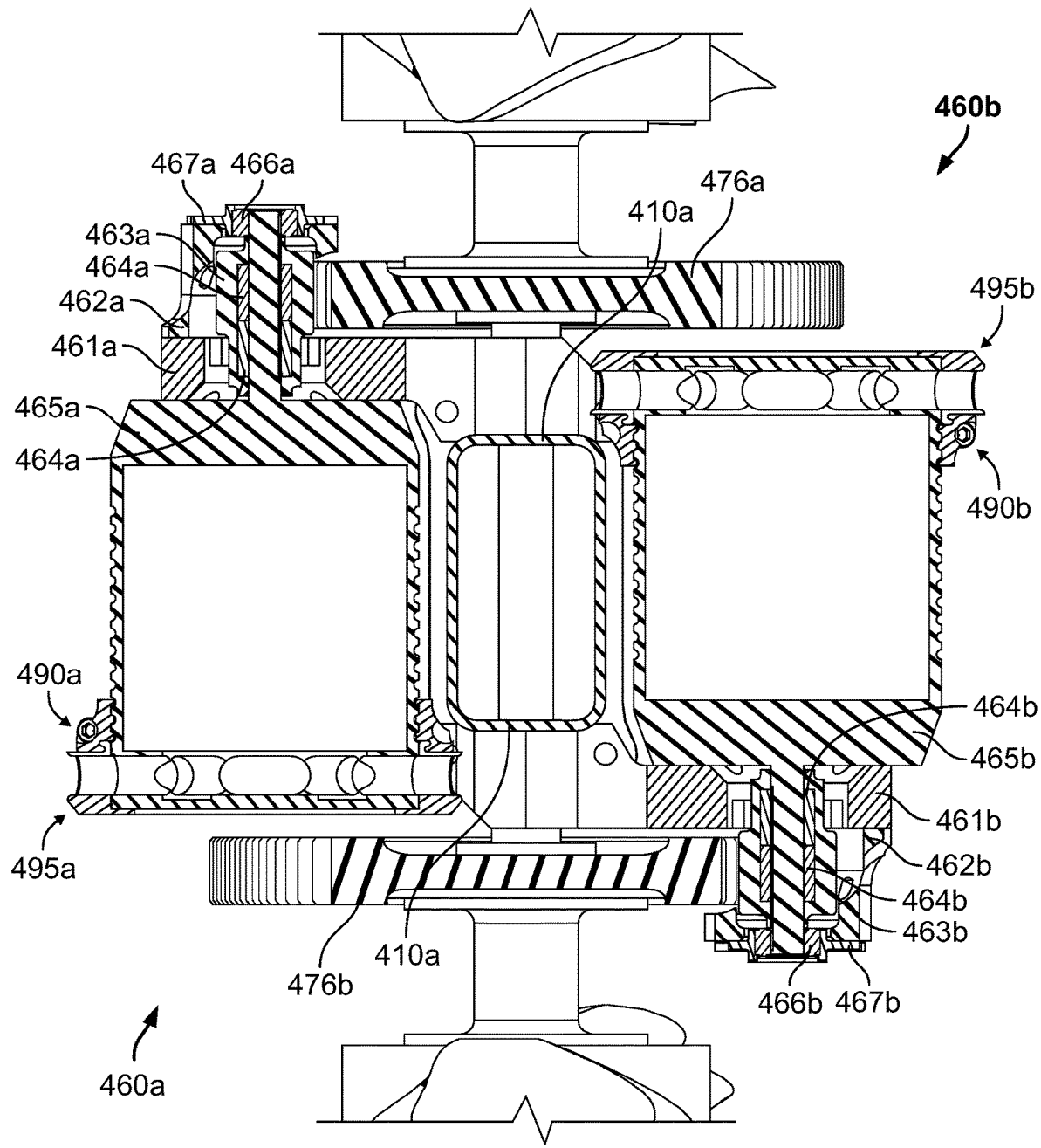
FIG. 5H is a cross-sectional view of the rotor motor assemblies of the rotor arm module of FIG. 5A taken substantially along line 5H-5H of FIG. 5A.

As best shown in FIGS. 5G and 5H, the upper rotor motor assembly 460a includes: (1) an upper rotor motor mount 461a, (2) an upper bearing spider 462a, (3) an upper pinion 463a, (4) upper bearings 464a, (5) the upper rotor motor 465a, (6) an upper bearing 466a, (7) an upper bearing cup 467a, (8) an upper two-piece cooling fan collar 490a, and (9) an upper rotor motor cooling fan 495a.

The upper rotor motor 465a is attached to the upper rotor motor mount 461a. The bearing spider 462a is attached to the upper rotor motor mount 461a. The upper bearings 464a are disposed on the motor shaft (not labeled) of the upper rotor motor 465a. The upper drive pinion 463a is disposed on the upper bearings 464a and on the motor shaft of the upper rotor motor 465a such that the upper drive gear 463a rotates with the motor shaft. The upper bearing 466a within the upper bearing cup 467a is disposed on the motor shaft of the upper rotor motor 465a. The upper bearing cup 467a is attached to the upper bearing spider 462a. The upper rotor motor cooling fan 495a is press-fit around the bottom of the upper rotor motor 465a and held in place via the upper two-piece cooling fan collar 490a.

The lower rotor motor assembly 460b includes: (1) a lower rotor motor mount 461b, (2) a lower bearing spider 462b, (3) a lower pinion 463b, (4) lower bearings 464b, (5) the lower rotor motor 465b, (6) a lower bearing 466b, (7) a lower bearing cup 467b, (8) a lower two-piece cooling fan collar 490b, and (9) a lower rotor motor cooling fan 495b.

The lower rotor motor 465b is attached to the lower rotor motor mount 461b. The lower bearing spider 462b is attached to the lower rotor mount 461b. The lower bearings 464b are disposed on the motor shaft (not labeled) of the lower rotor motor 465b. The lower pinion 463b is disposed on the lower bearings 464b and on the motor shaft of the lower rotor motor 465b such that the lower pinion 463b rotates with the motor shaft. The lower bearing 466b within the lower bearing cup 467b is disposed on the motor shaft of the lower rotor motor 465b. The lower bearing cup 467b is attached to the lower bearing spider 462b. The lower rotor motor cooling fan 495b is press-fit around the bottom of the lower rotor motor 465a and held in place via the lower two-piece cooling fan collar 490b.

Figure 5I:
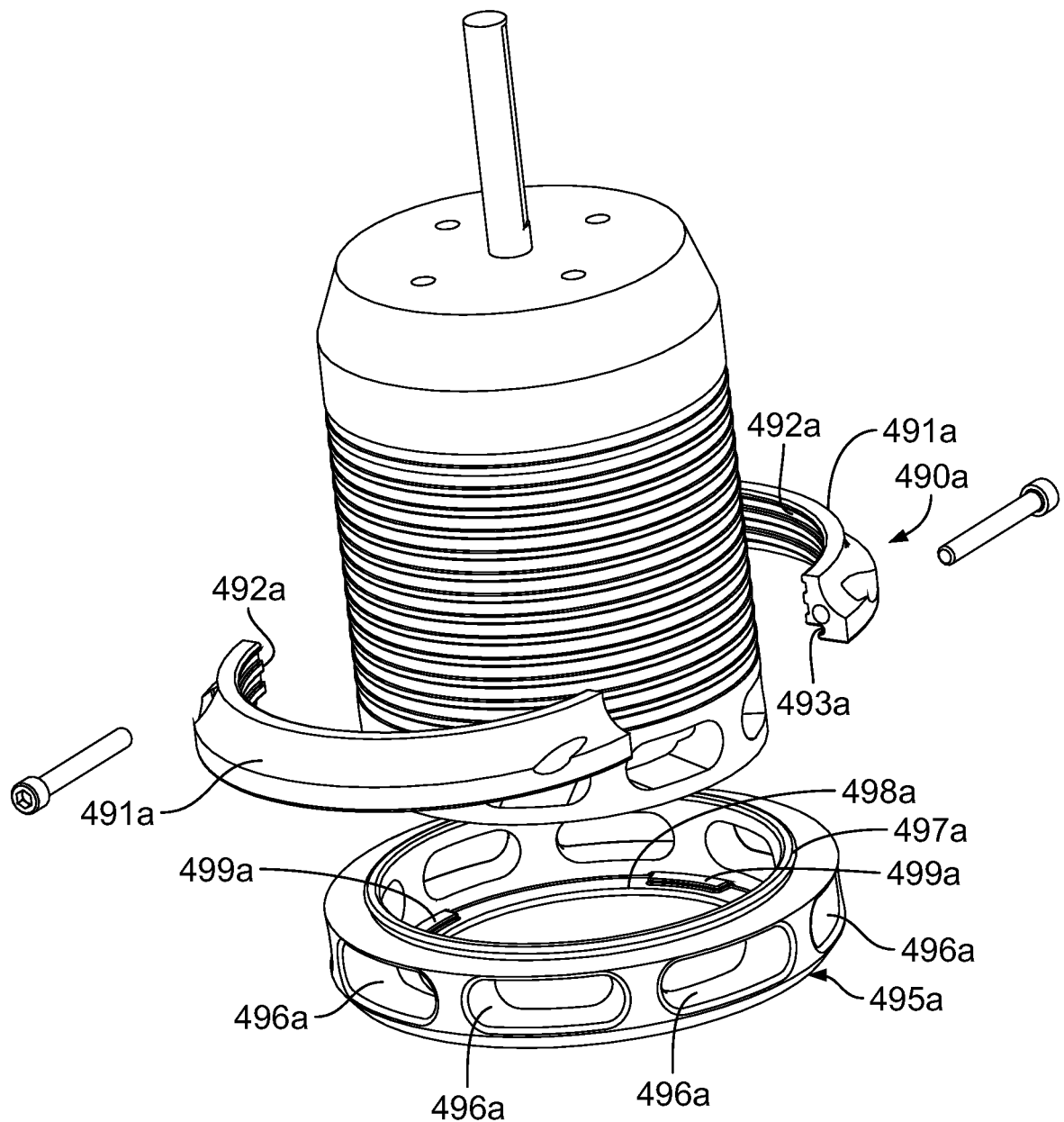
FIG. 5I is an exploded top perspective view of one of the rotor motor collars and one of the rotor motor fans of the rotor arm module of FIG. 5A.

The upper cooling fan collar 490a and the upper rotor motor cooling fan 495a are shown in detail in FIG. 5I. The lower cooling fan collar 490b and the lower rotor motor cooling fan 495b are similar to the upper cooling fan collar 490a and the upper rotor motor cooling fan 495b and are not separately shown or described for brevity.

The upper rotor motor cooling fan 495a includes a generally annular body that defines a plurality of cooling fan openings 496a through its side walls (not labeled). A collar connection lip 497a extends upward from body and radially-outward. A generally annular motor mounting shelf 498a extends radially-inward from the bottom of the body. A plurality of motor seats 499a extend upward from the motor mounting shelf 498a.

The upper cooling fan collar 490a includes two identical collar halves 491a having generally half-annular bodies. An upper rotor motor mating surface 492a that extends around the (half) circumference of the collar half 491a is grooved to correspond with and mate with grooves on the exterior of the upper rotor motor 465a. A lip retaining chamber 493a that extends around the (half) circumference of the collar half 491a is shaped to receive and retain the lip 497a of the upper rotor motor cooling fan 495a.

The bottom of the upper rotor motor 465a is disposed within the space defined by the inner cylindrical surface of the cooling fan 495a such that the bottom of the upper rotor motor 465a contacts the motor seats 499a. The cooling fan openings 496a of the cooling fan 495a are generally aligned with corresponding cooling fan openings of the upper rotor motor 465. The collar halves 491 are fit onto the upper rotor motor 465a and the cooling fan 495a such that: (1) the lip retaining chambers 493a of the collar halves 491 receive the lip 497a of the upper rotor motor cooling fan 495a; and (2) the upper rotor motor mating surfaces 492a of the collar halves 491 mate with the grooves on the exterior of the upper rotor motor 465a. Two fasteners (not labeled) attach the collar halves 491a to each other to prevent separation.

The cooling fans solve two problems: (1) limited motor power output due to overheating; and (2) motors falling apart. First, the power output of the rotor motors depends to a certain extent on cooling—power output generally decreases the hotter the rotor motors get. The cooling fans enlarge the radius of the cooling fan openings of the rotor motors. The increased radius drives cooling air at a greater flow rate, which improves cooling and allows motors to be used safely at increased loads without fear of failure.

Second, the flux rings of the rotor motors are typically glued onto the end caps of the rotor motors. This attachment is not secure due to the temperatures the rotor motors reach and the vibrations that occur during flight. The cooling fan collars double as redundant load paths for the motor flux rings since they mechanically engage the grooves on the exterior of the upper rotor motor, which eliminates the chance of the flux ring working its way off of the end cap.

Figure 5J:
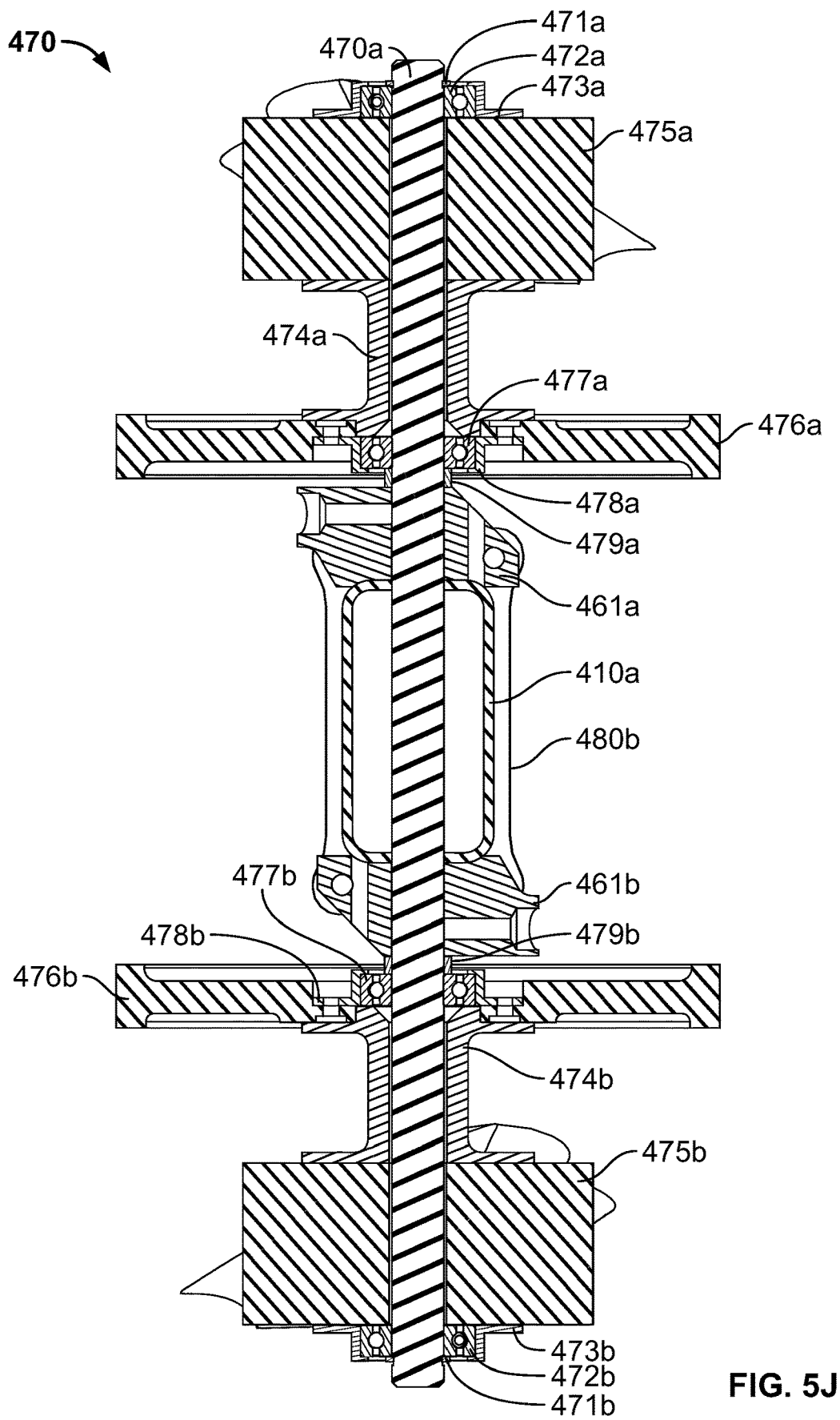
FIG. 5J is a cross-sectional view of the rotor assembly of the rotor arm module of FIG. 5A taken substantially along line 5J-5J of FIG. 5A.

As best shown in FIG. 5J, the rotor assembly 470 includes a spindle 470a and the following components rotatably mounted to the spindle 470a: (1) an upper retaining ring 471a, (2) a lower retaining ring 471b, (3) upper bearings 472a and 477a, (4) lower bearings 472b and 477b, (5) upper bearing cups 473a and 478a, (6) lower bearing cups 473b and 478b, (7) an upper torque tube 474a, (8) a lower torque tube 474b, (9) an upper rotor 475a, (10) a lower rotor 475b, (11) an upper driven gear 476a, (12) a lower driven gear 476b, (13) an upper spacer 479a, and (14) a lower spacer 479b.

Turning to the upper portion of the rotor assembly 470, the bearing 472a is disposed within the bearing cup 473a, which is fixedly attached to the top of the rotor 475a. The torque tube 474a is fixedly attached at one end to the underside of the rotor 475a and at the other end to top of the driven gear 476a. The bearing 477a is disposed within the bearing cup 478a, which is fixedly attached to the underside of the driven gear 476a. The spacer 479a is disposed between the bearing 477a and the upper rotor motor mount 461a. The upper retaining ring 471a is seated in a groove defined around the spindle 470a and prevents these components from sliding off of the spindle 470a.

Turning to the lower portion of the rotor assembly 470, the bearing 472b is disposed within the bearing cup 473b, which is fixedly attached to the bottom of the rotor 475b. The torque tube 474b is fixedly attached at one end to the top of the rotor 475b and at the other end to underside of the driven gear 476b. The bearing 477b is disposed within the bearing cup 478b, which is fixedly attached to the top of the driven gear 476b. The spacer 479b is disposed between the bearing 477b and the lower rotor motor mount 461b. The lower retaining ring 471b is seated in a groove defined around the spindle 470a and prevents these components from sliding off of the spindle 470a.

The spindle 470a extends through two vertically-aligned spindle receiving openings (not labeled) defined through the rotor arm 410a. This prevents the spindle 470a from substantially translating relative to the rotor arm 410a. And since all of the components of the upper and lower motor assemblies 460a and 460b and the rotor assembly 470 are attached to the spindle 470a (directly or indirectly), the fact that the spindle 470a extends through the spindle receiving openings defined through the rotor arm 410a prevents any of the components of the upper and lower motor assemblies 460a and 460b and the rotor assembly 470 from substantially translating relative to the rotor arm 410a.

To prevent the upper and lower rotor motors 465a and 465b (and certain components attached thereto) from rotating relative to the rotor arm 410a, the upper and lower rotor motor mounts 461a and 461b are attached to both an inner bracket 480a and an outer bracket 480b. The brackets 480a and 480b are disposed around the rotor arm 410a, as best shown in FIGS. 5A, 5B, and 5J.

In operation, the controller 272 and the ESC 265a control the rate and direction of rotation of the motor shaft of the upper rotor motor 465a, which drives the upper pinion 463a, which in turn drives the upper driven gear 476a. Since the upper driven gear 476a is fixedly attached to the upper rotor 475a without any further gear reduction, the upper rotor 475a rotates at the same rate as and in the same rotational direction as the upper driven gear 476a. Similarly, the controller 272 and the ESC 265b control the rate and direction of rotation of the motor shaft of the lower rotor motor 465b, which drives the lower pinion 463b, which in turn drives the lower driven gear 476b. Since the lower driven gear 476b is fixedly attached to the lower rotor 475b without any further gear reduction, the lower rotor 475b rotates at the same rate as and in the same rotational direction as the lower driven gear 476b.

In this embodiment, the upper and lower rotors are generally the same size and shape. In another embodiment, the lower rotors are larger than (such as about 7% larger than) the upper rotors to compensate for the fact that the lower rotors operate in the upper rotors' downwash. Running larger lower rotors is one way to improve load sharing of upper and lower motors of a multi-copter with counter-rotating blades. Another way to improve load sharing is to select a lower gear-reduction for the lower rotors. Yet another way is to select motors with higher KV (rpm/volt) values. Yet another way is to select lower rotors with coarser pitch than the upper rotors.

Front Landing Gear Extension Modules and Landing Gear Modules

Figure 6A:
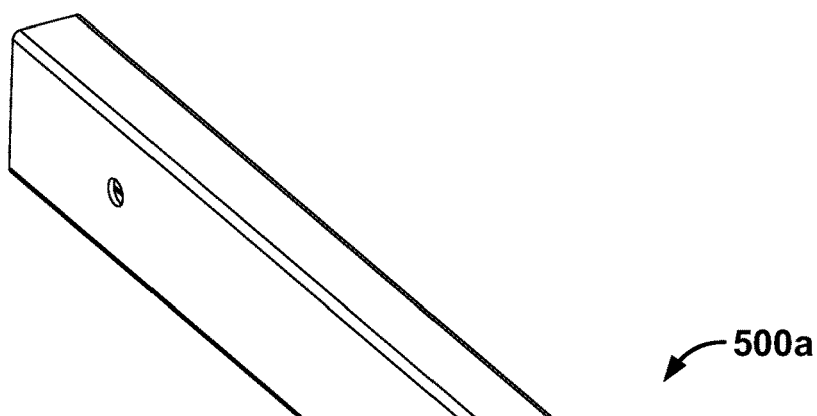
FIG. 6A is a top perspective view of one of the front landing gear extension modules of the multi-copter of FIG. 1A.
Figure 6A:
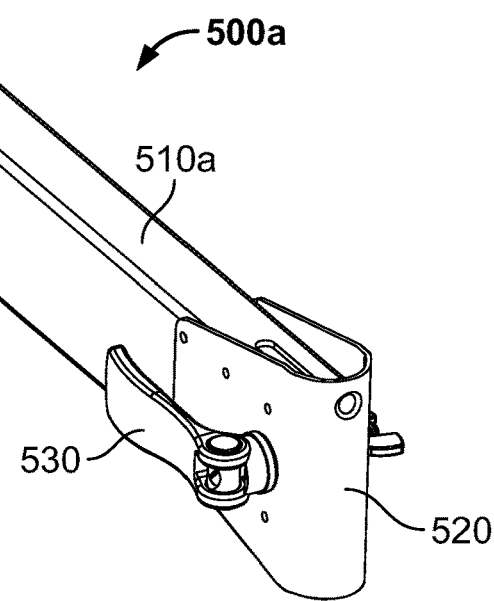

FIGS. 6A and 7A show the first front landing gear extension module 500a and the first front landing gear module 600a, respectively. The front landing gear modules (along with the rear landing gear modules, described below) support the multi-copter 10 when assembled but not flying, and facilitate launch and landing of the multi-copter 10 without damaging the multi-copter 10. The front landing gear extensions are used to attach the front landing gear to the respective rotor arm modules, and also enable the front landing gear to move relative to the rotor arm modules to prevent rotor rotation in certain instances.

The second front landing gear extension module 500b and the second front landing gear module 600b are similar to the first front landing gear extension module 500a and the first front landing gear module 600a and are not separately shown or described for brevity.

The first front landing gear extension module 500a includes a generally rectangular hollow support 510a, a landing gear module securing device 520 attached at one end of the support 510a, and a front landing gear locking device 530 (which is a cam lever lock in this embodiment but can be any suitable locking device) attached to the landing gear module securing device 520.

The first front landing gear module 600a includes a generally cylindrical leg 610, a generally semicircular foot 620 attached to a bottom end of the leg 610, and a collar 630 attached near the top end of the leg 610 via a fastener 632 (such as a set screw).

The front landing gear locking device 530 enables an operator to attach the first front landing gear module 600a to the first front landing gear extension module 500a. To do so, the operator unlocks the front landing gear locking device 530, inserts the first front landing gear module 600a into the landing gear module securing device 520 until the collar 630 is disposed within the landing gear module securing device 520, and re-locks the front landing gear locking device 530. The operator reverses this process to detach the first front landing gear module 600a from the first front landing gear extension module 500a.

The operator attaches the first front landing gear extension module 500a to the first rotor arm module 400a by inserting the end of the support 510a opposite the end to which the landing gear module securing device 520 is attached into the front landing gear extension module receiving socket of the first rotor arm module 400a. The operator then locks the first front landing gear extension module 500a into place, such as using suitable fasteners.

Although not shown, the operator can move the front landing gear module further radially-inward or further radially-outward by sliding the support of the front landing gear extension module further into or further out of the rotor arm of the corresponding rotor arm module. This enables the operator to move the front landing gear module from a first position in which the front landing gear module is clear of the rotors radially-inward to a second position in which the rotors contact the front landing gear module. When in the second position, the front landing gear module prevents the rotors from rotating.

Rear Landing Gear Extension Modules and Landing Gear Module

Figure 6B:
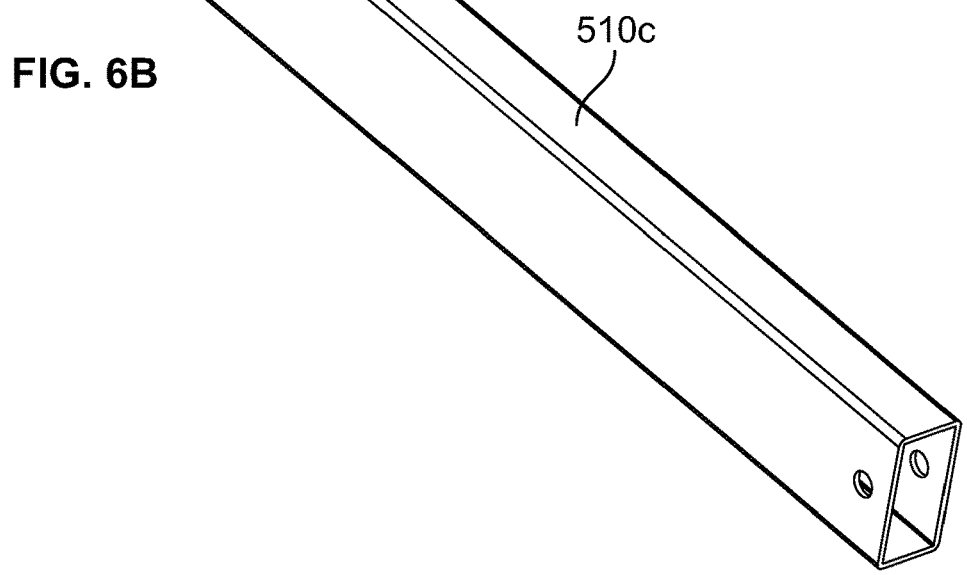
FIG. 6B is a top perspective view of one of the rear landing gear extension modules of the multi-copter of FIG. 1A.

FIGS. 6B and 7B show the first rear landing gear extension module 500c and the first rear landing gear module 600c, respectively. The rear landing gear modules (along with the front landing gear modules, described above) support the multi-copter 10 when assembled but not flying, and facilitate launch and landing of the multi-copter 10 without damaging the multi-copter 10. The rear landing gear modules are shaped such that they act as vertical stabilizers (or fins) during flight, ensuring that the front of the multi-copter 10 (and the nose of the fixed-wing aircraft 20, if attached thereto) points generally into the airflow. The rear landing gear extensions are used to attach the rear landing gear to the respective rotor arm modules, and also enable the rear landing gear to move relative to the rotor arm modules to prevent rotor rotation in certain instances.

The second rear landing gear extension module 500d and the second rear landing gear module 600d are similar to the first rear landing gear extension module 500c and the first rear landing gear module 600c and are therefore not separately shown or described.

The first rear landing gear extension module 500c is an elongated rectangular hollow support 510c.

The first rear landing gear module 600c includes a body having a generally triangular cross-section that tapers from front to back. The body includes two side surfaces 650a and 650b and a front surface 650c joining the side surfaces 650a and 650b. The side surfaces 650a and 650b are substantially longer than the front surface 650c is wide. The body tapers at its bottom into a generally circular foot 670. A rear landing gear extension module receiving socket is defined by a hollow rectangular support 680 extending through the body.

The operator attaches the first rear landing gear extension module 500c to the third landing gear module 600c by inserting one end of the support 510c of the first rear landing gear extension module 500c into the rear landing gear extension module receiving socket of the support 680. The operator then locks the first rear landing gear extension module 500c into place, such as using suitable fasteners.

The operator attaches the first rear landing gear extension module 500c to the third rotor arm module 400c by inserting the end of the support 510c of the first rear landing gear extension module 500c opposite the end to which the first rear landing gear module 600c is attached into the rear landing gear extension module receiving socket of the third rotor arm module 400c. The operator then locks the first rear landing gear extension module 500c into place, such as using suitable fasteners.

Once attached, the rear landing gear modules are oriented such that the side surfaces of the rear landing gear modules are substantially aligned with the saddle side brackets 320a and 320b of the saddle 300, as best shown in FIG. 1B. When the fixed-wing aircraft 20 is attached to the multi-copter 10, these side surfaces of the rear landing gear modules are substantially parallel to a generally vertical plane containing the roll axis of the fuselage of the fixed-wing aircraft 20. The relatively long length of these side surfaces of the rear landing gear modules and their placement well-aft of the center-of-lift of the multi-copter 10 cause the rear landing gear modules to act as fins. This weathervane effect ensures that the nose of the fixed-wing aircraft 20 is oriented into the airflow when airborne. Good flow alignment is critically important for spin avoidance at the moment the multi-copter 10 releases the fixed-wing aircraft 20, when the fixed-wing aircraft 20 may be operating well-below stall speed.

In certain embodiments, one or more of the landing gear modules includes a shock absorber.

Separately Powered Upper and Lower Rotor Motors

As noted above, four batteries 260a to 260d power the multi-copter 10, though in other embodiments a different quantity of batteries and/or different type(s) of batteries power the multi-copter. In other embodiments, any suitable power source(s), such as a fuel-based power source or a solar-based power source, may be used instead of or along with batteries.

In this embodiment, a first pair of batteries 260a and 260b are connected in series and a second pair of batteries 260c and 260d are connected in series. Here, the first pair of batteries 260a and 260b power the upper rotor motors and do not power the lower rotor motors, while the second pair of batteries 260c and 260d power the lower rotor motors and do not power the upper rotor motors. This configuration ensures that, if one pair of batteries fails, the multi-copter 10 is operable in a quadcopter mode with either all four upper rotor motors (if the second pair of batteries 260c and 260d fails) or all four lower rotor motors (if the first pair of batteries 260a and 260b fails).

The multi-copter 10 also includes a gang circuit that connects the two pairs of batteries in parallel to enable a single charger connected to one of the pairs of batteries to also charge the other pair of batteries. The gang circuit is overload-protected and includes an automatically resetting circuit breaker. The gang circuit is beneficial because it reduces charging time, allowing an operator to recharge both batteries in parallel when only one charger is available.

Example Fixed-Wing Aircraft Launch Method

To launch the fixed-wing aircraft 20 using the multi-copter 10, the operator mounts the fixed-wing aircraft 20 to a launch-assist assembly (not shown). The operator switches an idle power circuit of the multi-copter 10 to a closed state (from an open state) to power certain components of the multi-copter 10—such as the GPS receiver 285, the controller 272, the IMU 277, the telemetry link 274, the R/C receiver 276, the barometer 278, the cam servo motor 381, and the lock servo motor 391—to enable various preflight checks (e.g., as operating mode status checks, throttle response checks, attitude indicator response checks, heading accuracy checks, and R/C range checks) to be performed. Switching the idle power circuit to the closed state does not power the rotor motors. The idle power circuit thus (when closed) enables the operator to conduct most preflight checks without having to worry about accidentally switching on one or more of the rotor motors.

The operator then attaches the hub module 100 to the fixed-wing aircraft 20 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392a on the end of the lock servo motor arm 392 engages the cam servo motor arm lock device 382a of the cam servo motor arm 382; and (3) seating a rearwardly-curved hook 21 attached to the fuselage of the fixed-wing aircraft 20 on the cam 350 such that hook generally rests on the ridge 351 of the cam 350 and the tip of the hook is disposed in the valley 353 of the cam 350.

At this point the fixed-wing aircraft 20 is attached to the cam 350 (and the hub base 100), the fuselage of the fixed-wing aircraft 20 contacts the front and rear aircraft engaging brackets 340a and 340b (to prevent rotation about the pitch and yaw axes of the fixed-wing aircraft 20), and the stabilizers 290a and 290b contact the wings of the fixed-wing aircraft 20 (to prevent rotation about the roll axis of the fixed-wing aircraft 20).

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint). This prevents undesired detachment of the fixed-wing aircraft 20 from the cam 350 (and the multi-copter 10).

After the hub module 100 is attached to the fixed-wing aircraft 20, the operator: (1) attaches the front and rear landing gear modules 600a to 600d to their respective front and rear landing gear extension modules 500a to 500d; (2) attaches the front and rear landing gear extension modules 500a to 500d to their respective rotor arm modules 400a to 400d; and (3) attaches and locks the rotor arm modules 400a to 400d to the hub module 100 to complete assembly of the multi-copter 10.

The operator ensures the front and rear landing gear modules 600a to 600d are not in the path of rotation of the rotors of their corresponding rotor arm modules 400a to 400b, and connects the main power line of the multi-copter 10 to switch a main power circuit to a closed state (from an open state). Unlike the idle power circuit, the main power circuit (when closed) is capable of delivering current sufficient to drive the rotor motors and cause the multi-copter 10 to fly.

At this point, the operator uses the R/C controller to arm the controller 272. After the controller 272 has armed and determined that the rotor motors are operating properly, the operator begins the engine start-up procedure for the fixed-wing aircraft 20. At this point, the multi-copter 10 is manually or autonomously controlled (or a combination of both) to release the fixed-wing aircraft 20 into free flight according to the following general steps: (1) flying the multi-copter 10 to a pre-dash location a particular distance above the ground; (2) dashing the multi-copter 10 laterally until achieving a particular airspeed suitable for release; (3) releasing the fixed-wing aircraft 20; (4) stopping the multi-copter's dash; (5) flying the multi-copter 10 to a pre-landing location a particular distance above a landing location; and (6) descending to the landing location.

More specifically, in one example, the operator advances the throttle to begin vertically climbing and lift the fixed-wing aircraft 20 from the launch-assist assembly. Once the multi-copter 10 and attached fixed-wing aircraft 20 have reached a designated pre-dash height above ground, the operator controls the multi-copter 10 to begin dashing forward to generate enough airspeed to release the fixed-wing aircraft 20 into free flight.

Once the multi-copter 10 reaches a designated airspeed, the operator remotely controls the multi-copter to detach the fixed-wing aircraft 20 from the cam 350 (and the multi-copter 10). This is a two-step process, as shown in FIGS. 8A to 8C. To detach the fixed-wing aircraft 20 from the cam 350 (and the multi-copter 10), the operator first remotely controls the lock servo motor 391 (via the R/C controller) to rotate the lock servo motor arm 392 into the cam rotation-enabling rotational position (counter-clockwise from this viewpoint). Second, the operator remotely controls the cam servo motor 381 (via the R/C controller) to rotate the cam 350 from the attached rotational position to the detached rotational position (counter-clockwise from this viewpoint). As shown in the progression from FIGS. 8B to 8C, as the cam servo motor 381 rotates the cam 350 from the attached rotational position to the detached rotational position, the valley 352 and the ascending edge of the ridge 353 forces the hook 21 off of the cam 350, thereby detaching the fixed-wing aircraft 20 from the cam 350 (and the multi-copter 10).

After the fixed-wing aircraft 20 detaches from the multi-copter 10, the multi-copter 10 reduces its pitch angle (such as from 20 degrees nose down to 0 degrees) to stop dashing and reduce its airspeed before traveling to a desired landing area.

Aircraft-Retrieval System

In various example embodiments, the aircraft-retrieval system includes a retrieval assembly 1000, a flexible capture member 2000, and a tensioning object 3000.

The flexible capture member 2000 is attachable to the retrieval assembly 1000, and the tensioning object 3000 is attachable to the flexible capture member 2000. The retrieval assembly 1000 (and the attached flexible capture member 2000 and tensioning object 3000) is removably attachable to the multi-copter 10 to facilitate retrieval of the fixed-wing aircraft 20 from wing-borne flight. That is, an operator attaches the retrieval assembly 1000 to the multi-copter 10 for retrieval of the fixed-wing aircraft 20 and afterwards removes it from the multi-copter 10 for storage or to enable the multi-copter 10 to carry out different operations (such as launch the fixed-wing aircraft 20).

Figure 9A:
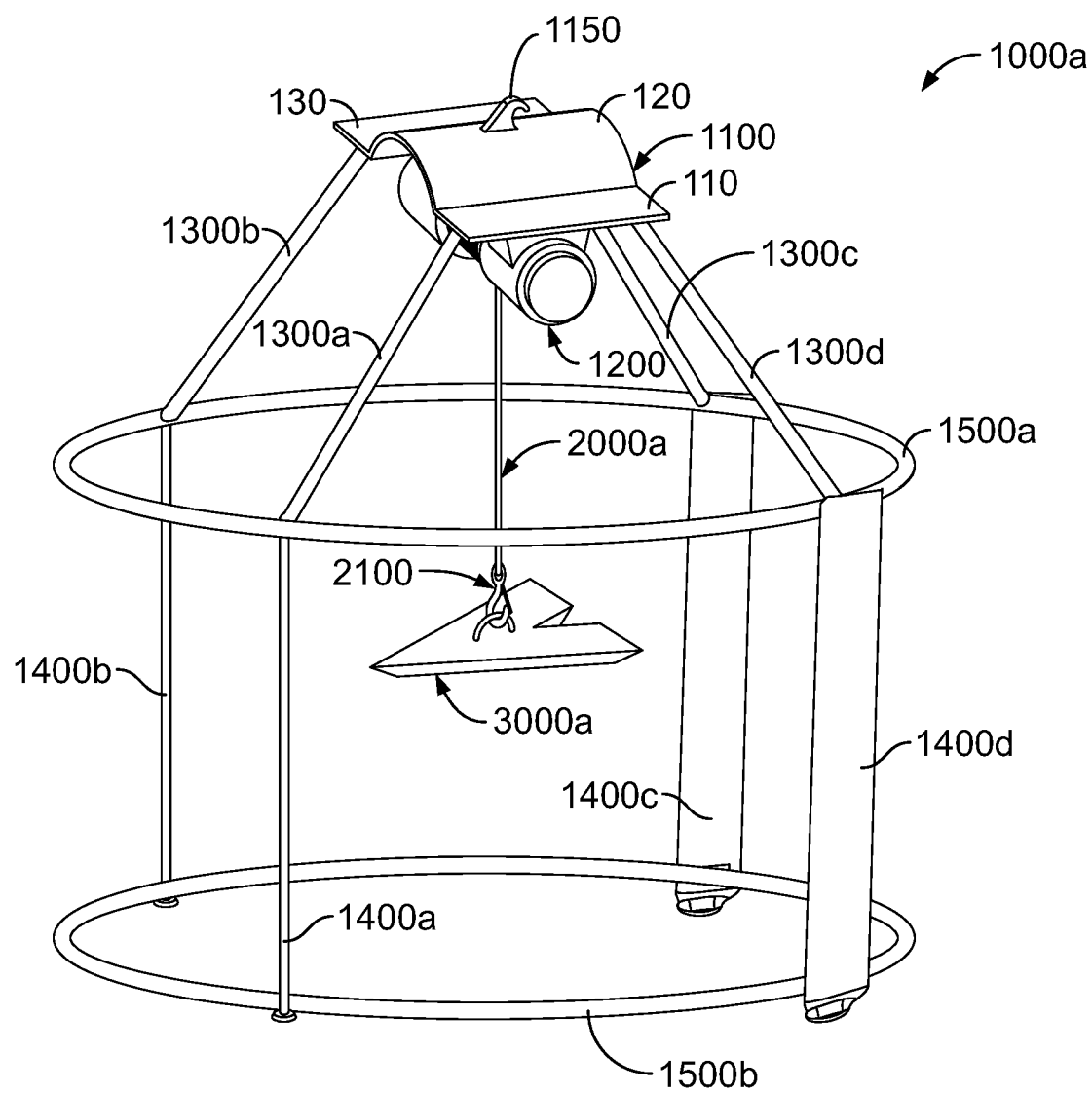
FIG. 9A is a perspective view of one embodiment of the retrieval apparatus, the flexible capture member, and the tensioning object of the present disclosure.
Figure 9B:
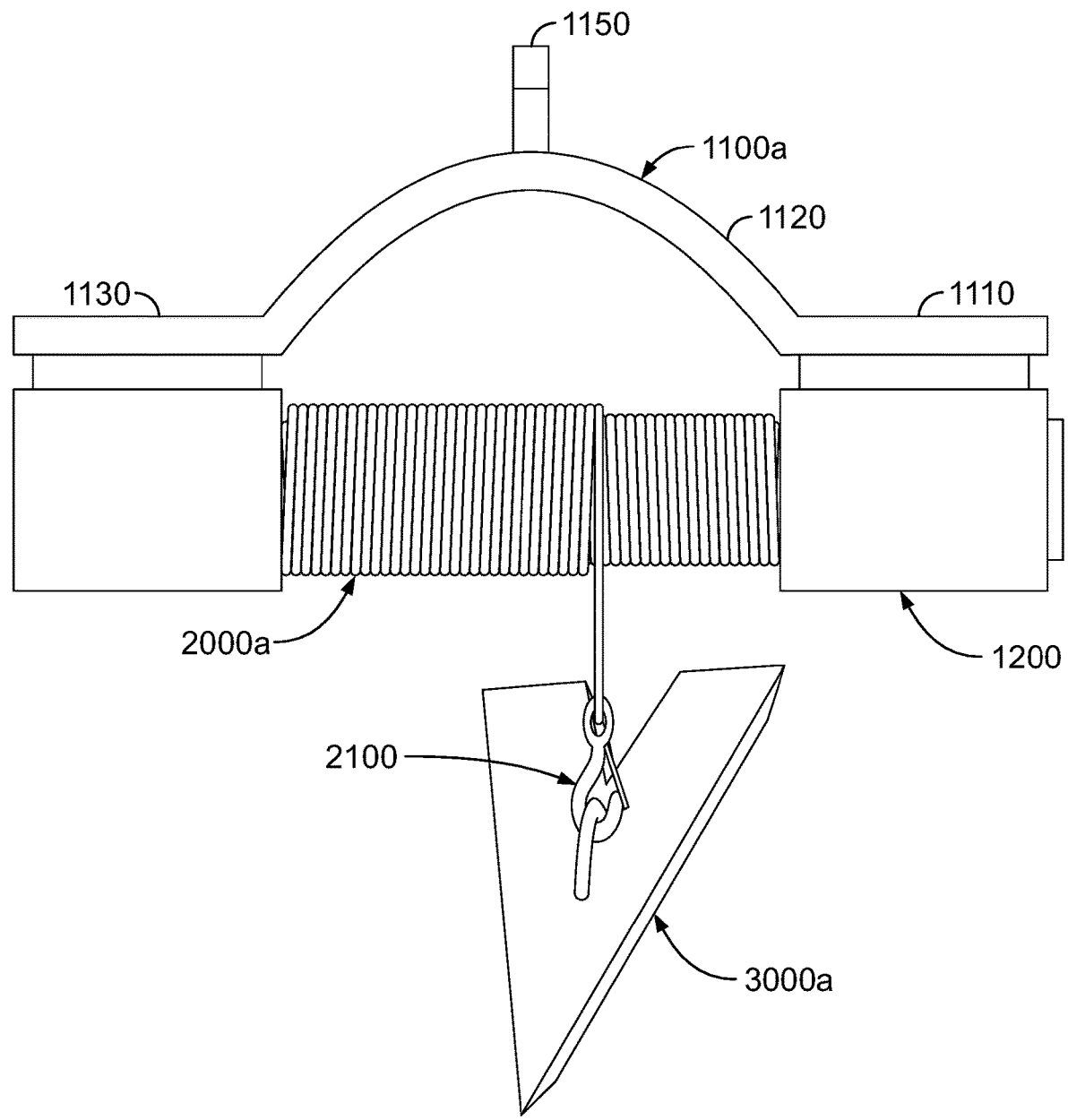
FIG. 9B is a front elevational view of part of the retrieval apparatus, the flexible capture member, and the tensioning object of FIG. 9A.

As best shown in FIGS. 9A and 9B, one embodiment of the retrieval assembly 1000 includes a base 1100; a hook 1150; a winch 1200; first, second, third, and fourth connecting arms 1300a, 1300b, 1300c, and 1300d, respectively; first and second front landing gear 1400a and 1400b, respectively; first and second rear landing gear 1400c and 1400d, respectively; and upper and lower stabilizers 1500a and 1500b, respectively.

The base 1100 includes two generally planar sections 1110 and 1130 connected by an upwardly curved section 1120. The curvature of the curved section 1120 generally matches the curvature of the aircraft-engaging brackets 340a and 340b of the saddle 300. Put differently, the curvature of the curved section 1120 mimics the curvature of the upper portion of the fuselage of the fixed-wing aircraft 20a. The hook 1150 is attached to (such as via suitable fasteners or welding or in any other suitable manner) and extends upward from the top surface of the curved section 1120. In some embodiments, the hook 1150 is integrally formed with the curved section 1120. This is merely one example configuration of the base, and it may have any other suitable shape or configuration.

The winch 1200 may be any suitable electric winch that includes a drum (not labeled) and a winch motor (not labeled) operatively connected to the drum to rotate the drum in a first direction and a second different direction. The winch motor is electrically connectable to the power source(s) of the multi-copter 10 and communicatively connectable to the controller 272 of the multi-copter 10, such as via a suitable wiring and an electrical connector (or connectors). In other embodiments, the winch motor is electrically connectable to a power source other than the power source of the multi-copter. That is, in these embodiments, the winch motor has an power source independent from the power source of the multi-copter.

The winch 1200 is attached to the base 1100 (and, particularly, to the planar sections 1100 and 1130) via suitable fasteners or in any other suitable manner. One end of the flexible capture member 2000, such as a fibrous or wire rope, is attached to the drum, and the flexible capture member 2000 is wound around the drum. The flexible capture member 2000 terminates in a free end.

In other embodiments, the retrieval assembly includes a bull wheel rather than a winch.

The controller 272 is configured to control the winch motor (such as responsive to control signals received from the controller of the operator or to instructions stored by the memory 272b) to rotate the drum in the first direction to wind the flexible capture member 2000 off of the drum and in the second direction to wind the flexible capture member 2000 onto the drum. In other embodiments, the operator directly controls the winch motor (such as via the R/C controller) rather than indirectly via the controller 272 of the multi-copter 10.

The first and second front landing gear 1400a and 1400b are shaped and constructed similarly to the first and second front landing gear modules 600a and 600b of the multi-copter 10, though they may have any other suitable shape. The first and second connecting arms 1300a and 1300b, which are solid or tubular members but may have any suitable cross-section or shape, connect the first and second front landing gear 1400a and 1400b to the base 1100 in any suitable manner, such as (but not limited to) via brackets, fasteners, lashing, or welding.

The first and second rear landing gear 1400c and 1400d are shaped and constructed similarly to the first and second rear landing gear modules 600c and 600d of the multi-copter 10. That is, the rear landing gear 1400c and 1400d are shaped such that they act as vertical stabilizers (or fins) during flight, ensuring that the front of the multi-copter 10 points generally into the airflow. The third and fourth connecting arms 1300c and 1300d, which are solid or tubular members but may have any suitable cross-section or shape, connect the first and second rear landing gear 1400c and 1400d to the base 1100 in any suitable manner, such as (but not limited to) via brackets, fasteners, lashing, or welding.

In this embodiment, each landing gear 1400a-1400d has a longitudinal axis, and the longitudinal axes of the landing gear are generally parallel to one another. Additionally, in this embodiment, the landing gear 1400a-1400d are generally equally circumferentially spaced apart around the base 1100.

The connecting arms 1300a-1300d and the landing gear 1400a-1400d are sized and oriented such that the internal height of the retrieval assembly, which is the vertical distance between the bottom of the winch and the free ends of the landing gear 1400a-1400d, is larger than the wingspan of the fixed-wing aircraft 20. As described below, this ensures that the fixed-wing aircraft 20 does not contact the landing surface after landing.

The upper and lower stabilizers 1500a and 1500b are rigid members that are circular in this embodiment (though they may be any suitable shape) and each connected to the first and second front landing gear and first and second rear landing gear 1400a-1400d in a suitable manner, such as (but not limited to) via fasteners, adhesive, welding, or lashing. In this embodiment, the upper stabilizer 1500a is connected to the first and second front landing gear and first and second rear landing gear 1400a-1400d near their attachment points to the respective arms 1300a-1300d, and the lower stabilizer 1500b is connected to the first and second front landing gear and first and second rear landing gear 1400a-1400d near their respective free ends. The retrieval assembly may include suitable quantity of stabilizers. In certain embodiments, each stabilizer connects at least two, but fewer than all, of the landing gear.

The arms 1300a-1300d, the landing gear 1400a-1400d, and the stabilizers 1500a and 1500b generally define a fixed-wing aircraft receiving volume sized to house the entire fixed-wing aircraft 20 after retrieval, as described below.

To retrieve the fixed-wing aircraft 20 from wing-borne flight, the operator first attaches the retrieval assembly 1000 to the multi-copter 10. Here, the operator attaches the hook 1150 of the base plate 1100 to the cam 350 of the saddle 300 of the hub module 100 in a manner similar to that in which the operator attaches the hook 21 of the fixed-wing aircraft 20 to the saddle 300. Specifically, the operator attaches the hook 1150 to the cam 350 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392a on the end of the lock servo motor arm 392 engages the cam servo motor arm lock device 382a of the cam servo motor arm 382; and (3) seating the rearwardly-curved hook 1150 attached to the base plate 1100 on the cam 350 such that hook generally rests on the ridge 351 of the cam 350 and the tip of the hook is disposed in the valley 353 of the cam 350.

At this point the retrieval assembly 1100 is attached to the cam 350 (and the hub base 100) and the curved section 1120 of the base plate 1100 of the retrieval assembly 1000 contacts the front and rear aircraft engaging brackets 340a and 340b (to prevent the retrieval assembly 1000 from rotating relative to the multi-copter 10 about the pitch, yaw, and roll axes of the multi-copter 10).

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint). This prevents undesired detachment of the retrieval assembly 1000 from the cam 350 (and the multi-copter 10).

After the hub module 100 is attached to the retrieval assembly 1000, the operator: (1) if removed, attaches the front and rear landing gear modules 600a to 600d to their respective front and rear landing gear extension modules

500a to 500d; (2) attaches the front and rear landing gear extension modules 500a to 500d to their respective rotor arm modules 400a to 400d; and (3) attaches and locks the rotor arm modules 400a to 400d to the hub module 100 to complete assembly of the multi-copter 10. In other embodiments, the operator need not take this step, as the front and rear landing gear 1400a-1400d of the retrieval assembly 1000 function as the landing gear for the multi-copter 10.

The operator attaches a connector 2100, such as a spring-loaded hook or any other suitable connector, to the free end of the flexible capture member 2000. The operator attaches an aerodynamic tensioning object 3000, here a kite-shaped object, to the connector 2100, thereby attaching the tensioning object 3000 to the flexible capture member 2000. The tensioning object 3000 is heavy enough (here, 2 kilograms, though it may have any other suitable mass) to tension the flexible capture member 2000 during retrieval and keep it relatively straight to improve targeting success of the fixed-wing aircraft 20 and to prevent (or reduce the chances of) the flexible capture member 2000 from bouncing off of the wing of the fixed-wing aircraft 20 and fouling retrieval.

The operator closes the idle power circuit of the multi-copter 10 to perform various preflight checks, as described above, and then closes the main power circuit to power the rotor motors. The operator then arms the controller 272, as described above. At this point, as described in more detail below, the multi-copter 10 is manually or autonomously controlled (or a combination of both) to capture the fixed-wing aircraft 20 from free flight and land the fixed-wing aircraft 20 and the multi-copter 10 according to the following general steps: (1) remotely controlling the multi-copter 10 to fly to a pre-capture altitude; (2) remotely controlling the motor of the winch 1200 to rotate the drum to wind out a first portion of the flexible capture member 2000 off of the drum; (3) remotely controlling the multi-copter 10 to fly until the fixed-wing aircraft 20 contacts and captures the flexible capture member 2000; (4) remotely controlling the motor of the winch 1200 to rotate the drum to begin winding in the flexible capture member 2000 until the fixed-wing aircraft 20 reaches the drum; and (5) remotely controlling the multi-copter 10 to land.

Figure 10A:
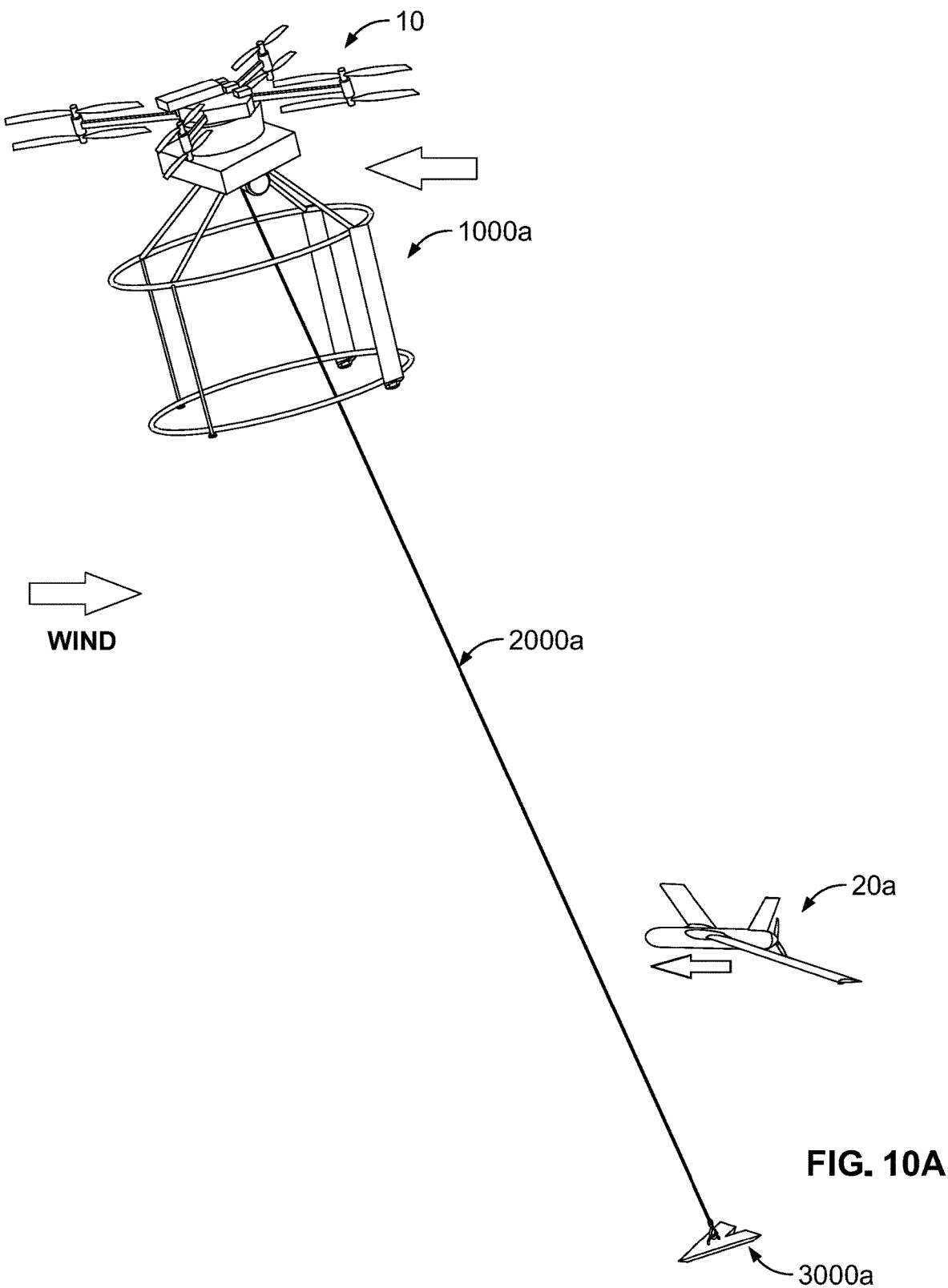
FIGS. 10A-10F are diagrammatic views of a multi-copter using the retrieval apparatus, the flexible capture member, and the tensioning object of FIGS. 9A and 9B to retrieve a fixed-wing aircraft from wing-borne flight.

FIGS. 10A-10F show one example manner of retrieving a fixed-wing aircraft 20a from wing-borne flight using a retrieval assembly 1000a attached to a multi-copter 10. Neither the landing gear modules of the multi-copter 10 nor the details of the base of the retrieval assembly 1000a are shown for clarity. In this example, as the fixed-wing aircraft 20a approaches the retrieval location, the operator remotely controls the multi-copter 10 to climb to a pre-capture altitude. The operator also remotely controls the motor of the winch to rotate the drum in the first direction to wind a first portion of (such as a designated length of) the flexible capture member 2000a off of the drum. Once the first portion of the flexible capture member 2000a is wound off of the drum, the operator remotely controls the multi-copter 10 to fly into the wind, as shown in FIG. 10A.

Figure 10B:
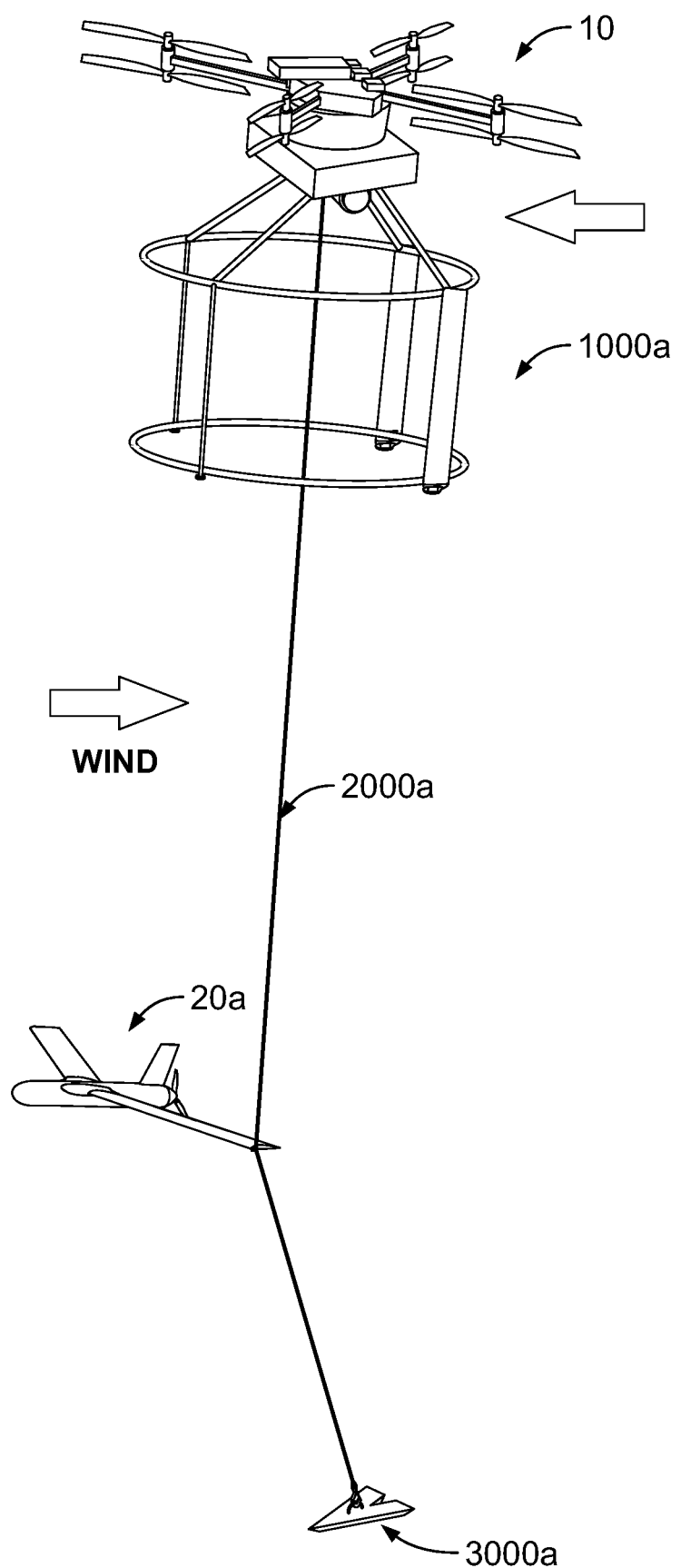

As shown in FIG. 10B, the fixed-wing aircraft 20a is flown toward, contacts, and captures part of the flexible capture member 2000 in a manner similar to that described in U.S. Pat. No. 6,264,140, the entire contents of which are incorporated herein by reference. Specifically, the fixed-wing aircraft 20a is flown toward the flexible capture member 2000a such that the leading edge of one of the wings of the fixed-wing aircraft 20a contacts the flexible capture member 2000a. After the leading edge of the wing contacts the flexible capture member 2000a, continued movement of the fixed-wing aircraft 20a relative to the flexible capture member 2000a causes the capture flexible capture member 2000a to slide away from the fuselage of the fixed-wing aircraft 20a along the leading edge of the wing toward the end of the wing until a capture device (not shown) near the end of the wing captures part of the flexible capture member 2000a. In this embodiment, the capture device includes a cleat such that the fixed-wing aircraft 20a does not slide along the flexible capture member 2000a after capture.

Figure 10C:
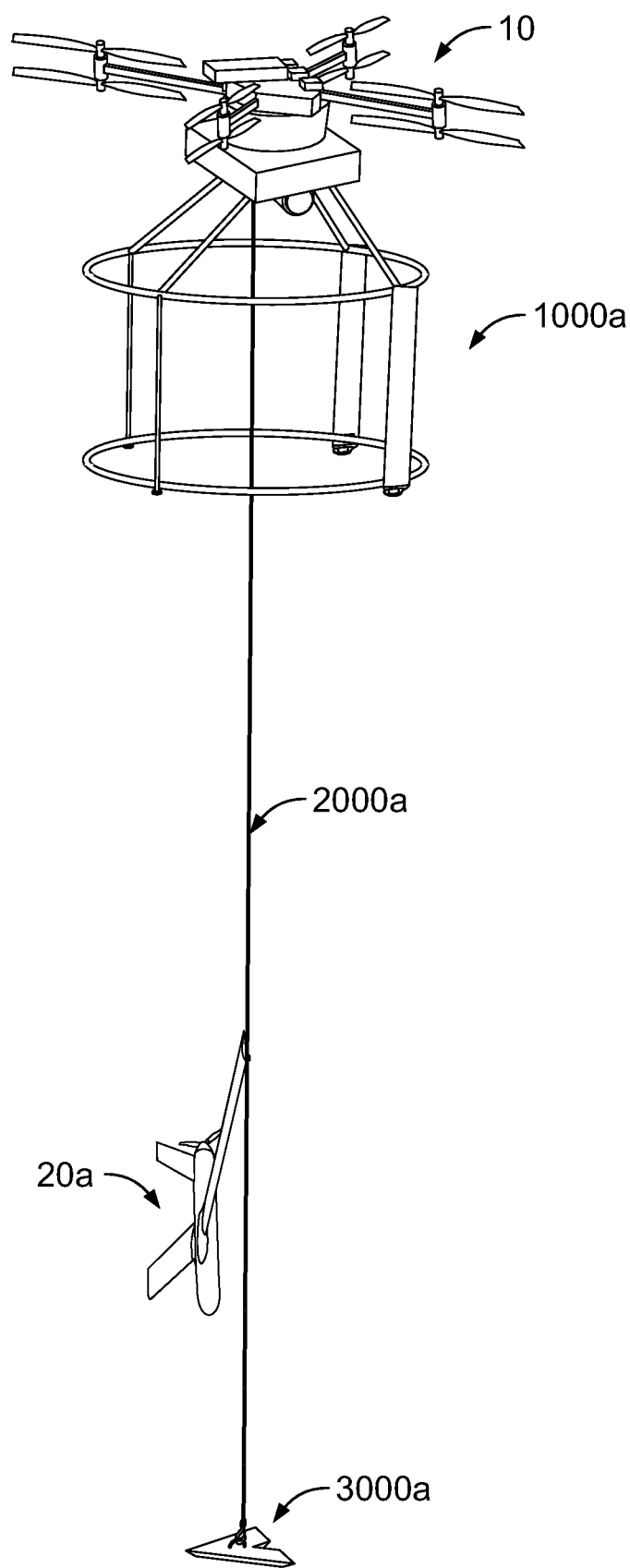
Figure 10D:
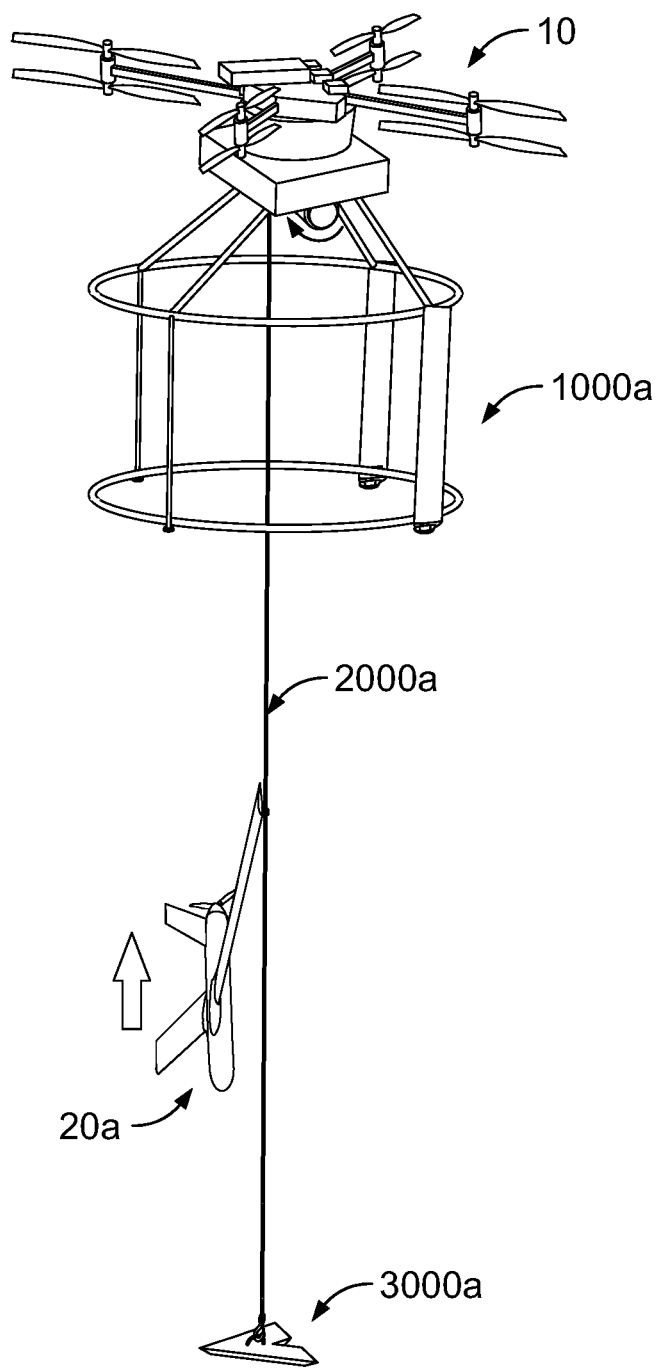
Figure 10E:
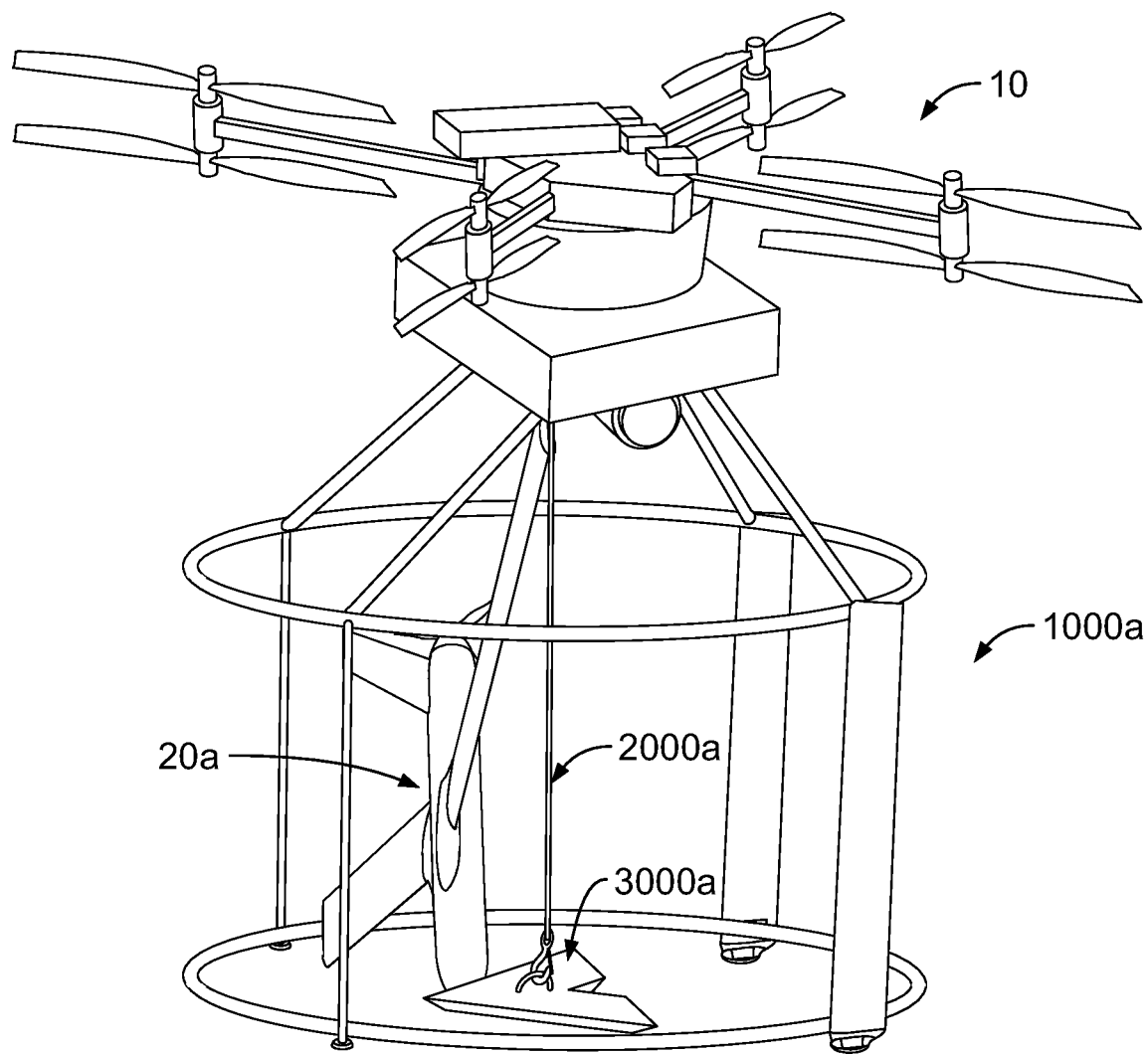

The multi-copter 10 station-keeps in place until the fixed-wing aircraft 20a stops moving and hangs below the multi-copter 10, as shown in FIG. 10C. At this point, operator remotely controls the motor of the winch to rotate the drum in the second direction to begin winding the flexible capture member 2000a back onto the drum. This draws the fixed-wing aircraft 20a toward the multi-copter 10, as shown in FIG. 10D. The operator remotely controls the motor of the winch to stop rotating the drum once the fixed-wing aircraft is positioned within fixed-wing aircraft receiving volume that the retrieval assembly 1000a defines (or until the fixed-wing aircraft 20a reaches the drum). At this point, the front and rear landing gear and the upper and lower stabilizers surround and extend below the fixed-wing aircraft 20a. In some embodiments, the operator stops the motor of the winch at this point. In this embodiment, however, the operator remotely controls the motor of the winch to continue to rotate the drum in the second direction after the fixed-wing aircraft 20a reaches the winch to continue drawing the tensioning object toward the multi-copter and into the fixed-wing aircraft receiving volume, as shown in FIG. 10E. In these embodiments, the winch pulls the flexible capture member through the capture device on the wing of the fixed-wing aircraft.

Figure 10F:
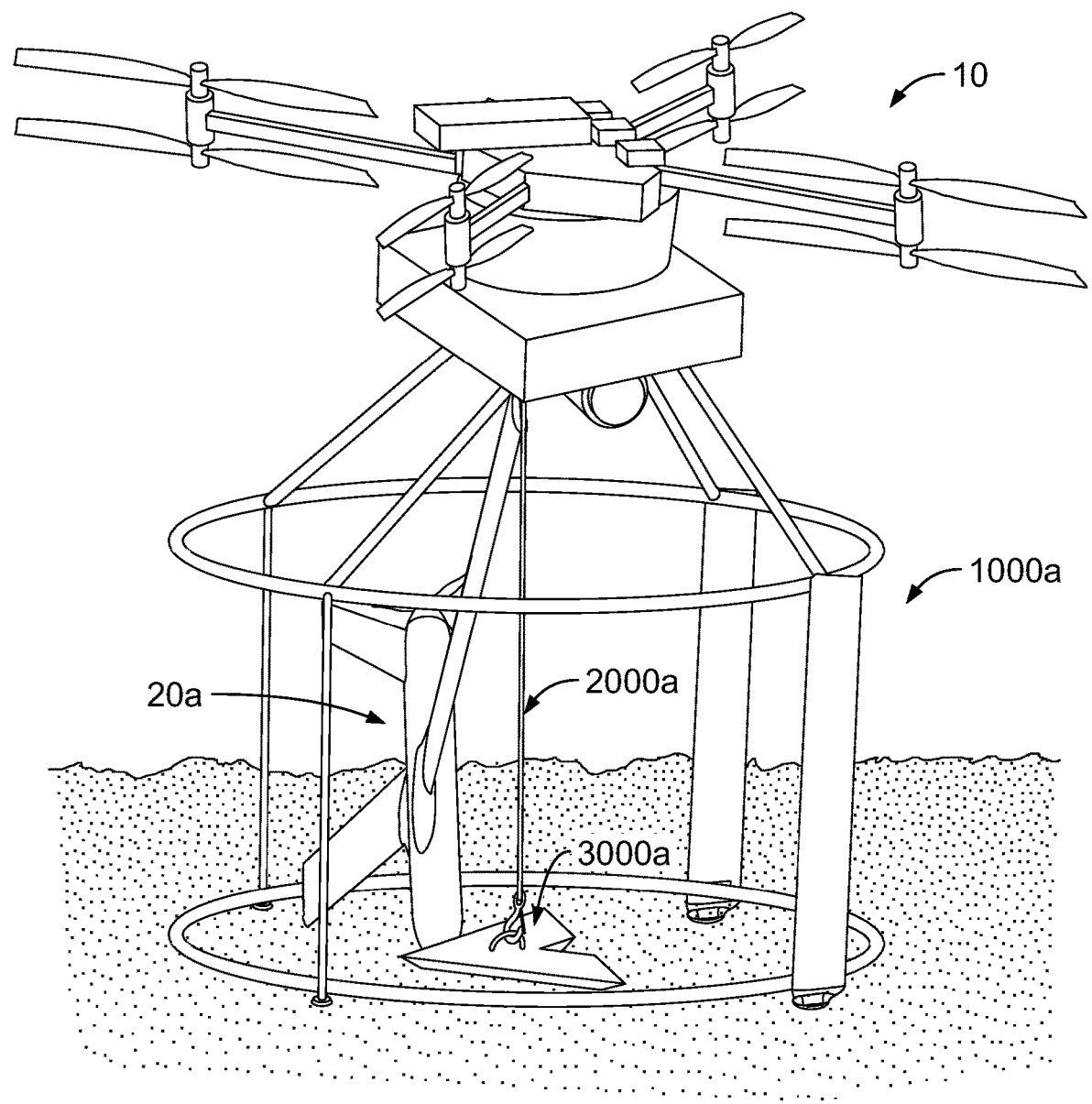

After capture, the operator remotely controls the multi-copter 10 to land in a desired landing location. Since the internal height of the retrieval assembly is larger than the wingspan of the fixed-wing aircraft 20a, the fixed-wing aircraft 20a does not contact the ground during landing, as shown in FIG. 10F.

Figure 11:
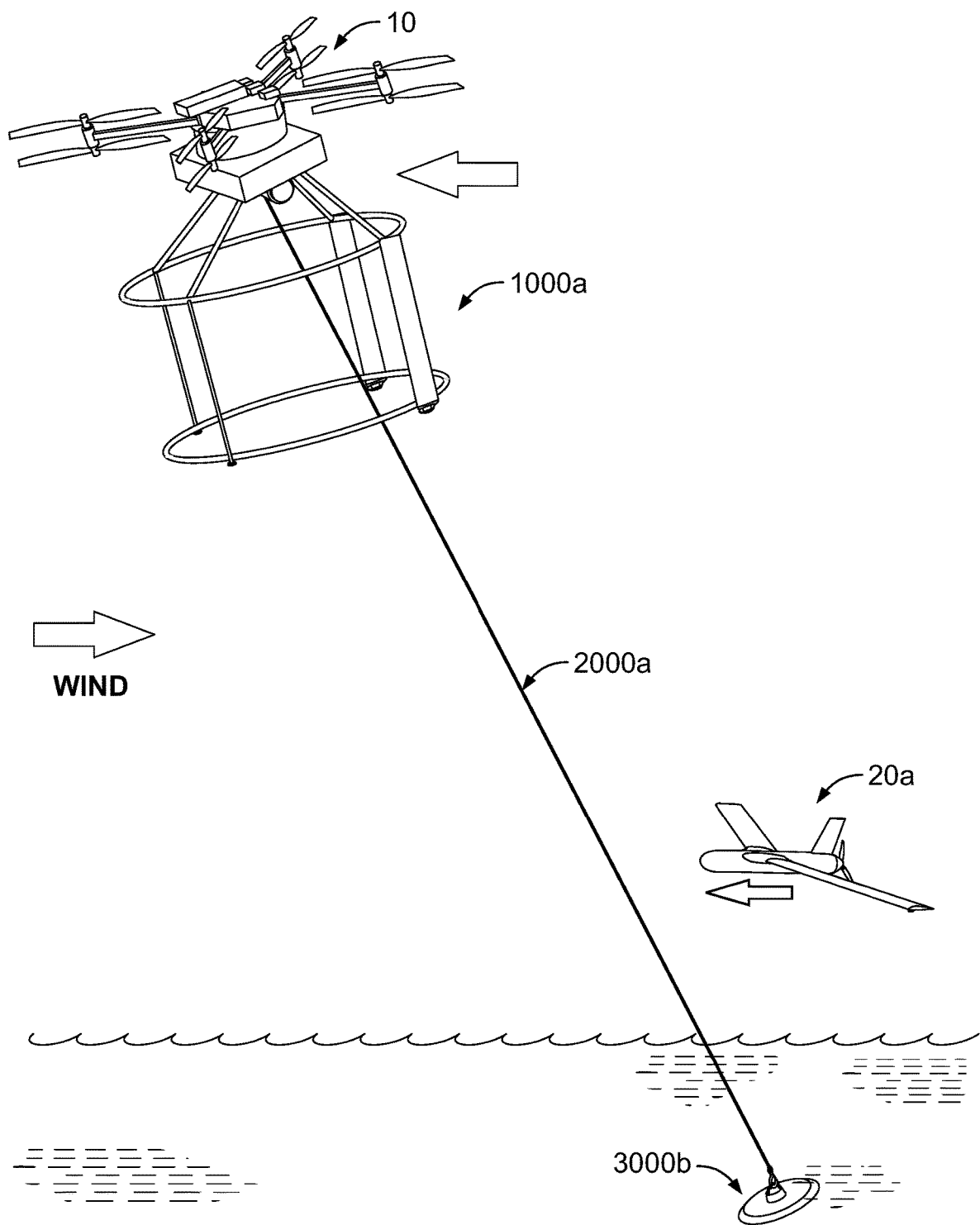
FIG. 11 is a diagrammatic view of a multi-copter using the retrieval apparatus and the flexible capture member of FIGS. 9A and 9B and another embodiment of the tensioning object to retrieve a fixed-wing aircraft from wing-borne flight over a body of water.
Figure 12A:
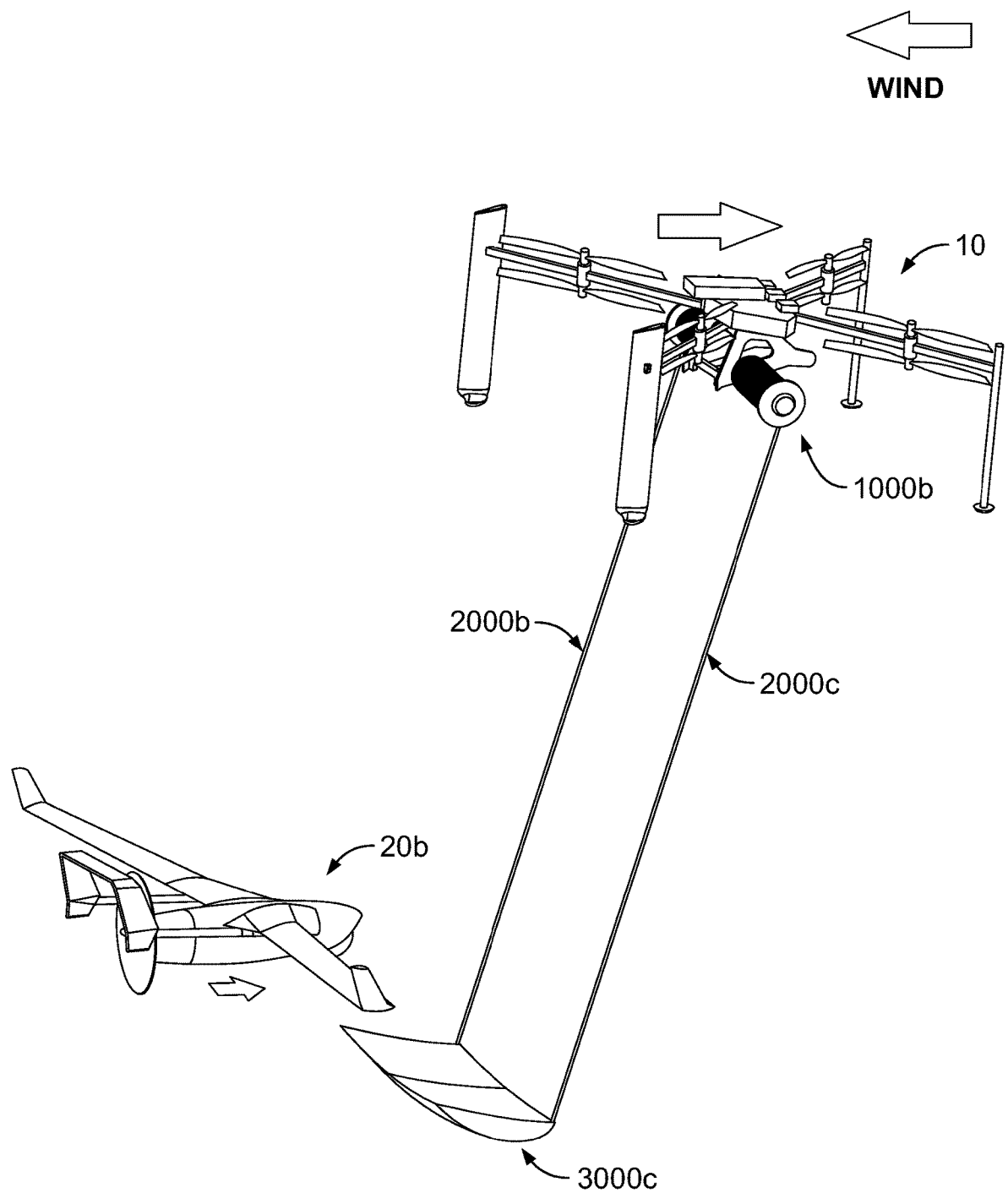
FIGS. 12A-12D are diagrammatic views of a multi-copter using another embodiment of the retrieval apparatus, the flexible capture members, and the tensioning object of the present disclosure to retrieve a fixed-wing aircraft from wing-borne flight.
Figure 12B:
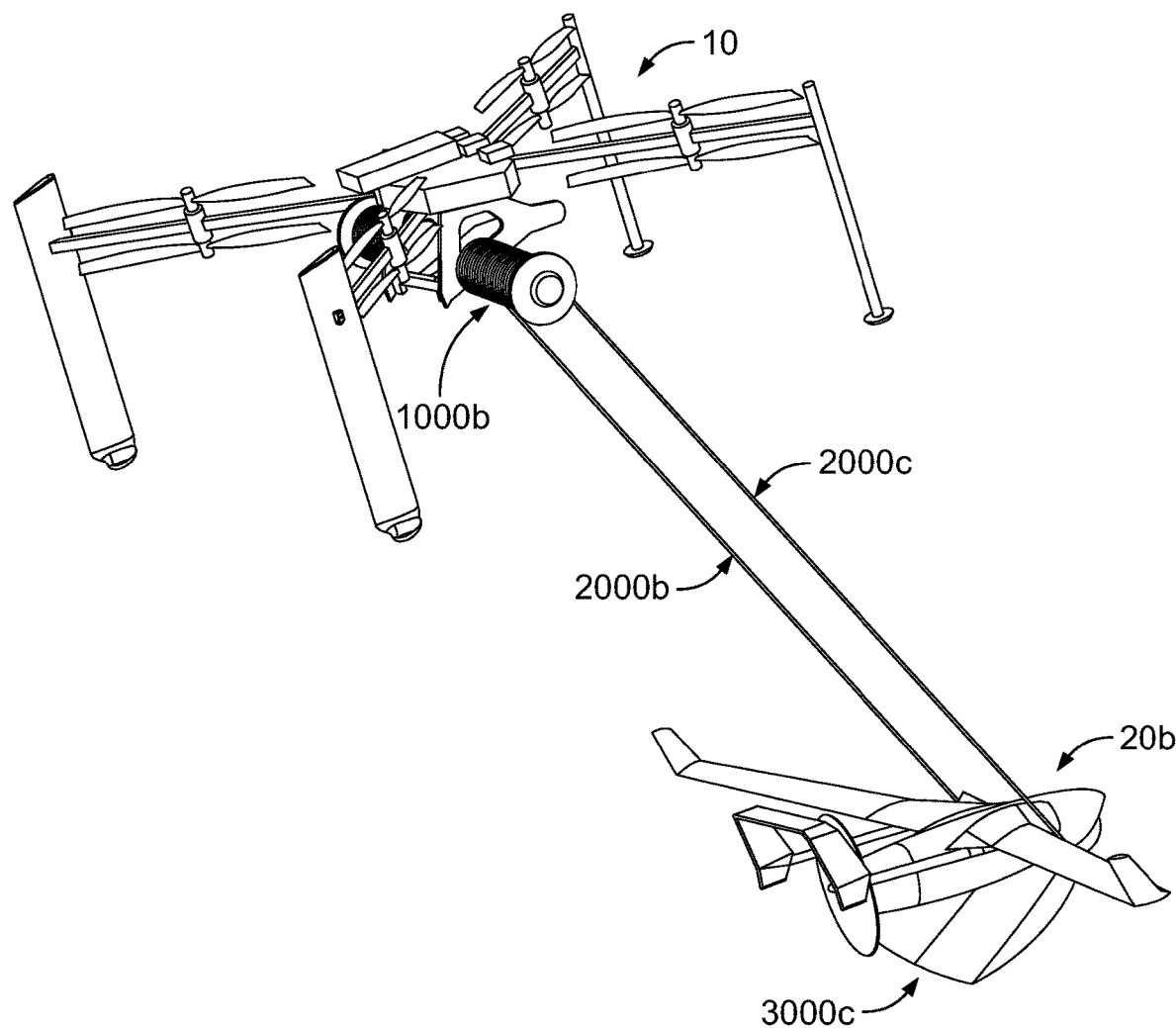
Figure 12C:
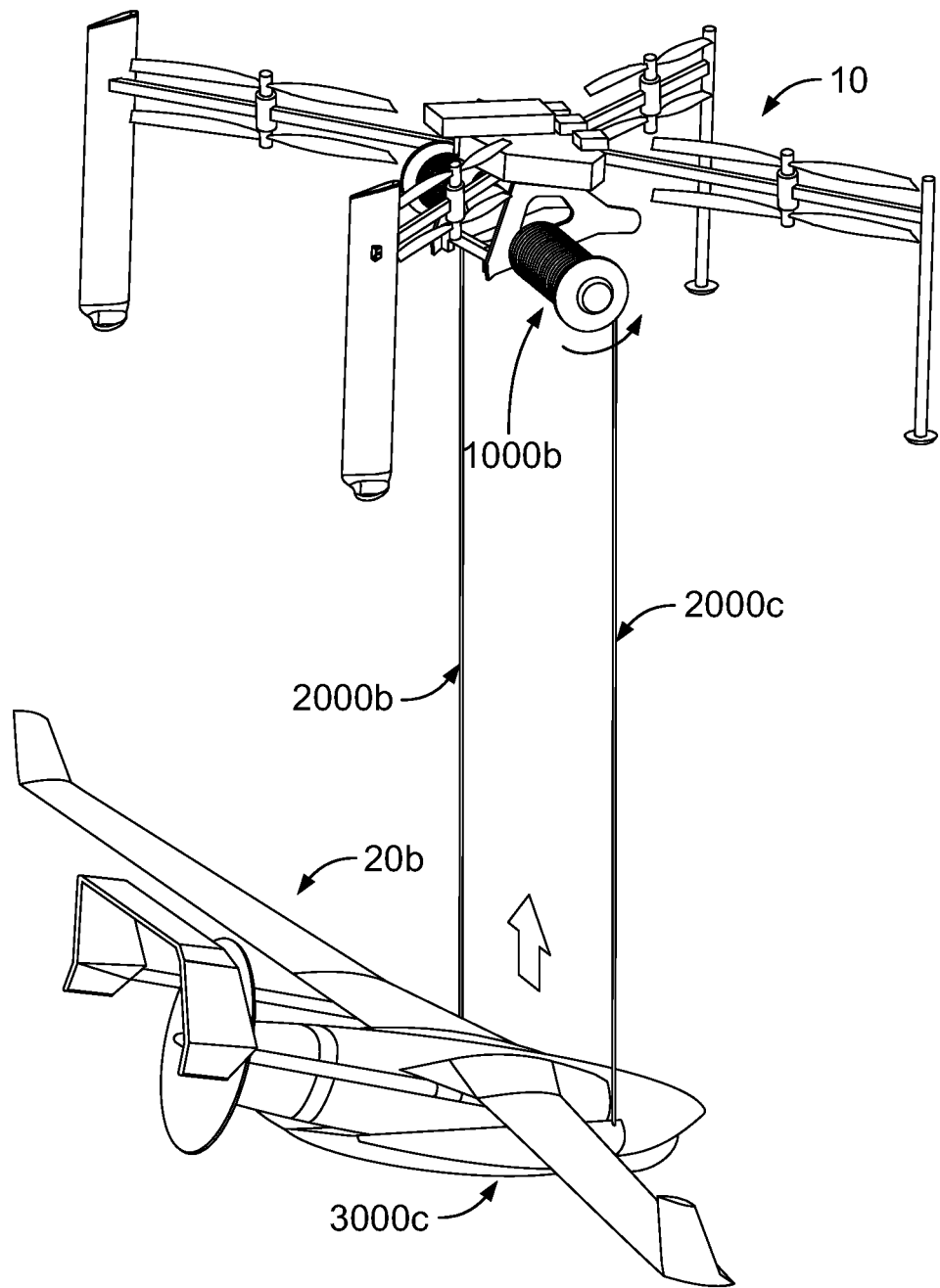
Figure 12D:
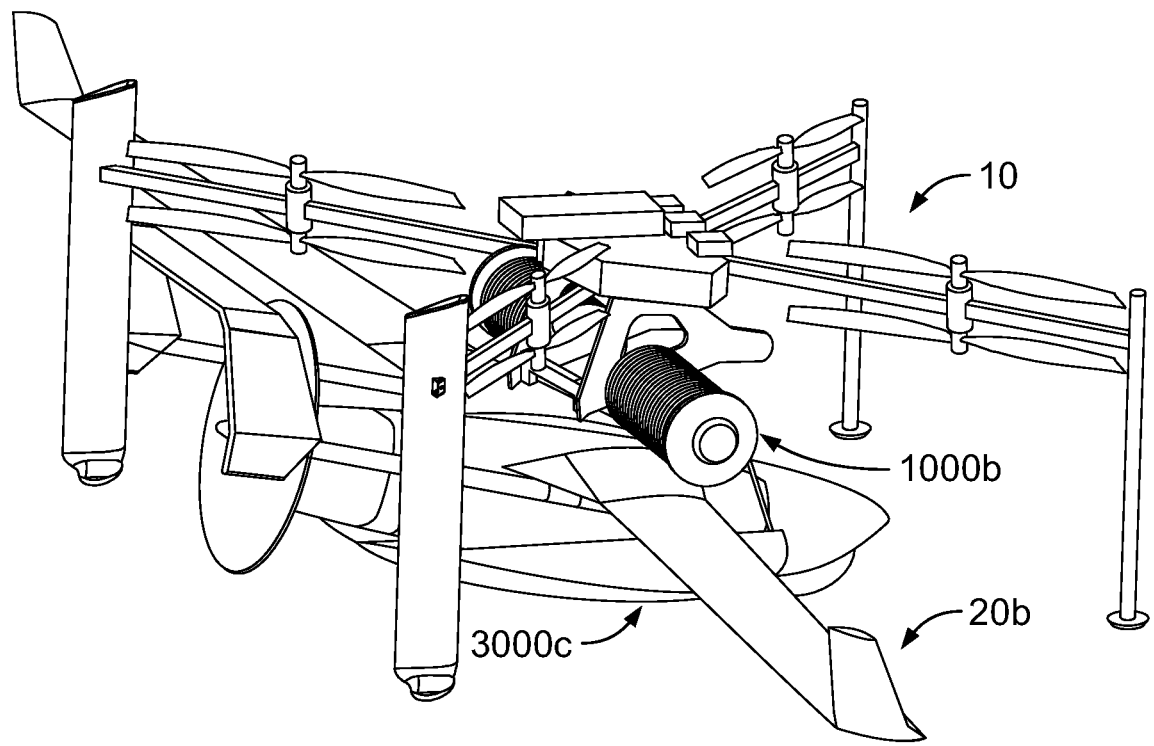

In other embodiments, the fixed-wing aircraft is retrieved while the multi-copter is flying above a body of water. In these embodiments, as shown in FIG. 11, after the operator remotely controls the motor of the winch to rotate the drum in the first direction to pay out the first portion of the flexible capture member from the drum, the operator remotely controls the multi-copter to fly such that a tensioning object 3000b is submerged in the body of water before the fixed-wing aircraft impacts and captures the part of the first portion of the flexible capture member. The hydrodynamic force imparted by the tensioning object 3000b ensures the flexible capture member is tensioned enough to prevent (or reduce the chances of) the flexible capture member from bouncing off of the wing of the fixed-wing aircraft and preventing retrieval. This hydrodynamic force includes a vector sum of lift and drag as the tensioning object is moved through the water. The quantity of energy dissipated into this damper is estimated as the tension force, multiplied by the stroke along the capture member axis. A well-tuned system may dissipate significant energy into this damper, to minimize the momentum exchange (and associated disturbance) into the multi-copter.

The base may be attached to the multi-copter in any other suitable manner, such as via fasteners, buckles, or lashing.

In certain embodiments, the landing gear is attachable to the landing gear extension modules of the multi-copter. In these embodiments, to prepare the multi-copter for retrieval, the operator replaces the multi-copter's landing gear modules with the landing gear of the retrieval assembly.

FIGS. 12A-12D show one example method of retrieving a fixed-wing aircraft 20b from wing-borne flight using another embodiment of the retrieval assembly 1000b attached to a multi-copter 10. The retrieval assembly 1000b includes a base 1100b attachable to the multi-copter 10 and a winch 1200b attached to the base 1100b. One end of a first flexible capture member 2000b (such as a fibrous or wire rope) and one end of a second flexible capture member 2000c (such as a fibrous or wire rope) are attached to the drum of the winch 1200b, and the first and second flexible capture members 2000b and 2000c are wound around the drum.

The first and second flexible capture members 2000b and 2000c each terminate in a free end, and the free ends are attached to a tensioning object 3000c. The tensioning object 3000c includes a kite, though any suitable object may be employed.

In this example, as the fixed-wing aircraft 20b approaches the retrieval location, the operator remotely controls the multi-copter 10 to climb to a pre-capture altitude. The operator also remotely controls the motor of the winch to rotate the drum in a first direction to wind a first portion of (such as a designated length of) the first flexible capture member 2000b and a first portion of the second flexible capture member 2000c off of the drum. Once the first portions of the first and second flexible capture members 2000b and 2000c are would off of the drum, the operator remotely controls the multi-copter 10 to fly into the wind, as shown in FIG. 11A.

As shown in FIG. 11B, the fixed-wing aircraft 20b is flown toward the first and second flexible capture members 2000b and 2000c such that its nose enters the space between the first and second flexible capture members 2000b and 2000c and its wings contact the first and second flexible capture members 2000b and 2000c. As the fixed-wing aircraft 20b slows to match the speed of the multi-copter 10, the fixed-wing aircraft 20b slides downward along the first and second flexible capture members 2000b and 2000c until it reaches the tensioning object 3000c.

The multi-copter 10 station-keeps in place until the fixed-wing aircraft 20b stops moving and hangs below the multi-copter 10, as shown in FIG. 11C. At this point, operator remotely controls the motor of the winch to rotate the drum in a second direction to begin winding the first and second flexible capture members 2000b and 2000c back onto the drum. This draws the fixed-wing aircraft 20b toward the multi-copter 10. The operator remotely controls the motor of the winch to stop rotating the drum once the fixed-wing aircraft 20b reaches an aircraft-stabilizing component of the retrieval assembly 2000b or the multi-copter 10 that contacts and retains the fixed-wing aircraft 20b in a generally level orientation.

After capture, the operator remotely controls the multi-copter 10 to land in a desired landing location. Since the landing gear of the multi-copter 10 extend below the fixed-wing aircraft 20b, neither the fixed-wing aircraft 20b nor the multi-copter 10 contact the landing surface during landing.

FIGS. 13A-13D show another example method of retrieving a fixed-wing aircraft 20b from wing-borne flight using the example retrieval assembly 1000b attached to the example multi-copter 10. The retrieval assembly 1000b includes a base 1100b attachable to the multi-copter 10 and a winch 1200b attached to the base 1100b. Respective first ends of a first flexible member 2000b (such as a fibrous or wire rope) and a second flexible member 2000c (such as a fibrous or wire rope) are respectively attached to the drums (not labeled) of the winch 1200b. The first and second flexible members 2000b and 2000c are respectively wound around the drums. The first and second flexible members 2000b and 2000c each terminate in a respective free end, and the free ends are attached to a tensioning object 3000d. In this example embodiment, the tensioning object 3000d functions as an aircraft capture and holding device as described below.

Figure 13A:
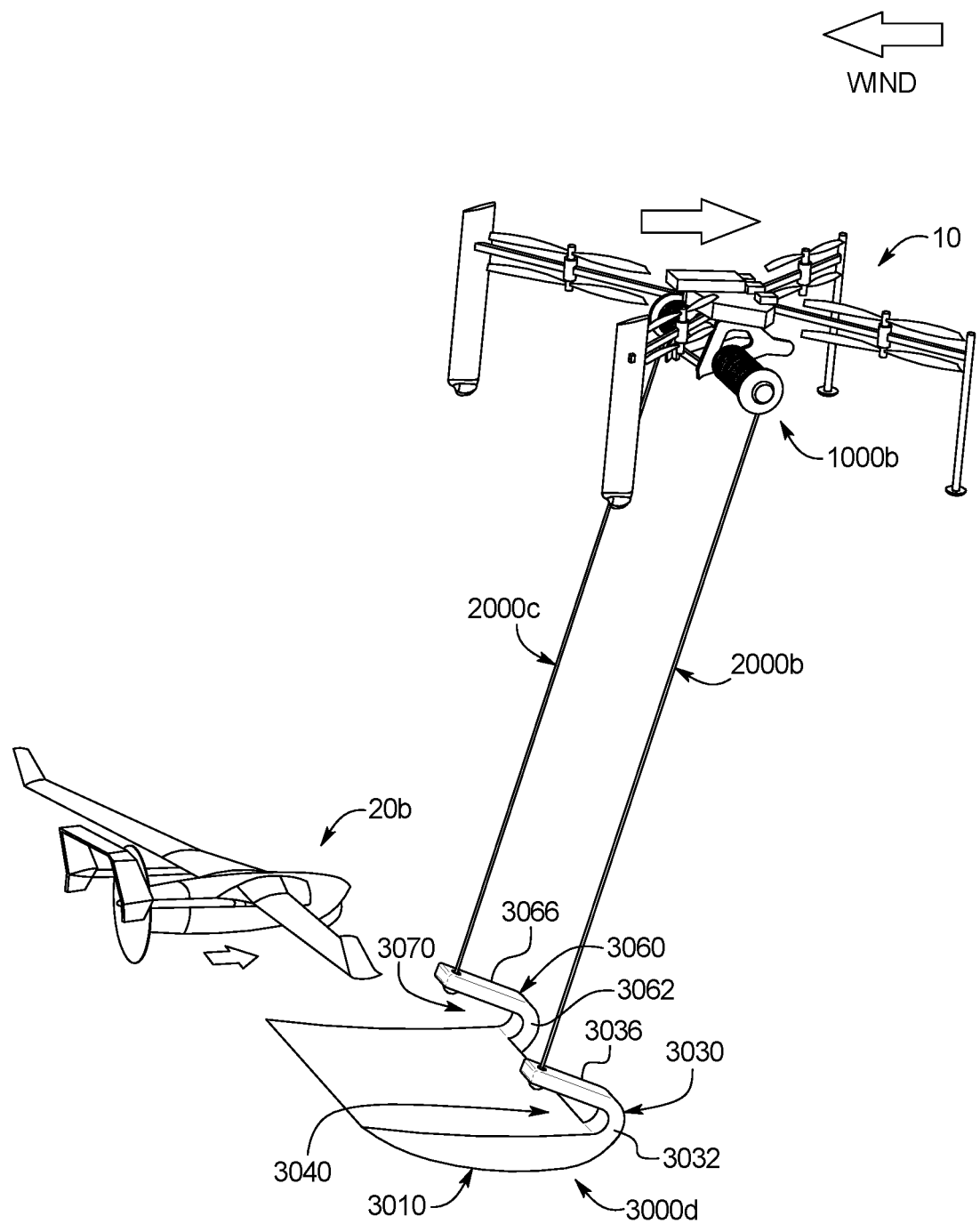
FIGS. 13A-13D are diagrammatic views of a multi-copter using another embodiment of the retrieval apparatus, the flexible capture members, and the tensioning object of the present disclosure to retrieve a fixed-wing aircraft from wing-borne flight.
Figure 13B:
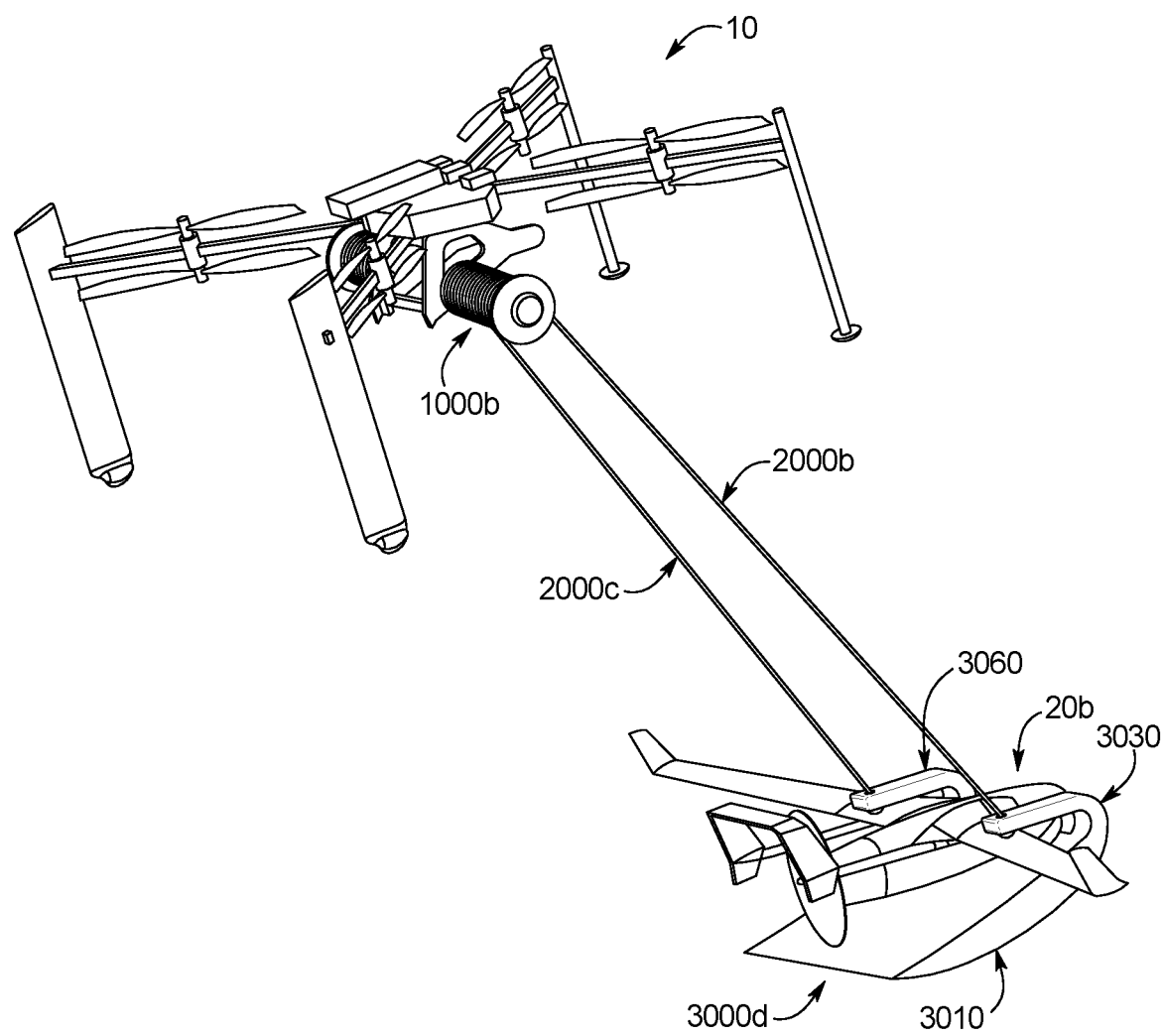
Figure 13C:
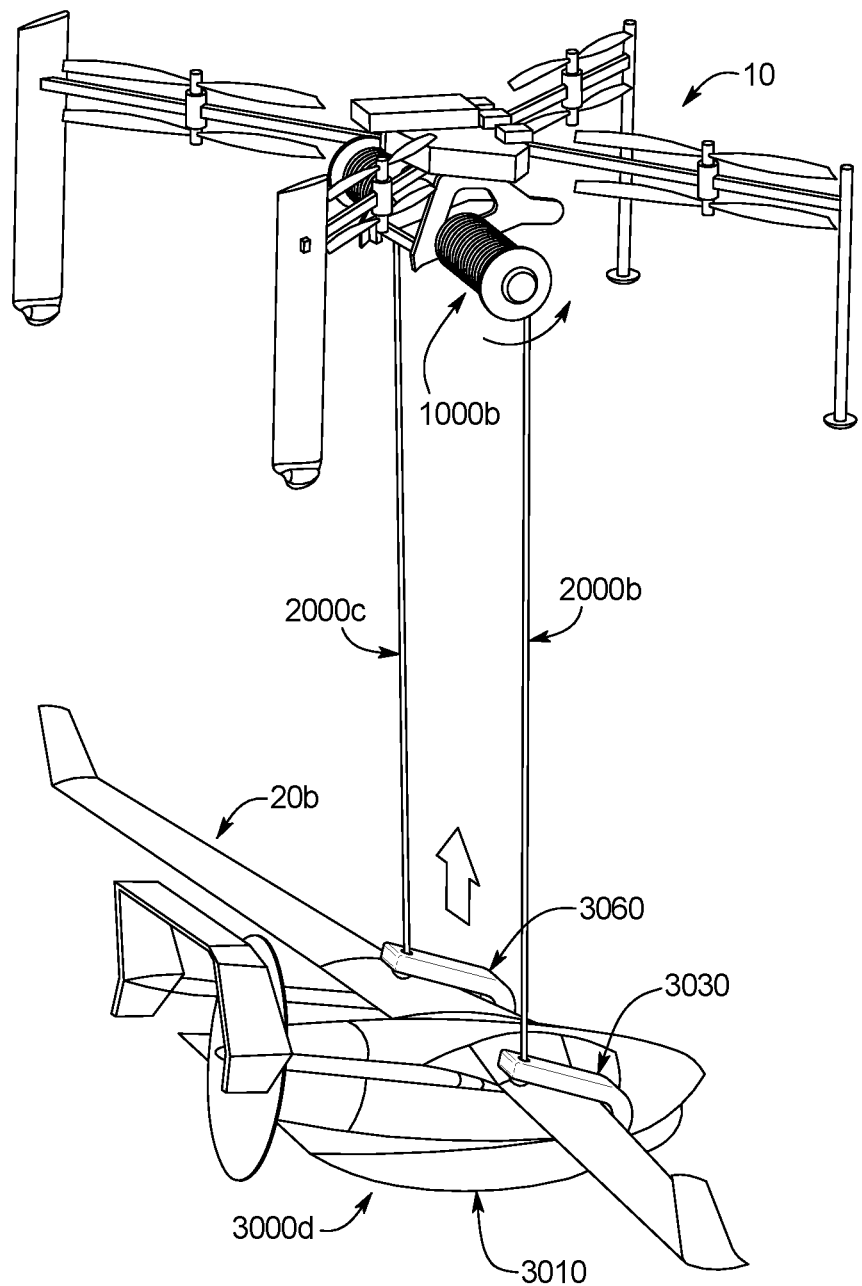
Figure 13D:
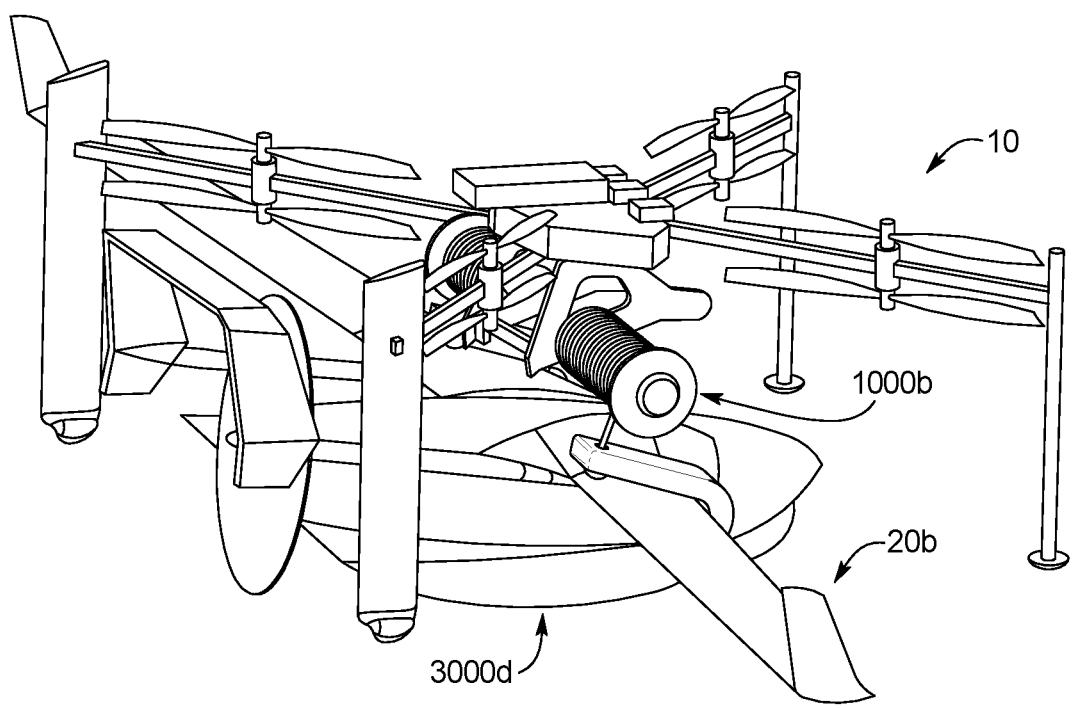

In this alternative example embodiment, the tensioning object 3000d includes: (1) a sled or aircraft platform 3010; (2) a first aircraft capture arm 3030 connected to and extending upwardly from the platform 3010; and (3) a second aircraft capture arm 3060 connected to and extending upwardly from the platform 3010. The first aircraft capture arm 3030 is aligned with but spaced apart from the second aircraft capture arm 3060 such that a forward part of the fuselage (not labeled) of the aircraft 20b can extend between the first aircraft capture arm 3030 and the second aircraft capture arm 3060 such as shown in FIGS. 13B, 13C, and 13D.

In this example embodiment, the first aircraft capture arm 3030 includes: (1) an upwardly extending front wing surface engaging section 3032; and (2) an upwardly and rearwardly extending top wing surface engaging section 3036. The bottom end of section 3032 is connected to the platform 3010 and the top end of section 3032 is connected to section 3036. The bottom end of section 3036 is connected to the top end of section 3032 and the top end of section 3036 is a free end. The first flexible member 2000b is connected to the top end of section 3036 at or adjacent to the end point of the free end thereof. The upwardly extending front wing surface engaging section 3032 is configured to be adjacent to or to engage the front edge surface of the right wing of the aircraft 20b when the aircraft rests on the platform 3010. The upwardly and rearwardly extending top wing surface engaging section 3036 is configured to be adjacent to or to engage the top surface of the right wing of the aircraft 20b when the aircraft rests on the platform 3010. Sections 3032 and 3036 partly define (along with the platform 3010) a wing receiving pocket 3040 configured to receive the right wing of the aircraft 20b. Sections 3032 and 3036 are also configured to hold the right wing of the aircraft 20b in the wing receiving pocket 3040, and thus hold the aircraft 20b on the platform 3010.

Likewise, in this example embodiment, the second aircraft capture arm 3060 includes: (1) an upwardly extending front wing surface engaging section 3062; and (2) an upwardly and rearwardly extending top wing surface engaging section 3066. The bottom end of section 3062 is connected to the platform 3010 and the top end of section 3062 is connected to section 3066. The bottom end of section 3066 is connected to the top end of section 3062 and the top end of section 3066 is a free end. The second flexible member 2000c is connected to the top end of section 3066 at or adjacent to the end point of the free end thereof. The upwardly extending front wing surface engaging section 3062 is configured to be adjacent to or to engage the front edge surface of the left wing of the aircraft 20b when the aircraft rests on the platform 3010. The upwardly and rearwardly extending top wing surface engaging section 3066 is configured to be adjacent to or to engage the top surface of the left wing of the aircraft 20b when the aircraft rests on the platform 3010. Sections 3062 and 3066 partly define (along with the platform 3010) a wing receiving pocket 3070 configured to receive the left wing of the aircraft 20b. Sections 3062 and 3066 are also configured to hold the left wing of the aircraft 20*b* in the wing receiving pocket 3070, and thus hold the aircraft 20*b* on the platform 3010.

In this example, as the fixed-wing aircraft 20*b* approaches the retrieval location, the operator remotely controls the multi-copter 10 to climb to a pre-capture altitude. The operator remotely controls the motor of the winch to rotate the drums in a first direction to wind a first portion of the first flexible member 2000*b* and a first portion of the second flexible member 2000*c* off of the drums. Once the first portions of the first and second flexible members 2000*b* and 2000*c* are wound off of the drums, the operator remotely controls the multi-copter 10 to fly into the wind, as shown in FIGS. 13A. As shown in FIGS. 13A and 13B, the fixed-wing aircraft 20*b* is flown such that its nose enters the space between the first and second aircraft capture arms 3030 and 3060. As the right and left wings respectively enter the pockets 3040 and 3070, the wings contact one or more of the inner surfaces of the first and second aircraft capture arms 3030 and 3060. Thus, the object 3000*d* captures the aircraft 20*b*. The aft-reaching or rearwardly extending capture arms 3030 and 3060 collectively assist in controlling the (negative pitch) angle of the object 3000*d* and forcing the fixed-wing aircraft nose-down at recovery. This helps to keep the flexible members 2000*b* and 2000*c* taught while in "sling load" mode and while uphauling to the multi-copter. The multi-copter 10 station-keeps in place until the fixed-wing aircraft 20*b* stops moving and hangs below the multi-copter 10 on the platform 3010 with its wings in the respective pockets 3040 and 3070, as shown in FIG. 13C. At this point, operator remotely controls the motor of the winch to rotate the drums in a second direction to begin winding the first and second flexible members 2000*b* and 2000*c* back onto the drums. This draws the fixed-wing aircraft 20*b* toward the multi-copter 10. The operator remotely controls the motor of the winch to stop rotating the drums once the fixed-wing aircraft 20*b* reaches an aircraft-stabilizing component of the retrieval assembly 2000*b* as shown in FIG. 13D. After capture, the operator remotely controls the multi-copter 10 to land in a desired landing location. Since the landing gear of the multi-copter 10 extend below the fixed-wing aircraft 20*b*, neither the fixed-wing aircraft 20*b* nor the multi-copter 10 contact the landing surface during landing.

It should be appreciated that if the fixed-wing aircraft 20*b* is flown such that its nose enters the space between the flexible members 2000*b* and 2000*c*, the flexible members 2000*b* and 2000*c* can guide the wings of the fixed-wing aircraft 20*b* downwardly into the pockets 3040 and 3070.

Figure 14:
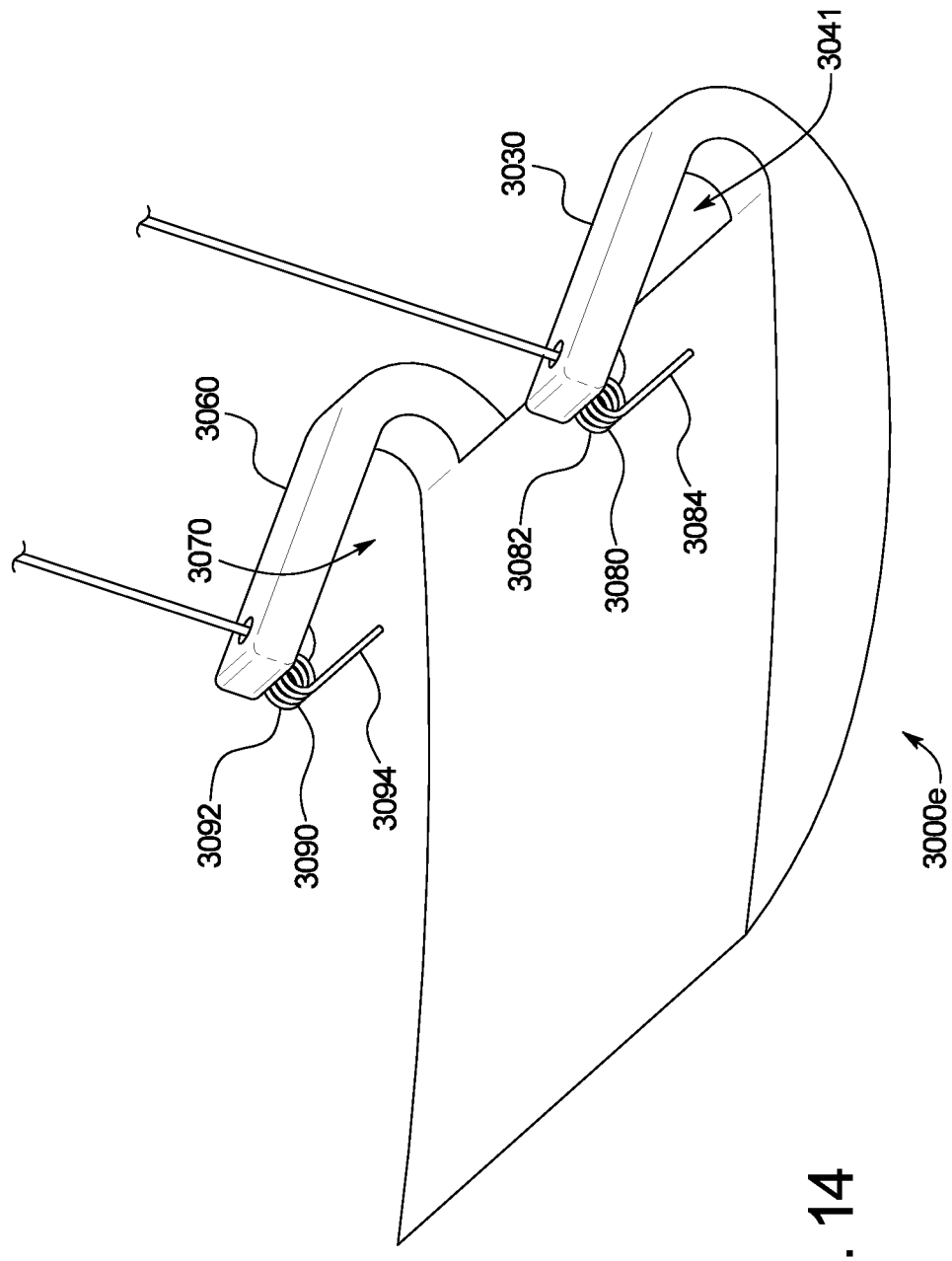
FIG. 14 is a diagrammatic fragmentary perspective view of another embodiment of the flexible capture members and the tensioning object of the present disclosure.

FIG. 14 shows another example tensioning object 3000*e* of the present disclosure. This alternative example tensioning object 3000*e* is similar to the object 3000*d* except that it additionally includes: (1) a first gate or wing locking assembly 3080 connected to the free end of the first aircraft capture arm 3030; and (2) a second gate or wing locking assembly 3090 connected to the free end of the second aircraft capture arm 3060. In this example, the first wing locking assembly includes a biasing member such as a spring 3082 and a wing locking member 3084 connected to the spring 3082. The wing locking member 3084 and the spring 3082 co-act to allow the right wing of the aircraft 20*b* to enter the pocket 3040. The wing locking member 3084 is biased by the spring 3082 to be in a locking position when the right wing of the aircraft 20*b* is in the pocket 3040. Likewise, in this example, the second wing locking assembly includes a biasing member such as a spring 3092 and a wing locking member 3094 connected to the spring 3092. The wing locking member 3094 and the spring 3092 co-act to allow the left wing of the aircraft 20*b* to enter the pocket 3070. The wing locking member 3094 is biased by the spring 3092 to be in a locking position when the left wing of the aircraft 20*b* is in the pocket 3070. It should be appreciated that one or both of the first wing locking assembly and the second wing locking assembly may be alternatively configured in accordance with the present disclosure. In various embodiments, each wing locking assembly includes a suitable release mechanism to facilitate removal of the respective wings.

Although not shown in the above described embodiments, the sleds or platforms of the present disclosure can include one or more downwardly and rearwardly extending vertical stabilizing members such as fins.

Figure 15:
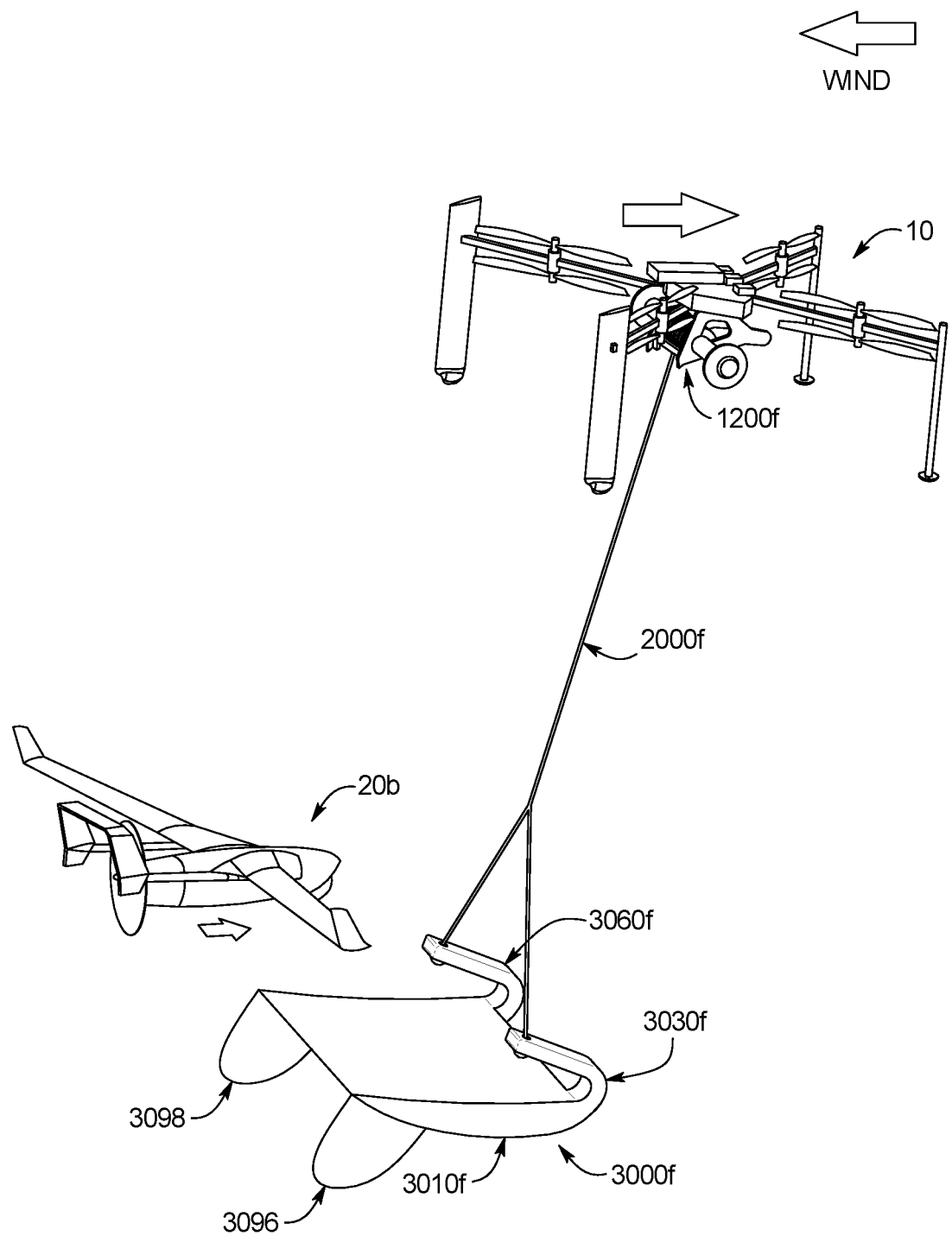
FIG. 15 is a diagrammatic fragmentary perspective view of another embodiment of the flexible capture member and the tensioning object of the present disclosure.

For example, FIG. 15 shows another example tensioning object 3000*f* of the present disclosure. This alternative example tensioning object 3000*f* is similar to the object 3000*d* except that it additionally includes: (1) a first fin 3096 connected to and extending downwardly from the sled or platform 3010*f*; and (2) a second fin 3098 connected to and extending downwardly from the sled or platform 3010*f*. This example also includes a single flexible member 2000*f* connected at an upper end to a single drum (not labeled) of the winch 1200*f*. The other end flexible member 2000*f* includes two sections attached to the tensioning object 3000*d*, and more specifically respectively attached the first aircraft capture arm 3030*f* connected to and extending upwardly from the platform 3010*f* and the second aircraft capture arm 3060*f* connected to and extending upwardly from the platform 3010*f*. It should be appreciated that in this embodiment, the second end of the flexible member can either function as or can include a load-centering yoke attached to the flexible member for centering purposes. This example embodiment functions in a similar manner as described above, except using the single flexible member. It should also be appreciated that the fins 3096 and 3098 function in a manner to better control the movement of the object 3000*f*. It should also be appreciated that this embodiment the load-centering yoke can be attached to the flexible member for centering purposes at different suitable lengths then as shown in this embodiment (e.g., higher or lower). It should be appreciated from this example embodiment that the configuration of the one or more flexible members may vary in accordance with the present disclosure.

Figure 16:
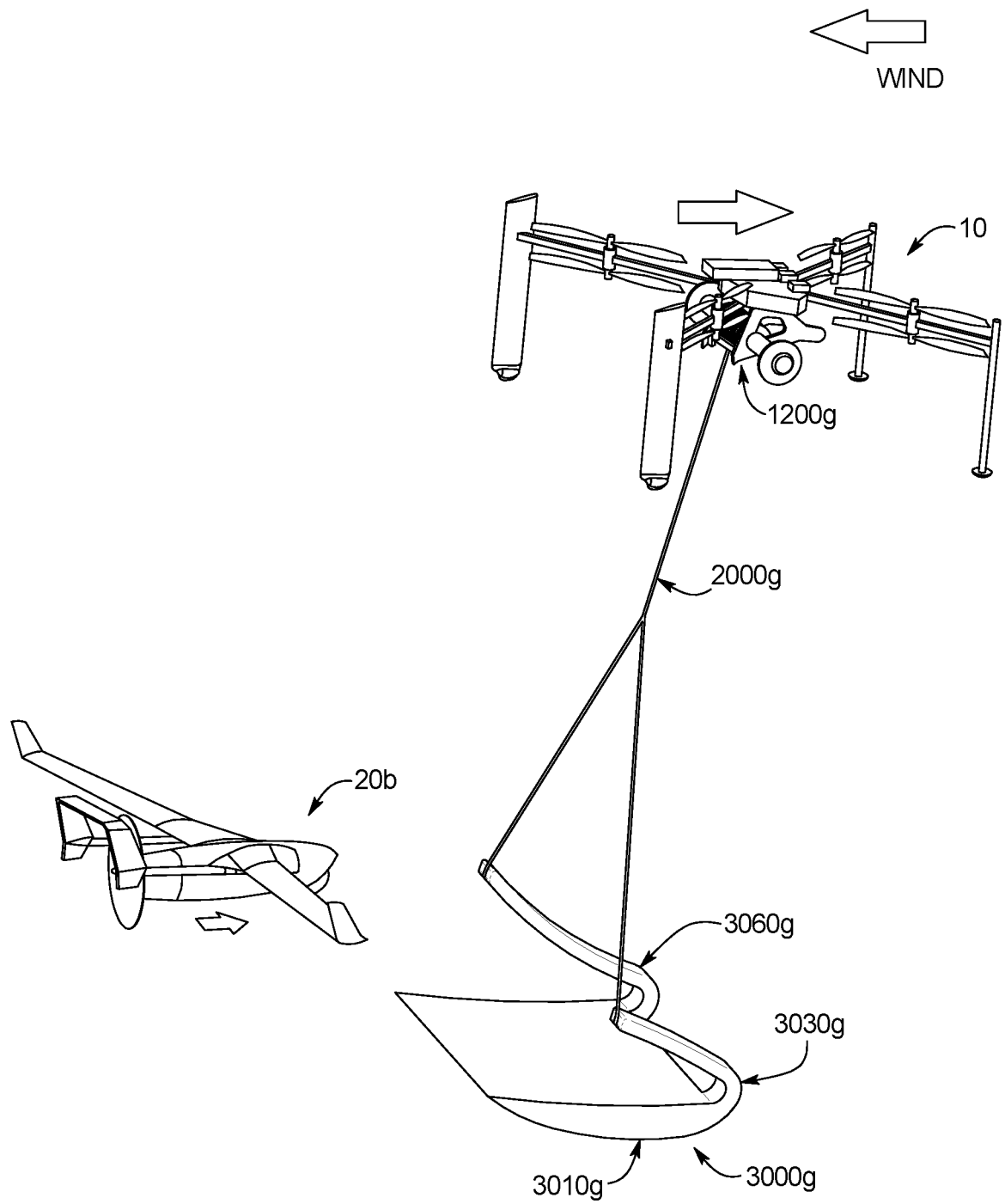
FIG. 16 is a diagrammatic view of a multi-copter using another embodiment of the retrieval apparatus, the flexible capture member, and the tensioning object of the present disclosure to retrieve a fixed-wing aircraft from wing-borne flight.
Figure 17:
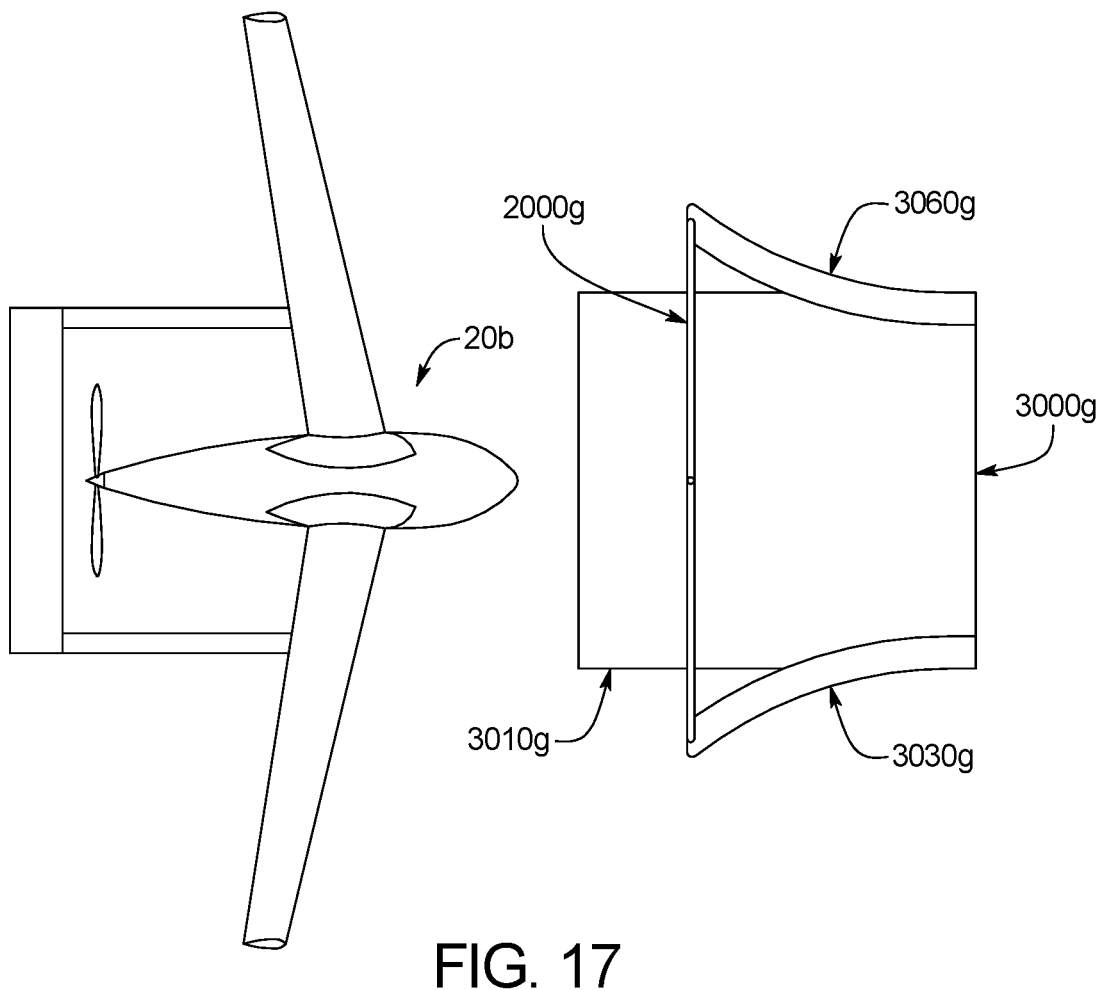
FIG. 17 is a diagrammatic fragmentary top view of the flexible capture member, the tensioning object, and the fixed-wing aircraft of FIG. 16.
Figure 18:
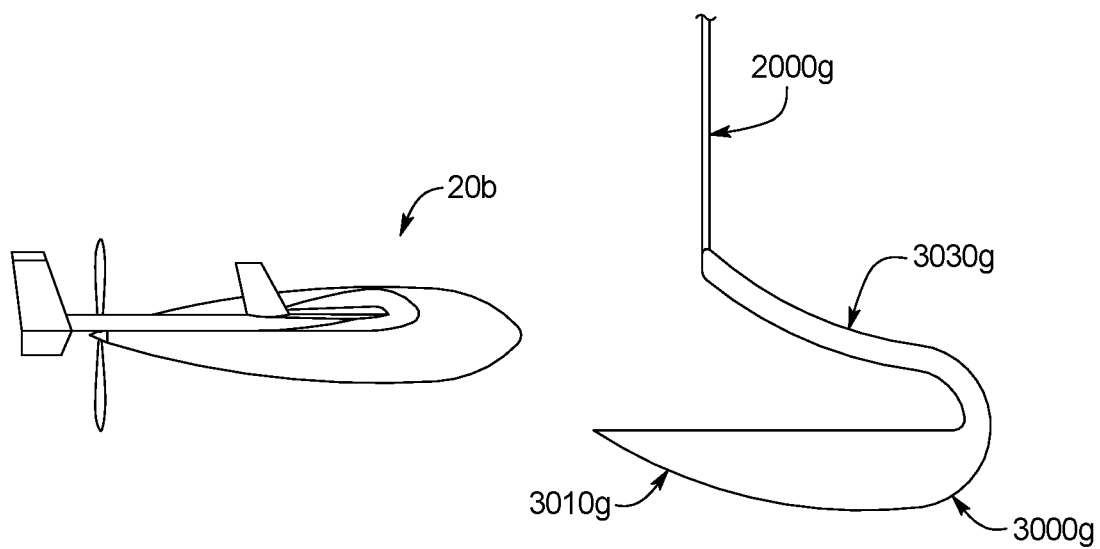
FIG. 18 is a diagrammatic fragmentary side view of the flexible capture member, the tensioning object, and the fixed-wing aircraft of FIG. 16.

FIGS. 16, 17, and 18 shows another example tensioning object 3000*g* of the present disclosure. This alternative example tensioning object 3000*g* is similar to the object 3000*d* except that the first arm 3030*g* and the second arm 3060*g* each flare or curve outwardly and upwardly. More specifically, in this alternative example embodiment, the tensioning object 3000*g* includes: (1) a sled or aircraft platform 3010*g*; (2) a first aircraft capture arm 3030*g* connected to and extending upwardly and outwardly from the platform 3010*g*; and (3) a second aircraft capture arm 3060*g* connected to and extending upwardly and outwardly from the platform 3010*g*. The first aircraft capture arm 3030*g* is aligned with but spaced apart from the second aircraft capture arm 3060*g* such that a forward part of the fuselage (not labeled) of the aircraft 20*b* can extend between the first aircraft capture arm 3030*g* and the second aircraft capture arm 3060*g*. This alternative shape provided for more space between the arms for capturing the fixed-wing aircraft. This example includes a single flexible member 2000*g* connected at an upper end to a single drum (not labeled) of the winch 1200*g*. The other end flexible member 2000*g* includes two sections attached to the tensioning object 3000*g*, and more specifically respectively attached the end tip of the first aircraft capture arm 3030*g* connected to and extending upwardly and outwardly from the platform 3010g and the end tip of the second aircraft capture arm 3060g connected to and extending upwardly and outwardly from the platform 3010g. This alternative shape also further provides for capture of the wings of the fixed-wing aircraft in situations where the wings engage the flexible member 2000g and slide downwardly toward and under the arms 3030g and 3060g. It should thus be appreciated that the shapes of the first and second arms may vary in accordance with the present disclosure. Again, although not shown in the above described embodiment, the sled or platform can include one or more downwardly and rearwardly extending vertical stabilizing members such as one or more fins.

It should also be appreciated that the present disclosure contemplates that the flexible member or members may be alternatively configured and of alternative lengths. It should be appreciated that the flexible member can be configured to be attached to the extreme tips of the arms (at bridle attachment points) to minimize snags with the wings as the wings slide down the flexible members into the pockets.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A fixed-wing aircraft retrieval system for a fixed-wing aircraft, said system comprising:
    a retrieval assembly attachable to a multi-copter;
    a tensioning object including an aircraft platform, a first aircraft capture arm connected to and extending upwardly from the platform, and a second aircraft capture arm connected to and extending upwardly from the platform;
    a first flexible member having a first end attachable to the retrieval assembly and a second end attachable to the first aircraft capture arm; and
    a second flexible member having a first end attachable to the retrieval assembly and a second end attachable to the second aircraft capture arm.

2. The fixed-wing aircraft retrieval system of claim 1, wherein the first aircraft capture arm is spaced apart from the second aircraft capture arm such that a forward part of the fuselage of the aircraft can extend between the first aircraft capture arm and the second aircraft capture arm.

3. The fixed-wing aircraft retrieval system of claim 1, wherein the first aircraft capture arm includes an upwardly extending front wing surface engaging section and an upwardly and rearwardly extending top wing surface engaging section.

4. The fixed-wing aircraft retrieval system of claim 1, wherein the first aircraft capture arm partly defines a wing receiving pocket configured to receive a wing of the aircraft.

5. The fixed-wing aircraft retrieval system of claim 4, wherein the first aircraft capture arm is configured to hold the wing of the aircraft in the wing receiving pocket.

6. The fixed-wing aircraft retrieval system of claim 3, wherein the second aircraft capture arm includes an upwardly extending front wing surface engaging section and an upwardly and rearwardly extending top wing surface engaging section.

7. The fixed-wing aircraft retrieval system of claim 6, wherein the second aircraft capture arm partly defines a wing receiving pocket configured to receive a wing of the aircraft.

8. The fixed-wing aircraft retrieval system of claim 7, wherein the first aircraft capture arm is configured to hold the wing of the aircraft in the wing receiving pocket.

9. The fixed-wing aircraft retrieval system of claim 7, which includes a first wing locking assembly connected to the first aircraft capture arm and a second wing locking assembly connected to the second aircraft capture arm.

10. The fixed-wing aircraft retrieval system of claim 7, wherein each of the first and second wing locking assemblies includes a biasing member and a wing locking member.

11. A fixed-wing aircraft retrieval system for a fixed-wing aircraft, said system comprising:
    a retrieval assembly attachable to a multi-copter;
    an aircraft platform;
    a first aircraft capture arm connected to and extending upwardly from the platform, the first aircraft capture arm including an upwardly extending front wing surface engaging section and an upwardly and rearwardly extending top wing surface engaging section;
    a second aircraft capture arm connected to and extending upwardly from the platform, the second aircraft capture arm including an upwardly extending front wing surface engaging section and an upwardly and rearwardly extending top wing surface engaging section, the second aircraft capture arm spaced apart from the first aircraft capture arm;
    a first flexible member having a first end attachable to the retrieval assembly and a second end attachable to the first aircraft capture arm; and
    a second flexible member having a first end attachable to the retrieval assembly and a second end attachable to the second aircraft capture arm.

12. The fixed-wing aircraft retrieval system of claim 11, wherein the first aircraft capture arm partly defines a wing receiving pocket and the second aircraft capture arm partly defines a wing receiving pocket.

13. The fixed-wing aircraft retrieval system of claim 11, which includes a first wing locking assembly connected to the first aircraft capture arm and a second wing locking assembly connected to the second aircraft capture arm.

14. The fixed-wing aircraft retrieval system of claim 13, wherein each of the first and second wing locking assemblies includes a biasing member and a wing locking member.

15. A method of retrieving a fixed-wing aircraft, said method comprising:
    flying a multi-copter to a designated height;
    positioning, via a first flexible member and a second flexible member, an aircraft platform, a first aircraft capture arm connected to and extending upwardly from the platform, and a second aircraft capture arm connected to and extending upwardly from the platform, below the multi-copter; and
    causing the fixed-wing aircraft to engage the platform such that a right wing of the fixed-wing aircraft enters a first pocket formed by the first aircraft capture arm and such that a left wing of the fixed-wing aircraft enters a second pocket formed by the second aircraft capture arm.

16. The method of claim 15, which includes holding the right wing of the fixed-wing aircraft in the first pocket via the first aircraft capture arm and holding the left wing of the fixed-wing aircraft in the second pocket via the second aircraft capture arm.

17. The method of claim 15, which includes holding the right wing of the fixed-wing aircraft in the first pocket via a first wing locking assembly connected to the first aircraft capture arm and holding the left wing of the fixed-wing aircraft in the second pocket via a second wing locking assembly connected to the second aircraft capture arm.

18. A fixed-wing aircraft retrieval system for a fixed-wing aircraft, said system comprising:
- a retrieval assembly attachable to a multi-copter;
- a tensioning object including an aircraft platform, a first aircraft capture arm connected to and extending upwardly from the platform, and a second aircraft capture arm connected to and extending upwardly from the platform; and
- a flexible member having a first end attachable to the aircraft platform and a second end attachable to the retrieval assembly.

19. The fixed-wing aircraft retrieval system of claim 18, which includes a load-centering yoke attachable to the flexible member and a plurality of legs respectively attached to the first aircraft capture arm and the second aircraft capture arm.

20. The fixed-wing aircraft retrieval system of claim 18, which includes one or more fins connected to an underside of the aircraft platform.

\* \* \* \* \*